United States Patent
Yuen et al.

(10) Patent No.: US 6,466,734 B2
(45) Date of Patent: *Oct. 15, 2002

(54) APPARATUS AND METHOD USING COMPRESSED CODES FOR SCHEDULING BROADCAST INFORMATION RECORDING

(75) Inventors: Henry C. Yuen, Redondo Beach; Daniel S. Kwoh, Rolling Hill Estates, both of CA (US)

(73) Assignee: Gemstar Development Corporation, Pasadena, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 09/374,137

(22) Filed: Aug. 10, 1999

(65) Prior Publication Data

US 2002/0006267 A1 Jan. 17, 2002

Related U.S. Application Data

(60) Division of application No. 08/848,533, filed on Aug. 28, 1997, now Pat. No. 5,974,222, which is a continuation of application No. 08/327,140, filed on Oct. 20, 1994, now abandoned, which is a continuation of application No. 07/806,152, filed on Dec. 11, 1991, now abandoned, which is a continuation-in-part of application No. 07/676,934, filed on Mar. 27, 1991, now Pat. No. 5,335,079, which is a continuation-in-part of application No. 07/371,054, filed on Jun. 26, 1989, now abandoned, which is a continuation-in-part of application No. 07/289,369, filed on Dec. 23, 1988, now abandoned.

(51) Int. Cl.[7] .......................... H04N 5/761; H04N 5/917
(52) U.S. Cl. ............................................ 386/83; 386/109
(58) Field of Search ................................. 386/109, 111, 386/112, 83, 46–52, 92, 4; 360/32; 348/7, 10; H04N 5/761, 5/917

(56) References Cited

U.S. PATENT DOCUMENTS 5,335,079 A * 8/1994 Yuen et al. .................... 386/83
5,515,173 A * 5/1996 Mankovitz et al. ........... 386/83

* cited by examiner

Primary Examiner—Robert Chevalier
(74) Attorney, Agent, or Firm—Christie, Parker & Hale, LLP

(57) ABSTRACT

Digital compressed codes, associated with advertisements enable a user to selectively record additional information, which would be broadcast on a television channel at a later time. The advertisement could be print advertisement or broadcast advertisement on television or radio. The user enters the digital code (I code) associated with an advertisement into a unit with a decoding unit which automatically converts the code into CTL (channel, time and length). The unit within a twenty four hour period activates a VCR to record information on the television channel at the right time for the proper length of time. The decoded channel, time and length information can be communicated directly to a VCR and used by the VCR directly to automatically activate the VCR to record a given television information broadcast corresponding to the communicated channel, time and length. Alternately, the channel, time and length information can be decoded directly in a remote control unit and only start record, stop record and channel selection commands sent to the VCR at the appropriate times. Algorithms for decoding the I codes can be a function of time to ensure security of the decoding method. A method is included for use of the I codes with cable channels.

6 Claims, 29 Drawing Sheets

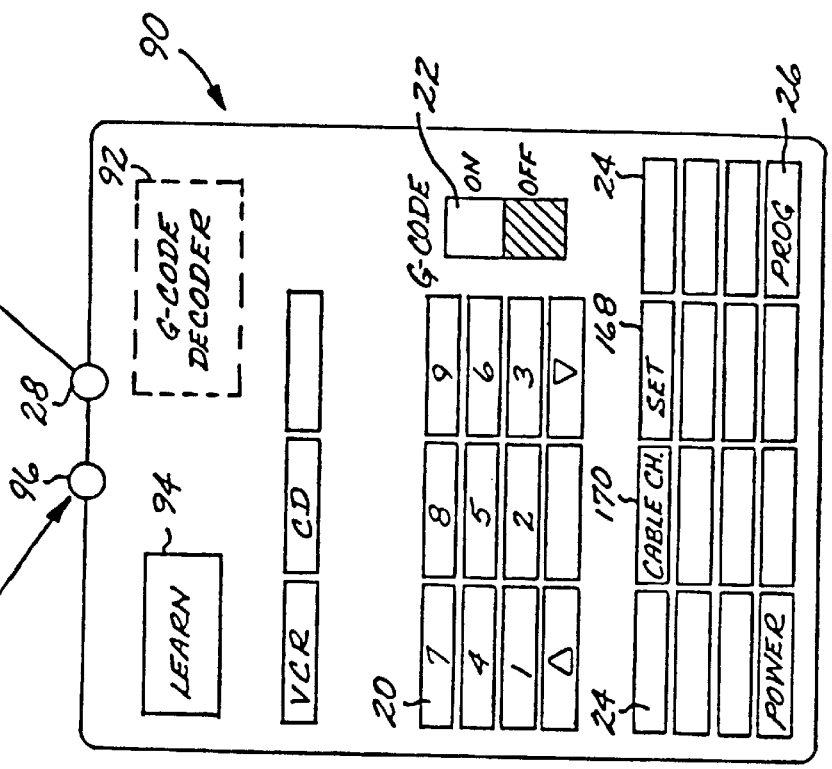
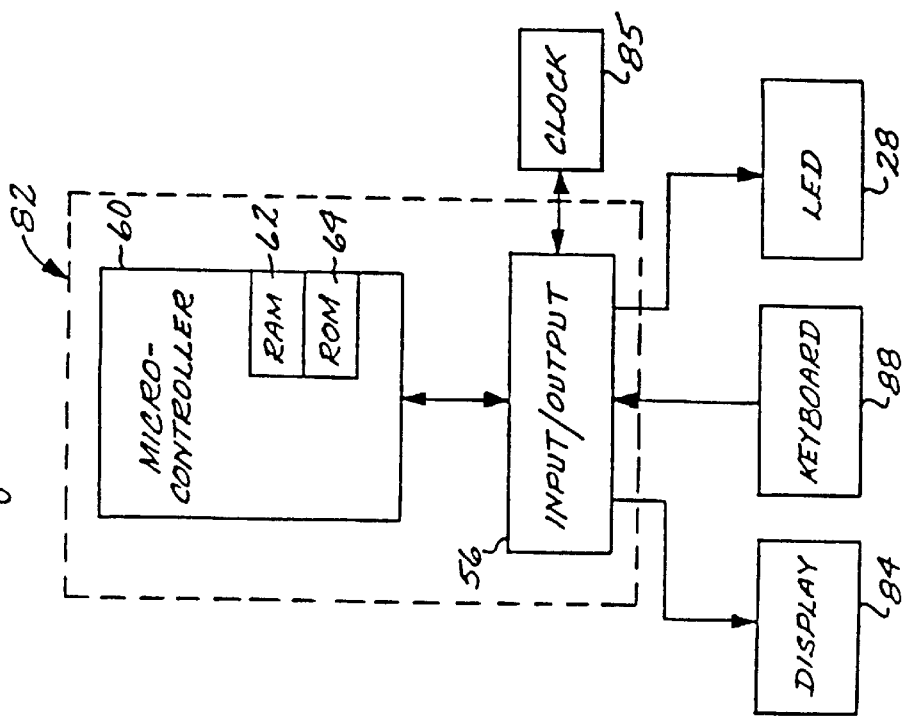

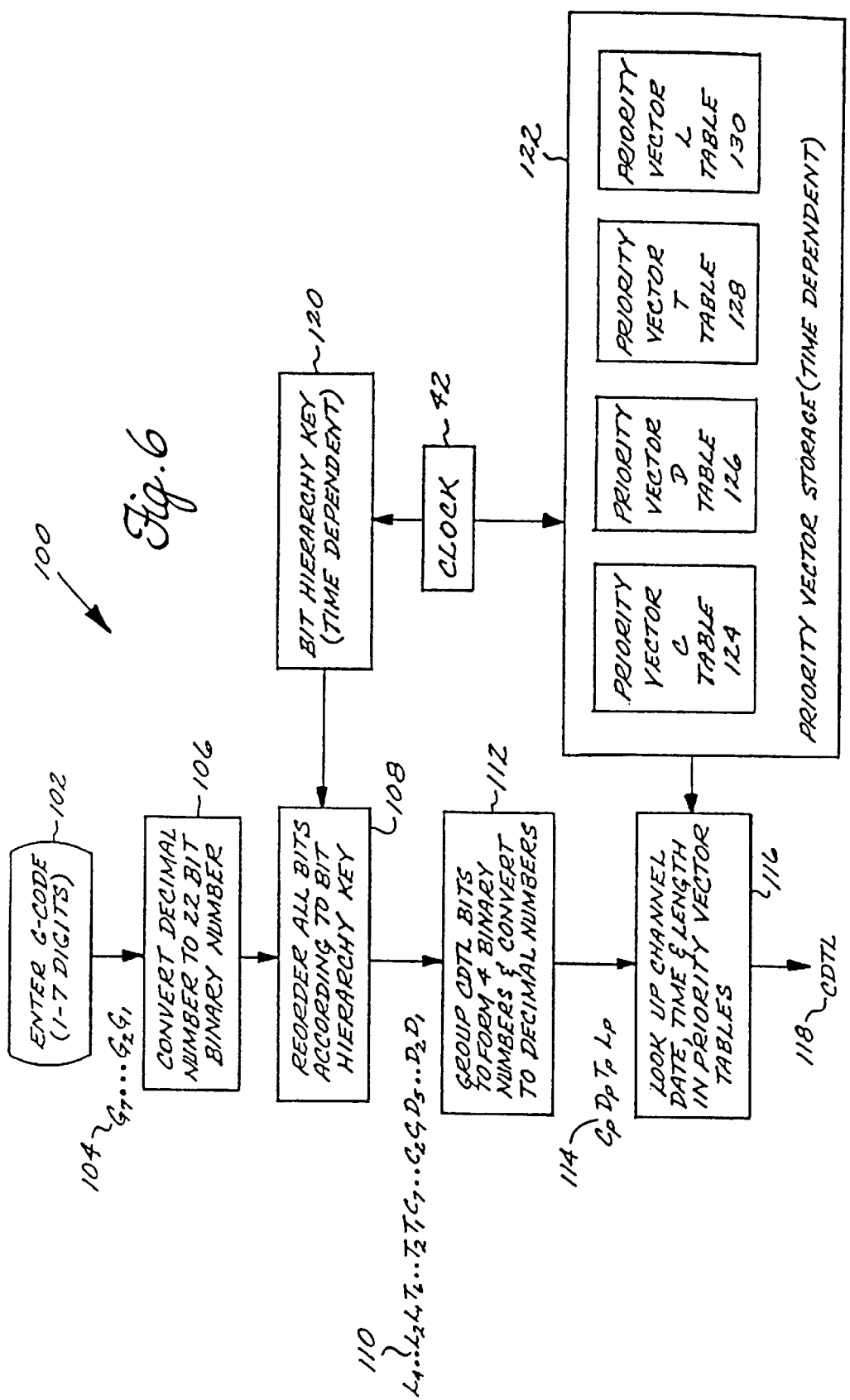

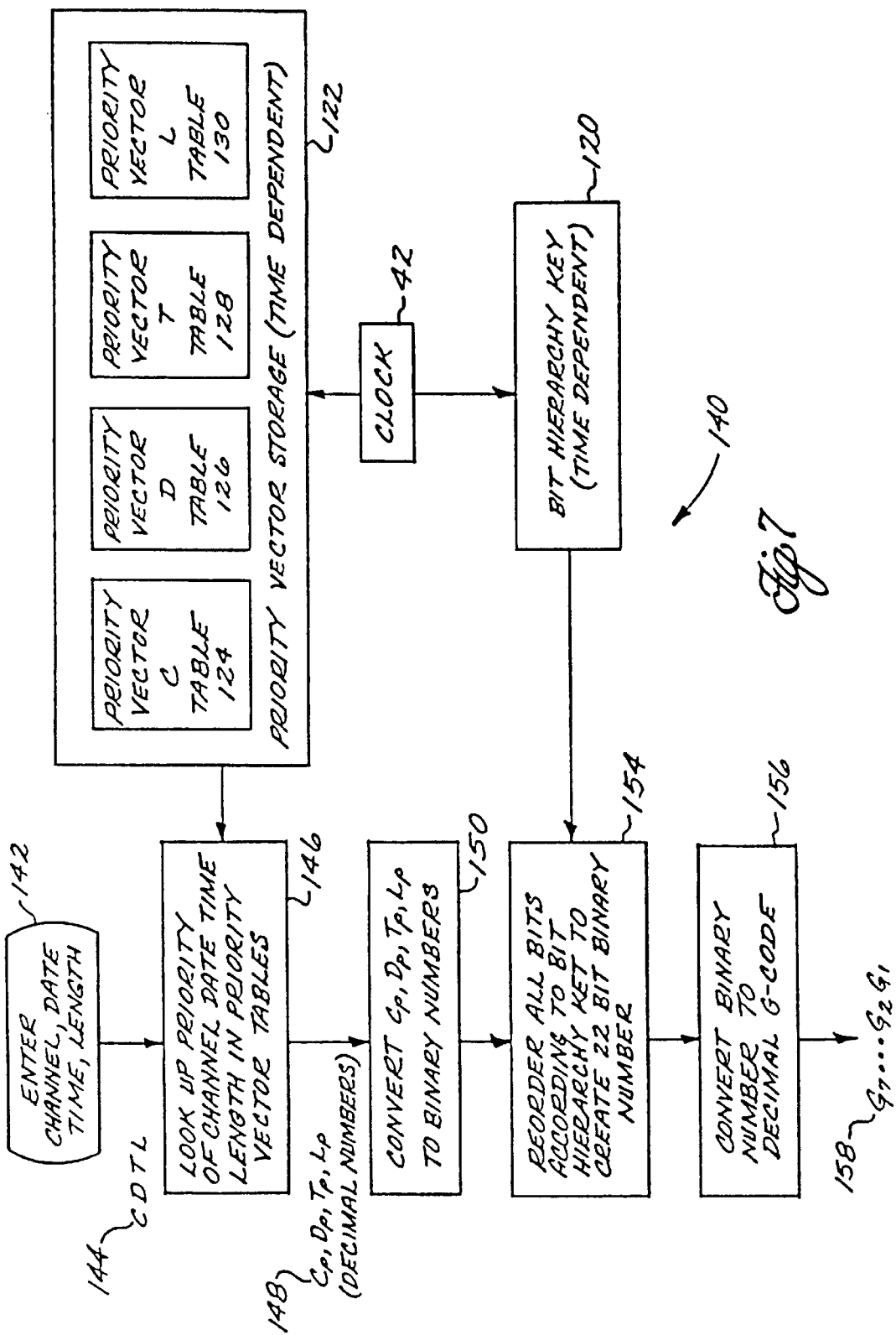

FEBRUARY 9, 1989 ~202

THURSDAY ~204

208 — [18] SPORTS RETROSPECTIVE; 60 MIN. [68713]
6PM [24] NATURESCENE [5321]
206  A VISIT TO THE COLORADO NATIONAL MONUMENT
       NEAR GRAND JUNCTION, WHERE WILDFLOWERS,
210 ⎯  INSECT AND BIRDS ARE OBSERVED
       [34] [52] NOTICIAS [62921] [496649]
       [40] DWIGHT THOMPSON -- RELIGION; [68553]
       [50] HUMANITIES THROUGH THE ARTS [493065]
       [56] BEVERLY HILLBILLIES -- COMEDY [496777]

FEBRUARY 10, 1989 ~202

FRIDAY ~204

[CB][D/S] MOVIE -- DRAMA; 70 MIN. (23627/3)  ~200
6:30  [17] FAMILY TIES (CC) -- COMEDY [15605]
206   MALLORY'S REUNION WITH HER COLLEGE BOY FRIEND
       (JOHN DUKAKIS) HAS HER WORRIED THAT SHE MAY
       NOT BE AS INTERESTING TO HIM AS SHE ONCE WAS.
208 — [56] HOGAN'S HEROES -- COMEDY [510857]
188 ⎯ CARTERS MASQUERADE AS A TRAITOR MAY BE
       KAPUT: A LOVELY FRAULEIN IS TRYING TO POISON HIM
       [C4][N/K] DOUBLE DARE -- GAME (29225) ~212
       [C7][TNN] VIDEOCOUNTRY (29129)
       [C7][USA] CARTOON EXPRESS (23561)
7PM   [5] CHARLES IN CHARGE (CC) -- COMEDY [1065]
206   WHILE PLANNING A PIZZA-PARLOR PARTY, CHARLES
       ALIENATES THE POWELL CHILDREN BY DISMISSING
       THEIR SUGGESTIONS ABOUT ORGANIZING THE EVENT.

*Fig. 8*

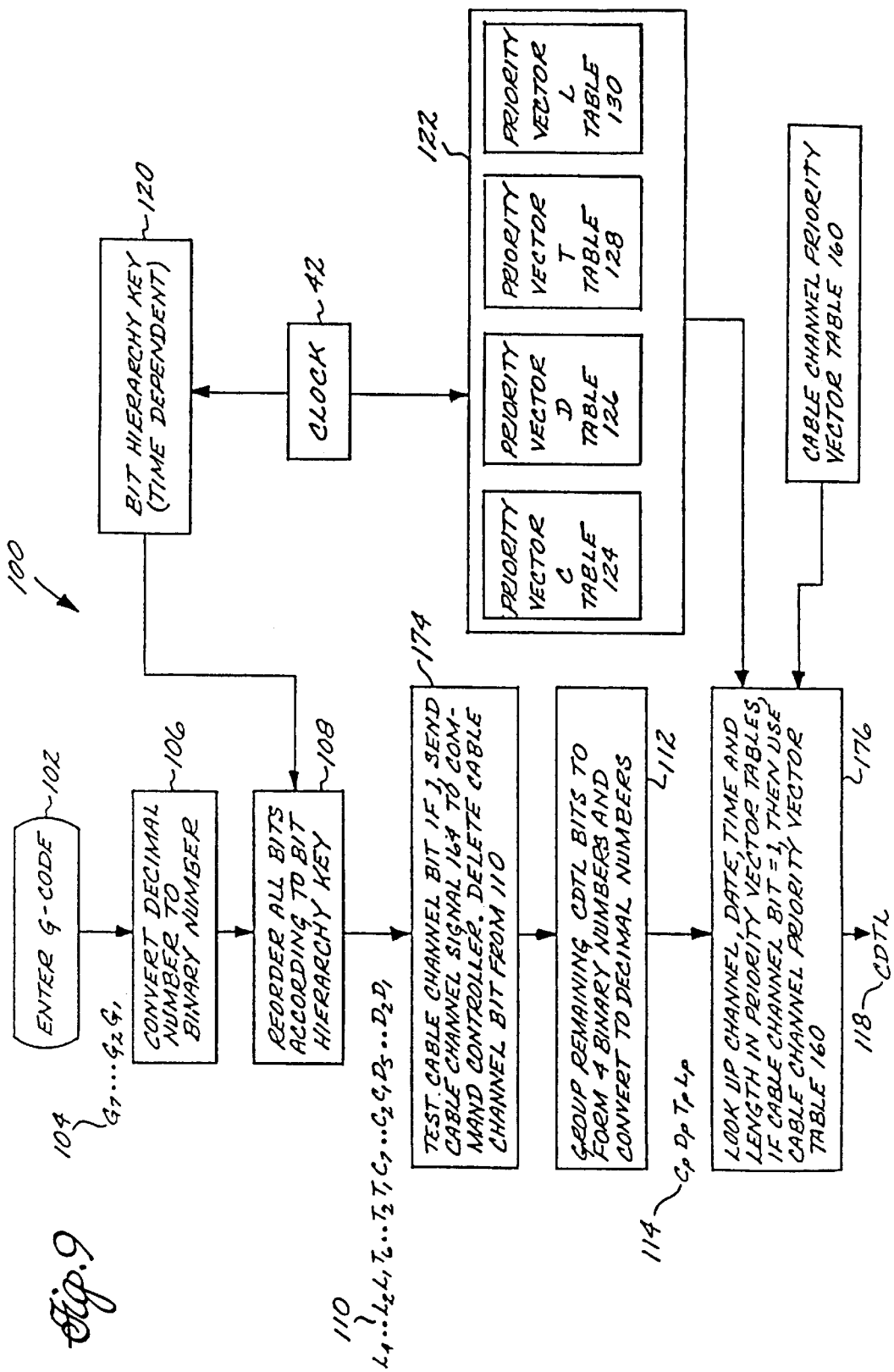

Fig. 28

| | ASSIGNED CHANNEL NUMBERS | LOCAL CHANNEL NUMBERS |
| --- | --- | --- |
| | GUIDE CH. | TV CH. |
| BROADCAST CHANNELS | | |
| WBBM (CBS) | 2 | 2 |
| WMAQ (NBC) | 5 | 5 |
| WLS (ABC) | 7 | 7 |
| WGN | 9 | 9 |
| WTTN (PBS) | 11 | 16 |
| WPWR | 50 | 45 |
| WGBO | 66 | 48 |
| CABLE CHANNELS | | |
| A&E | 10 | 10 |
| AMC | 4 | 4 |
| BET | 25 | 8 |
| BRAV | 24 | 29 |
| CNCB | 36 | 36 |
| CNN | 13 | 35 |
| CSPAN | 27 | 30 |
| DIS | 23 | 25 |
| ESPN | 3 | 6 |

APPARATUS AND METHOD USING COMPRESSED CODES FOR SCHEDULING BROADCAST INFORMATION RECORDING

This is a divisional of patent application Ser. No. 08/848,533 filed Aug. 28, 1997 Pat. No. 5,974,222, which is a continuation of Ser. No. 08/327,140 now abandoned, which is a continuation of Ser. No. 07/806,152 filed Dec. 11, 1991, which is now abandoned is a continuation in part of patent application Ser. No. 07/676,934 filed Mar. 27, 1991 now U.S. Pat. No. 5,335,079, which is a continuation in part of Ser. No. 07/371,054 filed Jun. 26, 1989 now abandoned, which itself is a continuation in part of Ser. No. 07/289,369, filed Dec. 23, 1988 now abandoned.

BACKGROUND OF THE INVENTION

1. Field of the Invention

This invention relates generally to video cassette recorder systems and particularly to the timer preprogramming feature of video cassette recorders (VCRs) and to an apparatus and method for using encoded information to shorten the time required to perform timer preprogramming and also an apparatus and method for enabling a user to selectively record, for later viewing, detailed information that is associated with an earlier publication or broadcast of an advertisement.

2. Prior Art

The video cassette recorder (VCR) has a number of uses, including playing back of tapes filmed by a video camera, playing back of pre-recorded tapes, and recording and playing back of broadcast and cable television programs.

To record a television program in advance of viewing it, a two-step process is often used: (1) obtain the correct channel, date, time and length (CDTL) information from a television program guide, and (2) program this CDTL information into the VCR. Depending on the model, year and type of the VCR, the CDTL information can be programmed in various ways including: (i) pushing an appropriate sequence of keys in the console according to instructions contained in the user's manual, (ii) pushing an appropriate sequence of keys in a remote hand-held control unit according to instructions contained in the user's manual (remote programming), and (iii) executing a series of keystrokes in the remote hand-held control unit in response to a menu displayed on the television screen (on-screen programming). Other techniques for timer preprogramming have been suggested including: (iv) reading in certain bar-code information using a light pen (light pen programming), and (v) entering instructions through a computer or telephone modem. These various methods differ only in the physical means of specifying the information while the contents, being CDTL and certain power/clock/timer on-off commands are generally common although the detailed protocol can vary with different model VCRs. Methods (i) and (ii) described above can require up to 100 keystrokes, which has inhibited the free use of the timer preprogramming feature of VCRs. To alleviate this, new VCR models have included an "On-Screen Programming" feature, which permits remote input of CDTL information in response to a menu displayed on the television screen. Generally on screen programming of CDTL information requires an average of about 18 keystrokes, which is less than some of the prior methods but still rather substantial. Some of the other techniques such as (iv) above, require the use of special equipment such as a bar code reader.

In general the present state of the art suffers from a number of drawbacks. First, the procedure for setting the VCR to record in advance can be quite complex and confusing and difficult to learn; in fact, because of this many VCR owners shun using the timer preprogramming record feature. Second, the transcription of the CDTL information to the VCR is hardly ever error-free; in fact, many users of VCR's timer preprogramming features express concern over the high incidence of programming errors. Third, even for experienced users, the process of entering a lengthy sequence of information on the channel, date, time and length of desired program can become tedious. Fourth, techniques such as reading in bar-code information or using a computer require special equipment. These drawbacks have created a serious impedance in the use of a VCR as a recording device for television programs. The effect is that time shifting of programs has not become as popular as it once was thought it would be. Accordingly, there is a need in the art for a simpler system for effecting VCR timer preprogramming which will enable a user to take advantage of the recording feature of a VCR more fully and freely.

The prior art in the area of enabling a user to selectively record for later viewing, detailed information associated with an advertisement is the familiar advertisement by a network during a television channel commercial break that there will be "news at 11" or that there will be an "interview with the winning coach at 9". A viewer watching the channel that sees/hears this announcement could preprogram his VCR to record the "news" or "interview" at the appropriate time. Thus, the concept of having a cue broadcast simultaneously with a advertisement that alerts a user that supplemental information regarding the advertisement will be broadcast at a later time can be implemented easily with standard apparatus such as a television and a VCR and is not new to the state of the art. The user could also be informed of an "interview with the winning coach" through print advertisement, which would indicate the channel time and date of the the interview. When the user is informed either through a broadcast or a printed advertisement that a winning team's coach will be interviewed later that day, the viewer uses his standard remote controller to program his VCR to automatically record this later program. The VCR stores the schedule information from the controller and, via its display panel, provides acknowledgment to the user of his programming commands.

U.S. Pat. No. 4,977,455 for a System and Process for VCR Scheduling discloses a television broadcast system in which a cue is broadcast and displayed simultaneously with a primary program. The cue alerts a user that supplemental information regarding the primary program will be broadcast at a later time. If the user responds to the cue via a remote controller, then data embedded in the primary program broadcast during the video blanking interval segment of the video signal, but not visible to the viewer, will be automatically stored and interpreted by a microprocessor and used to control a VCR to record the supplemental broadcast at the later time. Young does not contemplate the use of printed media at all and requires that a special unit be associated with the television receiver to store and interpret the data embedded in the primary program broadcast, and also to respond to the user cue, for the system to work at all, even for television advertisements, as shown in elements 4, 5, 9, 10, and 15 of FIG. 1, of U.S. Pat. No. 4,977,455.

SUMMARY OF THE INVENTION

A principal object of the invention is to provide an improved system for the selection and entering of channel, date, time and length (CDTL) information required for timer preprogramming of a VCR which is substantially simpler, faster and less error-prone than present techniques. Another principal object of the invention is to provide an improved apparatus and method for enabling a user to selectively record, for later viewing, detailed information that is associated with an earlier publication or broadcast of an advertisement.

In accordance with the invention, to program the timer preprogramming feature of a video system, there is an apparatus and method for using encoded video recorder/player timer preprogramming information. The purpose is to significantly reduce the number of keystrokes required to set up the timer preprogramming feature on a VCR. In accordance with this invention it is only necessary for the user to enter a code with 1 to 7 digits or more into the VCR. This can be done either remotely or locally at the VCR. Built into either the remote controller or the VCR is a decoding means which automatically converts the code into the proper CDTL programming information and activates the VCR to record a given television program with the corresponding channel, date, time and length. Generally multiple codes can be entered at one time for multiple program selections. The code can be printed in a television program guide in advance and selected for use with a VCR or remote controller with the decoding means.

Another principal object of the invention is to enable a user to selectively record information designated by a digital code, which would be associated with an advertisement. The advertisement could be print advertisement or a broadcast advertisement on television or radio. The additional information could be broadcast on a television channel early in the morning, for example, between midnite and six o'clock in the morning, when the broadcast rates are low and it is economical to broadcast detailed information or advertisements of many items, especially expensive ones, such as automobiles and real estate. In accordance with this invention it is only necessary for the user to enter a digital compressed code associated with an advertisement into a unit with a decoding means which automatically converts the code into CTL (channel, time and length). The unit activates a VCR to record information on the television channel starting at the right time and recording for the proper length of time. The information will be recorded within the next twenty four hours so it is not necessary to decode any date. The user can then view this information at his/her leisure.

Other objects and many of the attendant features of this invention will be more readily appreciated as the same becomes better understood by reference to the following detailed descriptions and considered in connection with the accompanying drawings in which like reference symbols designate like parts throughout the figures.

BRIEF DESCRIPTION OF THE DRAWINGS

FIG. 4 is a schematic of the processor embedded in the remote controller.

FIG. 5 is a schematic of a universal remote controller with the code decoder means embedded in the universal remote controller.

FIG. 6 is a flow graph of the G-code decoding technique.

FIG. 7 is a flow graph of the G-code encoding technique.

FIG. 8 is an illustration of part of a television calendar according to this invention.

FIG. 9 is a flowchart for decoding for cable channels.

FIG. 17A is a front elevational view of the apparatus of FIG. 15 placed in the mounting stand as shown in FIG. 17.

FIG. 28 is an embodiment of an assigned channel number/local channel number table.

DESCRIPTION OF THE PREFERRED EMBODIMENTS

Figure 1:
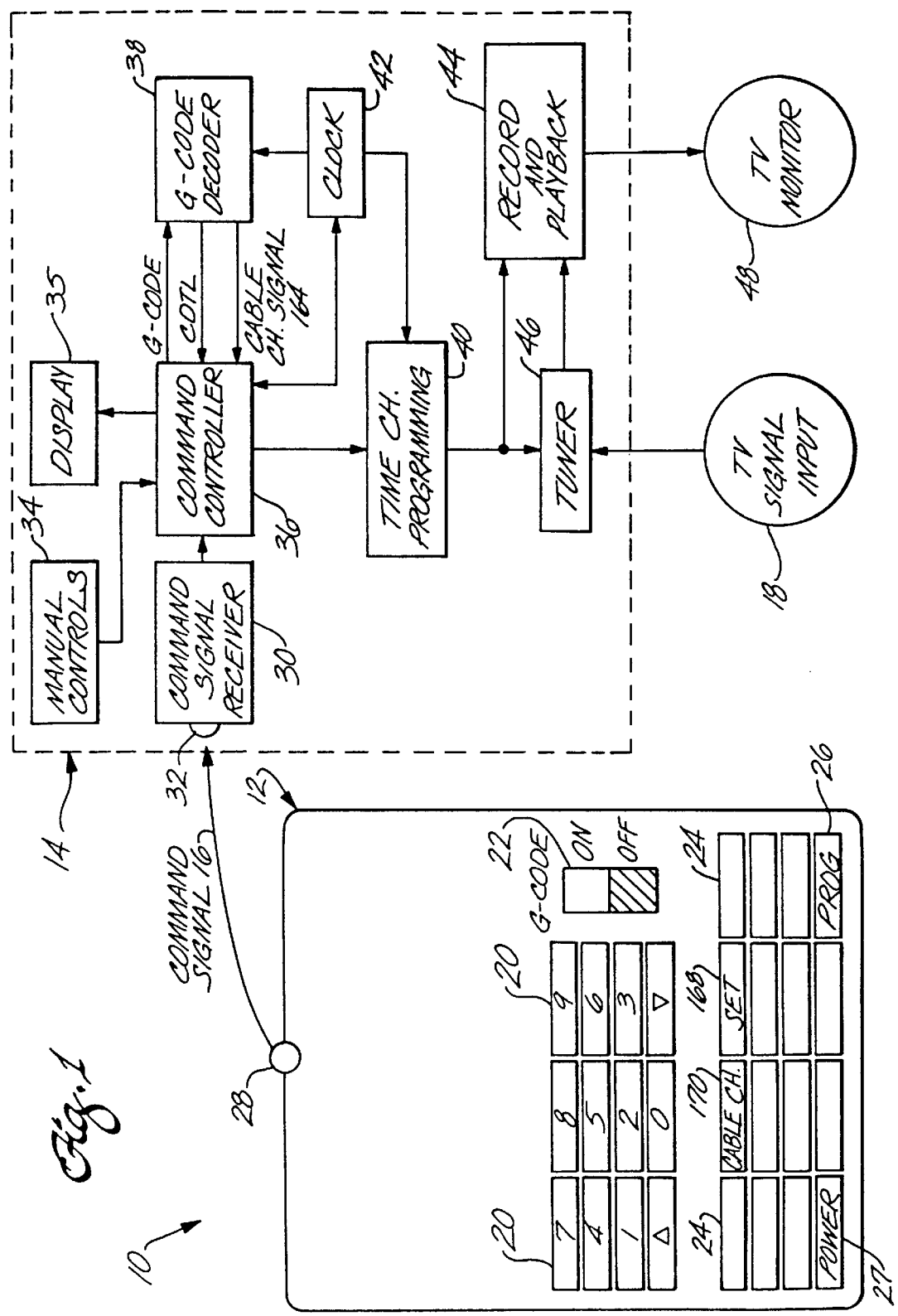
FIG. 1 is a schematic showing apparatus according to this invention with the code decoder means embedded in the video cassette recorder.

Referring now to the drawings, and more particularly, to FIG. 1, there is shown an apparatus for using encoded video recorder/player timer preprogramming information 10 according to this invention. The primary components include a remote controller 12 and a video cassette recorder/player with G-code decoder 14, which can be controlled by remote controller 12 via a command signal 16. The remote controller 12 can have a number of keys, which include numerical keys 20, G-code switch 22, function keys 24, program key 26 and power key 27. There are means in the remote controller 12 that interprets each key as it is pressed and sends the proper command signal 16 to the VCR via an infra-red light emitting diode 28. Except for the G-code switch 22 on the remote controller 12 in FIG. 1, the remote controller 12 is essentially the same as any other remote controller in function. The G-code switch 22 is provided just to allow the user to lock the remote controller 12 in the G-code mode while using a G-code, which is the name given to the compressed code which is the encoded CDTL information, to perform timer preprogramming.

A G-code consists of 1 to 7 digits, although more could be used, and is associated with a particular program. A user would lookup the G-code in a program guide and just enter the G-code on the remote controller 12, instead of the present state of the art, which requires that the user enter the actual channel, date, time and length (CDTL) commands.

In order to understand the advantages of using a G-code, it is helpful to describe the best of the current state of the art, which is "on screen programming" with direct numerial entry. This technique involves about 18 keystrokes and the user has to keep switching his view back and forth between the TV screen and the remote controller while entering the CDTL information. This situation may be akin to a user having to dial an 18 digit telephone number while reading it from a phone book. The number of keys involved and the switching back and forth of the eye tend to induce errors. A typical keying sequence for timer recording using on-screen CDTL programming is as follows:

PROG 2 1 15 07 30 2 08 00 2 04 PROG

The first program (PROG) key 26 enters the programming mode. Then a sequence of numericals key 20 are pushed. The 2 means it is timer recording rather than time setting. The 1 means the user is now entering the settings for program 1. The 15 is the date. The 07 is starting hour. The 30 is a starting minute. The 2 means pm. The next sequence 08 00 2 is the stopping time. The 04 is channel number. Finally, the PROG is hit again to exit the program mode.

By contrast, this command could have been "coded" and entered in a typical G-code sequence as follows: PROG 1138 PROG. To distinguish that the command is a coded G-code, the G-code switch 22 should be turned to the "ON" position. Instead of having a switch, a separate key "G" can be used. The G-code programming keystroke sequence would then be: G 1138 PROG.

The use of a G-code does not preclude "on-screen" confirmation of the program information that has been entered. When the keystrokes "PROG 1138 PROG" are entered with the G-code switch in the "ON" position, the G-code would be decoded and the television could display the following message:

| PROGRAM | DATE | START TIME | STOP TIME | CHANNEL |
|---------|------|------------|-----------|---------|
| 1138 | 15 | 7:30 PM | 8:00 PM | 4 |

In order for the G-code to be useful it must be decoded and apparatus' for that purpose must be provided. Referring to FIG. 1, a video cassette recorder/player with G-code decoder 14 is provided to be used in conjunction with remote controller 12. The command signal 16 sent from the remote controller 12 is sensed by the photodiode 32 and converted to electrical signals by command signal receiver 30. The electrical signals are sent to a command controller 36, which interprets the commands and determines how to respond to the commands. As shown in FIG. 1, it is also possible for the command controller 36 to receive commands from the manual controls 34 that are normally built into a VCR. If the command controller 36 determines that a G-code was received then the G-code will be sent to the G-code decoder 38 for decoding. The G-code decoder 38 converts the G-code into CDTL information, which is used by the command controller 36 to set the time/channel programming 40. Built into the VCR is a clock 42. This is normally provided in a VCR and is used to keep track of the date and time. The clock 42 is used primarily by the time/channel programming 40 and the G-code decoder 38 functions. The time/channel programming 40 function is set up with CDTL information by the command controller 36. When the proper date and time is read from clock 42, then the time/channel programming 40 function turns the record/playback 44 function "ON" to record. At the same time the tuner 46 is tuned to the proper channel in the television signal 18. Later the user can command the record/playback 44 function to a playback mode to watch the program via the television monitor 48.

An alternate way to control the recorder is to have the command controller 36 keep all the CDTL information instead of sending it to the time/channel programming 40. The command controller would also keep track of the time by periodically reading clock 42. The command controller would then send commands to the time/channel programming 40 to turn on and off the recorder and to tuner 46 to cause it to tune to the right channel at the right time according to the CDTL information.

The clock 42 is also an input to G-code decoder 38, which allows the G-code decoding to be a function of the clock, which lends a measure of security to the decoding technique and makes it harder to copy. Of course this requires that the encoding technique must also be a function of the clock.

Figure 2:
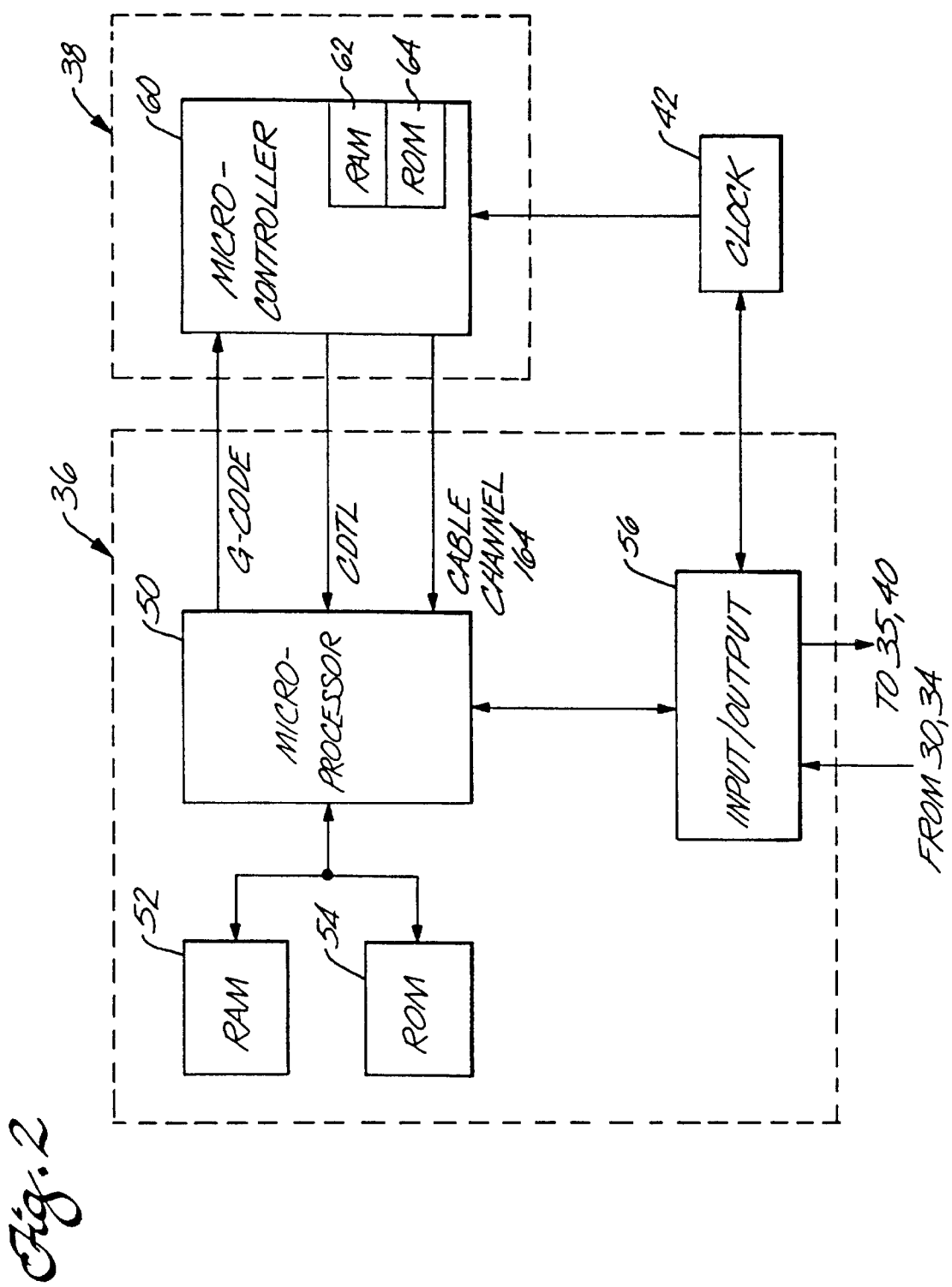
FIG. 2 is a schematic of the VCR embedded processors for command control and code decoding.

A possible realization of the command controller 36 and the G-code decoder 38 is shown in FIG. 2. The command controller 36 function can be realized with a microprocessor 50, a random access memory 52 and a read only memory 54, which is used for program storage. The input/output 56 function is adapted to receive commands from the command signal receiver 30, the manual controls 34 and the clock 42, and to output signals to a display 35, the clock 42, and the time/channel programming 40 function. If the microprocessor 50 interprets that a G-code has been received, then the G-code is sent to microcontroller 60 for decoding. The microcontroller 60 has an embedded random access memory 62 and an embedded read only memory 64 for program and table storage. The clock 42 can be read by both microprocessor 50 and microcontroller 60. An alternative to having microcontroller 60 perform the G-code decoding is to build the G-code decoding directly into the program stored in read only memory 54. This would eliminate the need for microcontroller 60. Of course, other hardware to perform the G-code decoding can also be used. The choice of which implementation to use is primarily an economic one.

The blocks in FIGS. 1 and 2 are well known in the prior art and are present in the following patents: Fields, U.S. Pat. No. 4,481,412; Scholz, U.S. Pat. No. 4,519,003; and Brugliera, U.S. Pat. No. 4,631,601. For example, clock 42 is analogous to element 7 in Scholz and element 17 in Brugliera. Other analogous elements are: command signal receiver 30 and Scholz 14 and Brugliera 12; tuner 46 and Scholz 6 and Brugliera 10; time/channel programming 40 and Scholz 8, 11 and Brugliera 16; record & playback 44 and Scholz 1, 2, 4; command controller 36 and Scholz 11, 10 and Brugliera 12; microprocessor 50 and Fields 27; RAM 62 and Fields 34; ROM 54 and Fields 33; manual controls 34 and Scholz 15, 16; and remote controller 12 and Scholz 26 and Brugliera 18.

Figure 3:
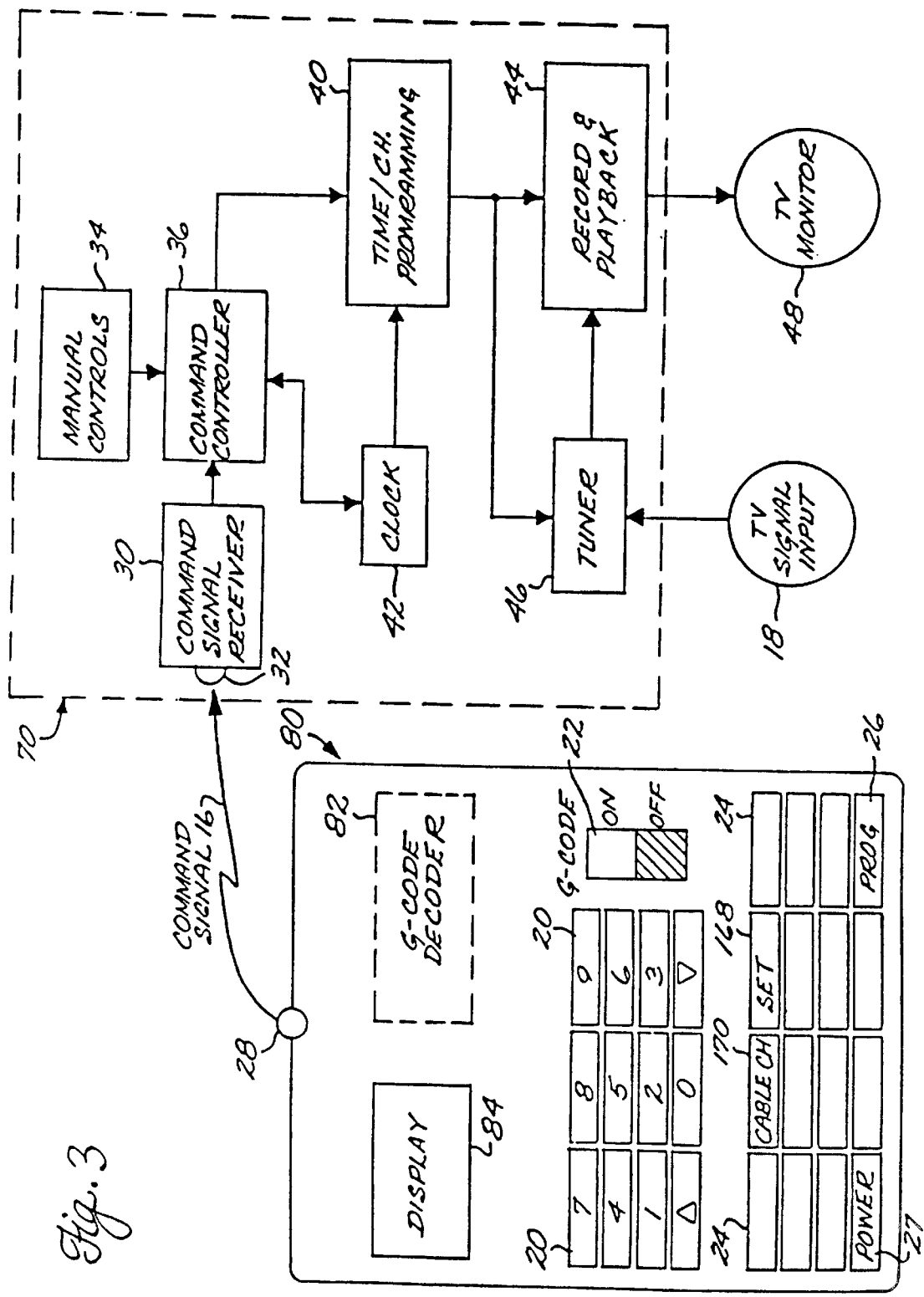
FIG. 3 is a schematic showing a preferred-embodiment according to this invention with the code decoder means embedded in a remote controller.

FIG. 3 illustrates an alternate preferred embodiment of this invention. In FIG. 3 a remote controller with embedded G-code decoder 80 is provided. The remote controller with embedded G-code decoder 80 is very similar to remote controller 12, except for the addition of the G-code decoder 82. Note that it is also possible in any remote controller to provide a display 84. The remote controller with embedded G-code decoder 80 would be used in conjunction with a normal video cassette recorder/player 70, which would not be required to have an embedded G-code decoder. The numerals for the subelements of video cassette recorder/player 70 are the same as described above for the video cassette recorder/player with G-code decoder 14 and have the same function, except for the absence of G-code decoder 38. This preferred embodiment has the advantage that it can be used in conjunction with VCRs that are presently being used. These do not have a G-code decoding capability. Replacing their remote controllers with ones that have this capability built-in can vastly improve the capability to do timer preprogramming for a modest cost.

FIG. 4 illustrates a possible realization of the G-code decoder 82 built into the remote controller with embedded G-code decoder 80. A microprocessor 60 can be used as before to decode the G-code, as well as interface with the display 84, a clock 85, the keypad 88 and the light emitting diode 28. Alternately, other hardware implementations can be used to perform the G-code decoding. The clock 85 is provided in the remote controller 80 so that the G-code decoder 82 can be made to have the clock 85 as one of its inputs. This allows the G-code decoding to be a function of the clock 85, which lends a measure of security to the decoding technique and makes it harder to copy.

The remote controller with embedded G-code decoder as described above would send channel, date, time and length information to the video cassette recorder/player 70, which would use the CDTL information for tuning into the correct channel and starting and stopping the recording function. The remote controller may have to be unique for each different video cassette recorder/player, because each brand or model may have different infrared pulses for each type of information sent such as the channel number keys and start record and stop record keys. The particular infrared pulses used for each key type can be called the vocabulary of the particular remote controller. Each model may also have a different protocol or order of keys that need to be pushed to accomplish a function such as timer preprogramming. The protocol or order of keys to accomplish a function can be called sentence structure. If there is a unique remote controller built for each model type, then the proper vocabulary and sentence structure can be built directly into the remote controller.

An alternate to having the remote controller with embedded G-code decoder send channel, date, time and length information to the video cassette recorder/player 70, is to have the remote controller with embedded G-code decoder perform more operations to simplify the interfacing problem with existing video cassette recorder/players. In particular, if the remote controller not only performs the G-code decoding to CDTL, but also keeps track of time via clock 85, then it is possible for the remote controller to send just channel, start record and stop commands to the video cassette recorder/player. The channel, start and stop are usually basic one or two key commands, which means there is no complicated protocol or sentence structure involved. Thus, to communicate with a diverse set of video cassette recorder/player models it is only necessary to have memory within the remote controller, such as ROM 64 of FIG. 4, for storing the protocol for all the models or at least a large subset. The G-code would be entered on the remote controller as before and decoded into channel, date, time and length information, which would be stored in the remote controller. Via clock 85, the time would be checked and when the correct time arrives the remote controller would automatically send out commands to the VCR unit for tuning to the correct channel and for starting and stopping the recording. It is estimated that only two (2) bytes per key for about 15 keys need to be stored for the vocabulary for each video cassette recorder/player model. Thus, to cover 50 models would only require about 30*50=1500 bytes of memory in the remote controller. It would be necessary to position the remote controller properly with respect to the VCR unit so that the infrared signals sent by the remote controller are received by the unit.

Another preferred embodiment is to provide a universal remote controller 90 with an embedded G-code decoder. Universal remote controllers provide the capability to mimic a number of different remote controllers. This reduces the number of remote controllers that a user needs to have. This is accomplished by having a learn function key 94 function on the universal remote controller, as shown in FIG. 5. If the learn function key 94 is pushed in conjunction with another key, the unit will enter into the learn mode. Incoming infra-red (IR) pulses from the remote controller to be learned are detected by the infra-red photodiode 96, filtered and wave-shaped into recognizable bit patterns before being recorded by a microcontroller into a battery-backed static RAM as the particular IR pulse pattern for that particular key. This is done for all the individual keys.

An example of more complex learning is the following. If the learn function key 94 in conjunction with the program key 26 are pushed when the G-code switch is "ON", the unit will recognize that it is about to record the keying sequence of a predetermined specific example of timer preprogramming of the particular VCR involved. The user will then enter the keying sequence from which the universal remote controller 90 can then deduce and record the protocol of the timer preprogramming sequence. This is necessary because different VCRs may have different timer preprogramming command formats.

If keys are pushed without the learn function key 94 involved, the microcontroller should recognize it is now in the execute mode. If the key is one of the direct command keys, the microcontroller will read back from its static RAM the stored pulse sequence and send out command words through the output parallel I/O to pulse the output light emitting diode 28. If the key is the PROG key and the G-code switch is "OFF", then the microcontroller should recognize the following keys up to the next PROG key as a timer preprogramming CDTL command and send it out through the light emitting diode 28. If the G-code switch 22 is set to "ON" and the program key 26 is pushed, the microcontroller should recognize the following keys up to the next PROG key as a G-code command for timer pre-programming. It will decode the G-code into channel, date, start time and length (CDTL) and the microcontroller will then look up in it's static RAM "dictionary" the associated infra-red pulse patterns and concatenate them together before sending them off through the output parallel I/O to pulse the light emitting diode 28 to send the whole message in one continuous stream to the VCR.

FIG. 4 illustrates a possible realization of the G-code decoder 92 that could be built into the universal remote controller with embedded G-code decoder 90. A microcontroller 60 can be used as before to decode the G-code, as well as for interfacing with the input/output functions including the photodiode 96. Alternately, the G-code decoding can be performed with other hardware implementations.

The universal remote controller can also be used in another manner to simplify the interfacing problem with existing video cassette recorder/players. In particular, if the universal remote controller performs not only the G-code decoding to CDTL, but also keeps track of time via clock 85 in FIG. 4, then it is possible for the universal remote controller to send just channel, start record and stop commands to the video cassette recorder/player, which as explained before, are usually basic one key commands, which means there is no complicated protocol or sentence structure involved. Thus, to communicate with a diverse set of video cassette recorder/player models it is only necessary for the universal remote controller to "learn" each key of the remote controller it is replacing. The G-code would be entered on the universal remote controller as before and decoded into channel, date, time and length information, which would be stored in the universal remote controller. Via clock 85, the time would be checked and when the correct time arrives the universal remote controller would automatically send out commands to the VCR unit for tuning to the correct channel and for starting and stopping the recording. It would be necessary to position the universal remote controller properly with respect to the VCR unit so that the signals sent by the universal remote are received by the VCR unit.

There are a number of ways that the G-code decoding can be performed. The most obvious way is to just have a large look up table. The G-code would be the index. Unfortunately, this would be very inefficient and result in a very expensive decoder due to the memory involved. The total storage involved is a function of the number of total combinations. If we allow for 128 channels, 31 days in a month, 48 on the hour and on the half hour start times in a twenty four hour day, and 16 length selections in half hour increments, then the total number of combinations is 128× 31×48×16=3,047,424. This number of combinations can be represented by a 7 digit number. The address to the table would be the 7 digit number. In the worse case, this requires a lookup table that has about 4,000,000 rows by 15 to 16 digital columns, depending on the particular protocol. These digital columns would correspond to the CDTL information required for "on screen programming". Each digit could be represented by a 4 bit binary number. Thus, the total storage number of bits required for the lookup table would be about 4,000,000×16×4=256,000,000. The present state of the art has about 1 million bits per chip. Thus, G-code decoding using a straightforward table lookup would require a prohibitively expensive number of chips.

Fortunately, there are much more clever ways of performing the G-code decoding. FIG. 6 is a flow diagram of a preferred G-code decoding technique. To understand G-code decoding, it is easiest to first explain the G-code encoding technique, for which FIG. 7 is the flow chart. Then the G-code decoding technique, which is the reverse of the G-code encoding will be explained.

The encoding of the G-codes can be done on any computer and is done prior to preparation of any program guide that would include G-codes. For each program that will be printed in the guide, a channel, date, time and length (CDTL) code 144 is entered in step 142. Step 146 separately reads the priority for the channel, date, time and length in the priority vector storage 122, which can be stored in read only memory 64. The priority vector storage 122 contains four tables: a priority vector C table 124, a priority vector D table 126, a priority vector T table 128 and a priority vector L table 130.

The channel priority table is ordered so that the most frequently used channels have a low priority number. An example of the data that is in priority vector C table 124 follows.

| channel  | 4 | 7 | 2 | 3 | 5 | 6 | 11 | 13 | ... |
|----------|---|---|---|---|---|---|----|----|-----|
| priority | 0 | 1 | 2 | 3 | 4 | 5 | 6  | 7  | ... |

Generally the dates of a month all have an equal priority, so the low number days in a month and the low number priorities would correspond in the priority vector D table as in the following example.

| date     | 1 | 2 | 3 | 4 | 5 | 6 | 7 | 8 | 9 | 10 | ... |
|----------|---|---|---|---|---|---|---|---|---|----|-----|
| priority | 0 | 1 | 2 | 3 | 4 | 5 | 6 | 7 | 8 | 9  | ... |

The priority of the start times would be arranged so that prime time would have a low priority number and programs in the dead of the night would have a high priority number. For example, the priority vector T table would contain:

| time     | 6:30 pm | 7:00 pm | 8:00 pm | 7:30 pm | ... |
|----------|---------|---------|---------|---------|-----|
| priority | 0       | 1       | 2       | 3       | ... |

An example of the data that is in the priority vector L table 130 is the following:

| length of program (hours) | 0.5 | 1.0 | 2.0 | 1.5 | 3.0 | ... |
|---------------------------|-----|-----|-----|-----|-----|-----|
| priority                  | 0   | 1   | 2   | 3   | 4   | ... |

Suppose the channel date time length (CDTL) 144 data is 5 10 19.00 1.5, which means channel 5, 10th day of the month, 7:00 PM, and 1.5 hours in length, then for the above example the $C_p, D_p, T_p$, data 148, which are the result of looking up the priorities for channel, date, time and length in priority tables 124, 126, 128 and 130 of FIG. 7, would be 4 9 1 3. Step 150 converts $C_p, D_p, T_p, L_p$ data to binary numbers. The number of binary bits in each conversion is determined by the number of combinations involved. Seven bits for $C_p$, which can be denoted as $C_7 C_6 C_5 C_4 C_3 C_2 C_1$, would provide for 128 channels. Five bits for $D_p$, which can be denoted as $D_5 D_4 D_3 D_2 D_1$, would provide for 31 days in a month. Six bits for $T_p$, which can be denoted as $T_6 T_5$ $T_4 T_3 T_2 T_1$, would provide for 48 start times on each half hour of a twenty four hour day. Four bits for length, which can be denoted as $L_4 L_3 L_2 L_1$, would provide for a program length of up to 8 hours in half hour steps. Together there are 7+5+6+4=22 bits of information, which correspond to 2**22=4,194,304 combinations.

The next step is to use bit hierarchy key 120, which can be stored in read only memory 64 to reorder the 22 bits. The bit hierarchy key 120 can be any ordering of the 22 bits. For example, the bit hierarchy key might be:

| $L_8$ | $C_3$ | ... | $T_2$ | $C_2$ | $T_1$ | $C_1$ | $L_1$ | $D_5$ | $D_4$ | $D_3$ | $D_2$ | $D_1$ |
|---|---|---|---|---|---|---|---|---|---|---|---|---|
| 22 | 21 | ... | 10 | 9 | 8 | 7 | 6 | 5 | 4 | 3 | 2 | 1 |

Ideally the bit hierarchy key is ordered so that programs most likely to be the subject of timer preprogramming would have a low value binary number, which would eliminate keystrokes for timer preprogramming the most popular programs. Since all the date information has equal priority, then the $D_5 D_4 D_3 D_2 D_1$ bits are first. Next $T_1 C_1 L_1$ are used, because for whatever date it is necessary to have a time channel and length and $T_1 C_1 L_1$ are the most probable in each case due to the ordering of the priority vectors in priority vector storage 122. The next bit in the hierarchy key is determined by the differential probabilities of the various combinations. One must know the probabilities of all the channels, times and lengths for this calculation to be performed.

For example, the probability for channels may be:

| channel | 4 | 7 | 2 | 3 | 5 | 6 | 11 | 13 | ... |
|---|---|---|---|---|---|---|---|---|---|
| priority | 0 | 1 | 2 | 3 | 4 | 5 | 6 | 7 | ... |
| probability (%) | 5 | 4.3 | 4 | 3 | 2.9 | 2.1 | 2 | 1.8 | ... |

The probabilities for times might be:

| time | 6:30 pm | 7:00 pm | 8:00 pm | 7:30 pm | ... |
|---|---|---|---|---|---|
| priority | 0 | 1 | 2 | 3 | ... |
| probability (%) | 8 | 7.8 | 6 | 5 | ... |

And, the probabilities for lengths might be:

| length of program (hours) | 0.5 | 1.0 | 2.0 | 1.5 | 3.0 | ... |
|---|---|---|---|---|---|---|
| priority | | 0 | 1 | 2 | 3 | 4 | ... |
| probability (%) | | 50 | 20 | 15 | 5 | 4 | ... |

The probabilities associated with each channel, time and length, as illustrated above, are used to determine the proper ordering. Since the priority vector tables are already ordered by the most popular channel, time, and length, the order in which to select between the various binary bits for one table, for example selecting between the $C_7 C_6 C_5 C_4 C_3 C_2 C_1$ bits, is already known. The $C_1$ bit would be selected first because as the lowest order binary bit it would select between the first two entries in the channel priority table. Then the $C_2$ bit would be selected and so on. Similarly, the $T_1$ and $L_1$ bits would be used before any of the other time and length bits. A combination of the $C_1, T_1, L_1$ and $D_5 D_4 D_3 D_2 D_1$ bits should be used first, so that all the information is available for a channel, date, time and length. The $D_5 D_4 D_3 D_2 D_1$ bits are all used because the date bits all have equal priority and all are needed to specify a date even if some of the bits are binary zero.

At this point the bit hierarchy key could be:

$T_1 C_1 L_1 D_5 D_4 D_3 D_2 D_1$

The first channel binary bit $C_1$ by itself can only select between $2^1=2$ channels, and the first two channels have a probability percent of 5 and 4.3, respectively. So the differential probability of $C_1$ is 9.3. Similarly, the differential probability of $T_1$ is 8+7.8=15.8, and the differential probability of $L_i$ is 50+20=70. If the rules for ordering the bit hierarchy key are strictly followed, then the first 8 bits of the bit hierarchy key should be ordered as:

$C_1 T_1 L_1 D_5 D_4 D_3 D_2 D_1$, because $L_1$ has the highest differential priority so it should be next most significant bit after $D_5$, followed by $T_1$ *as the next most significant bit*, and then $C_1$ *as the next most significant bit*. Notice that the bit hierarchy key starts with the least significant bit $D_1$, and then is filled in with the highest differential probability bits. This is for the purpose of constructing the most compact codes for popular programs.

The question at this point in the encoding process is what should the next most significant bit in the hierarchy key be: $T_2, C_2$, or $L_2$. This is again determined by the differential probabilities, which can be calculated from the above tables for each bit. Since we are dealing with binary bits, the $C_2$ in combination with $C_1$ selects between $2^2=4$ channels or 2 more channels over $C_1$ alone. The differential probability for $C_2$ is then the additional probabilities of these two additional channels and for the example this is: 4+3=7. In a similar manner $C_3$ in combination with $C_1$ and $C_2$ selects between $2^3=8$ channels or $4=2^{(3-1)}$ more channels over the combination of $C_1$ and $C_2$. So the differential probability of $C_3$ is the additional probabilities of these four additional channels and for the example this is: 2.9+2.1+2+1.8=8.8. In a similar manner, the differential probabilities of $T_2$ and $L_2$ can be calculated to be 6+5=11 and 15+5=20, respectively. Once all the differential probabilities are calculated, the next step is determining which combinations of bits are more probable.

Now for the above example, which combination is more probable: $T_2$ with $C_1 L_1$, or $C_2$ with $T_1 L_1$, or $L_2$ with $T_1 C_1$. This will determine the next bit in the key. So, which is greater; 11×9.3×70=7161; 7×15.8×70=7742; or 20×15.8× 9.3=2938.8? In this case the combination with the greatest probability is 7×15.8×70=7742, which corresponds to $C_2$ with $T_1 L_1$. So, $C_2$ is selected as the next bit in the bit hierarchy key.

The next bit is selected in the same way. Which combination is more probable: $C_3$ with $T_1 L_1$, or $T_2$ with $C_1$ or $C_2$ and $L_1$, or $L_2$ with $C_1$ or $C_2$ and $T_1$. For the example shown, which has the greatest probability: 8.8×15.8×70=9732.8; 11=(9.3+7)=70=12551; or 20=(9.3+7)×15.8=5150.8? In this case the combination with the greatest probability is 11× (9.3+7)×70=12551, which corresponds $T_2$ with $C_1$ or $C_2$ and $L_1$. So, $T_2$ is selected as the next bit in the bit hierarchy key. This procedure is repeated for all the differential probabilities until the entire key is found.

Alternately, the bit hierarchy key can be just some arbitrary sequence of the bits. It is also possible to make the priority vectors interdependent, such as making the length priority vector dependent on different groups of channels. Another technique is to make the bit hierarchy key 120 and the priority vector tables 122, a function of clock 42, as shown in FIG. 7. This makes it very difficult for the key and therefore the coding technique to be duplicated or copied.

For example it is possible to scramble the date bits in the bit hierarchy key 120 as a function of the clock. Changing the order of the bits as a function of the clock would not change the effectiveness of the bit hierarchy key in reducing the number of binary bits for the most popular programs, because the date bits all are of equal priority. This could be as simple as switching the $D_1$ and $D_5$ bits periodically, such as every day or week. Thus the bit hierarchy key 120 would switch between $\ldots C_1\, T_1\, L\, D_5\, D_4\, D_3\, D_2\, D_1$, and $\ldots C_1\, T_1\, L_1\, D_5\, D_4\, D_3\, D_2\, D_5$.

Clearly other permutations of the bit hierarchy key as a function of the clock are possible.

The priority vector tables could also be scrambled as a function of the clock. For example, the first two channels in the priority channel table could just be swapped periodically. If this technique is followed, then the $C_p$ of 148 in FIG. 7 would change as a function of the clock 42. For example,

| channel  | 4 | 7 | 2 | 3 | 5 | 6 | 11 | 13 | ... |
|---|---|---|---|---|---|---|---|---|---|
| priority | 0 | 1 | 2 | 3 | 4 | 5 | 6  | 7  | ... | would change periodically to:

| channel  | 7 | 4 | 2 | 3 | 5 | 6 | 11 | 13 | ... |
|---|---|---|---|---|---|---|---|---|---|
| priority | 0 | 1 | 2 | 3 | 4 | 5 | 6  | 7  | ... |

This would be a fairly subtle security technique, because a decoder that was otherwise correct would only fail if those first two channels were being used. Other clock dependencies are also possible to provide security for the coding technique.

However it is derived, the bit hierarchy key 120 is determined and stored. In step 154 the binary bits of $C_p, D_p, T_p, L_p$ are rearranged according to the bit hierarchy key 120 to create one 22 bit binary number. Then the resulting 22 bit binary number is converted to decimal in the convert binary number to decimal G-code step 156. The result is G-code 158.

If the priority vector and the bit hierarchy key are well matched to the viewing habits of the general population, then it is expected that the more popular programs would require no more than 3 or 4 digits for the G-code.

Now that the encoding technique has been explained the decoding technique is just reversing the coding technique. This is done according to the flow chart of FIG. 6. This is the preferred G-code decoding that can be built into G-code decoder 38 in VCR 14 or the remote controller G-code decoders 82 and 92 in FIGS. 3 and 5.

The first step 102 is to enter G-code 104. Next the G-code 104 is converted to a 22 bit binary number in step 106. Then the bits are reordered in step 108 according to the bit hierarchy key 120 to obtain the reordered bits 110. Then the bits are grouped together and converted to decimal form in step 112. As this point we obtain $C_p, D_p, T_p, L_p$ data 114, which are the indices to the priority vector tables. For the above example, we would have at this step the vector 4 9 1 3. This $C_p, D_p, T_p, L_p$ data 114 is then used in step 116 to lookup channel, date, time, and length in priority vector storage 122; The CDTL 118 for the example above is 5 10 19.00 1.5, which means channel 5, 10th day of the month, 7:00 PM, and 1.5 hours in length.

If the coding technique is a function of the clock then it is also necessary to make the decoding technique a function of the clock. It is possible to make the bit hierarchy key 120 and the priority vector tables 122, a function of clock 42, as shown in FIG. 6. This again makes it very difficult for the key and therefore the coding technique to be duplicated or copied. It is also possible to have the decoding and encoding techniques dependent on any other predetermined or pre-programmable algorithm.

Although the above G-code encoding and decoding technique is a preferred embodiment, it should be understood that there are many. ways to perform the intent of the invention which is to reduce the number of keystrokes required for timer preprogramming. To accomplish this goal there are many ways to perform the G-code encoding and decoding. There are also many ways to make the encoding and decoding technique more secure besides just making the encoding and decoding a function of the clock. This security can be the result of any predetermined or preprogrammed algorithm.

It is possible in the G-code coding and decoding techniques to use mixed radix number systems instead of binary numbers. For example, suppose that there are only 35 channels, which would require 6 binary bits to be represented; however, 6 binary bits can represent 64 channels, because $2^6=64$. The result is that in a binary number system there are 29 unnecessary positions. This can have the effect of possibly making a particular G-code longer than it really needs to be. A mixed radix number system can avoid this result. For example, for the case of 35 channels, a mixed radix number system with the factors of $7^1$ and $5^0$ can represent 35 combinations without any empty space in the code. The allowed numbers for the $7^1$ factor are 0, 1, 2, 3, and 4. The allowed numbers for the $5^0$ factor are 0, 1, 2, 3, 4, 5, and 6. For example, digital 0 is represented in the mixed radix number system as 00. The digital number 34 is represented in the mixed radix number system as 46, because $4*7^1+6*5^0=34$. The major advantage of a mixed radix number system is in prioritizing the hierarchy key. If the first 5 channels have about equal priority and the next 30 are also about equal, then the mixed radix number system allows the two tiers to be accurately represented. This is not to say that a mixed radix number system is necessarily preferable. Binary numbers are easier to represent in a computer and use of a fixed radix number system such as binary numbers allows a pyramid of prioritization to be easily represented in the hierarchy key.

Another feature that is desirable in all of the embodiments is the capability to key in the G-code once for a program and then have the resulting CDTL information used daily or weekly. Ordinarily the CDTL information is discarded once it is used. In the case of daily or weekly recording of the same program, the CDTL information is stored and used until it is cancelled. The desire to repeat the program daily or weekly can be performed by having a "WEEKLY" or "DAILY" button on the remote controller or built into the VCR manual controls. Another way is to use one key, such as the PROG key and push it multiple times within a certain period of time such as twice to specify daily or thrice to specify weekly. For example, if the G-code switch is "ON" and the G-code for the desired program is 99 then daily recording of the program can be selected by the following keystrokes:

"PROG 99 DAILY PROG"

or by:

"PROG 99 PROG PROG".

The G-code 99 would be converted to CDTL information, which would be stored and used daily in this case. The recording would begin on the date specified and continue daily after that using the same channel time and length information. A slight twist is that daily recording could be automatically suspended during the weekends, because most daily programs are different on Saturday and Sunday.

Once a daily or weekly program is set up, then it can be used indefinitely. If it is desired to cancel a program and if there is a "CANCEL" button on the remote controller or manual control for the VCR, then one way to cancel a program (whether it is a normal CDTL, daily or weekly entry) is to key in the following:

"PROG xx CANCEL", where xx is the G-code. Again as before there are alternate ways of accomplishing this.

If "on screen programming" is available, then the programs that have been selected for timer preprogramming could be reviewed on the screen. The daily and weekly programs would have an indication of their type. Also the G-codes could be displayed along with the corresponding CDTL information. This would make it quite easy to review the current "menu" and either add more programs or cancel programs as desired.

A television calendar 200 according to this invention is illustrated in FIG. 8. As shown, the television calendar has multiple day of year sections 202, multiple day sections 204, multiple time of day sections 206, channel identifiers 208, and descriptive program identifiers 210, including the name of the program, arranged in a manner that is common in television guide publications. Arranged in relation to each channel identifier is a compressed code indication 212 or G-code containing the channel, date, time and length information for that entry in the television calendar. FIG. 8 shows how easy it is to perform timer programming. All one needs to do is find the program one wants to watch and enter the compressed code shown in the compressed code indication. This is in contrast to having to deal with all the channel, date, time and length entries separately. At least the channel, date and time are explicitly stated in the television guide. The length is usually only available by searching the guide to find the time of day section 204 where a new program begins and then performing some arithmetic to find the length of the program. Using the compressed G-code avoids all these complications.

For cable television programs, there is an additional issue that needs to be addressed for the compressed G-code to be useful. In a normal television guide, CDTL information is available for all the normal broadcast channels in the form of numbers including the channel numbers, such as channel 4 or 7. However, for cable channels like HBO, ESPN etc., only the names of the channels are provided in most television listings. The reason for this is that in some metropolitan areas, such as Los Angeles, there may be only one (1) edition of television guide, but there may be quite a few cable carriers, each of which may assign HBO or ESPN to different cable channel numbers. In order for a compressed code such as the G-code to be applicable to the cable channels as published by a wide area television guide publication, the following approach can be used.

First, all the cable channels would be permanently assigned a unique number, which would be valid across the nation. For example, we could assign ESPN to cable channel 1, HBO as cable channel 2, SHO as cable channel 3, etc. This assignment would be published by the television guide publications.

The video cassette recorder apparatus, such as the remote controller, the VCR unit or both, could then be provided with two (2) extra modes: "set" and "cable channel". One way of providing the user interface to these modes would be to provide two (2) extra buttons: one called SET and one called CABLE CHANNEL. The buttons could be located on the video cassette recorder unit itself or located on a remote controller, as shown in FIGS. 1, 3 and 5, where SET is element 168 and CABLE CHANNEL is element 170. Of course, other user interfaces are possible.

Next, the television viewer would have to go through a one-time "setting" procedure of his VCR for all the cable channels that he would likely watch. This "setting" procedure would relate each of the assigned numbers for each cable channel to the channel number of the local cable carrier. For example, suppose that the local cable carrier uses channel 6 for ESPN, then cable channel number 1 could be assigned to ESPN, as shown in the following table.

| Cable Channel Name | Assigned Cable Chan. No. | Channel Number in the local cable carrier |
|---|---|---|
| EPSN | 1 | 6 |
| HBO | 2 | 24 |
| SHO | 3 | 23 |
| . | . | . |
| . | . | . |
| . | . | . |
| DIS | 8 | 25 |

The user could perform the "setting" procedure by pushing the buttons on his remote controller as follows:

SET 06 CABLE CHANNEL 1 PROGRAM

SET 24 CABLE CHANNEL 2 PROGRAM

SET 23 CABLE CHANNEL 3 PROGRAM

SET 25 CABLE CHANNEL 8 PROGRAM

The "setting" procedure would create a cable channel address table 162, which would be loaded into RAM 52 of command controller 36. For the above example, the cable channel address table 162 would have the following information.

| CABLE CHANNEL ADDRESS TABLE 162 | |
|---|---|
| 1 | 6 |
| 2 | 24 |
| 3 | 23 |
| . | |
| . | |
| 8 | 25 |

After the "setting" procedure is performed, the TV viewer can now select cable channels for viewing by the old way: eg. pushing the key pad buttons 24 will select HBO. He can also do it the new way: eg. by pushing CABLE CHANNEL 2, which will also select HBO. The advantage of the new way is that the television guide will publish [C2] next to the program description, so the viewer will just look up the assigned channel number identifier instead of having to remember that HBO is local cable channel 24. When the CABLE CHANNEL button is pushed, command controller 36 knows that it will look up the local cable channel number in cable channel address table 162 to tune the VCR to the correct channel.

For timer preprogramming and for using the compressed G-code, a way to differentiate between broadcast and cable channels is to add an eighth channel bit, which would be set to 0 for normal broadcast channels and 1 for cable channels such as HBO. This eighth channel bit could be one of the low order bits such as the third bit $C_3$ out of the eight channel bits, so that the number of bits to specify popular channels is minimized, whether they be normal broadcast or cable channels. For a normal broadcast channel, the 7 other bits can be decoded according to priority vector C table 124. For a cable channel, the 7 other bits can be decoded according to a separate cable channel priority vector table 160, which could be stored in ROM 54 of microcontroller 36. The cable channel priority vector table can be set ahead of time for the entire country or at least for an area covered by a particular wide area television guide publication.

A television guide that carries the compressed code known as the G-code will now print the cable channel information as follows:

|  | 6:30 pm | |
|---|---|---|
| [C2] | HBO xxxxxxxxxxxxxxxxxxxxxxxxxxxxxx<br>xxxxxx(program description)xxxxxxxxxx<br>xxxxxxxxxxxxxxxxxxxxxxxxxxxxxxxxx | (4679) |

The [C2] in front of HBO reminds the viewer that he needs only to push CABLE CHANNEL 2 to select HBO. The (4679) is the G-code indication for this particular program.

FIG. 8 shows a section of a television guide. The cable channels all have an assigned cable channel number 188 after the cable channel mnemonic. Other than that the cable channel information is arranged the same as the broadcast channels with a compressed G-code 212 associated with the channel.

For timer preprogramming, the viewer need only enter the number 4679 according to the unit's G-code entry procedure, eg. PROG 4679 PROG. The G-code decoder unit will decode this G-code into "cable channel 2" and will also signal the command controller 36 with a cable channel signal 164, as shown in FIGS. 1 and 2, because the extra channel bit will be "1" which distinguishes that the G-code is for a cable channel; then, since the association of "cable channel 2" with channel 24 has been established earlier in the "setting" procedure, the command controller, if it has received a cable channel signal, will immediately look up 2 in the cable channel address table 162 to translate it to cable channel 24, which will be used as the recording channel at the appropriate time. By associating the G-code with the assigned cable channel number rather than the local cable channel number, the G-code for that program will be valid in the whole local area, which may have many different cable carriers each of which may have different local cable channel numbers.

Figure 10:
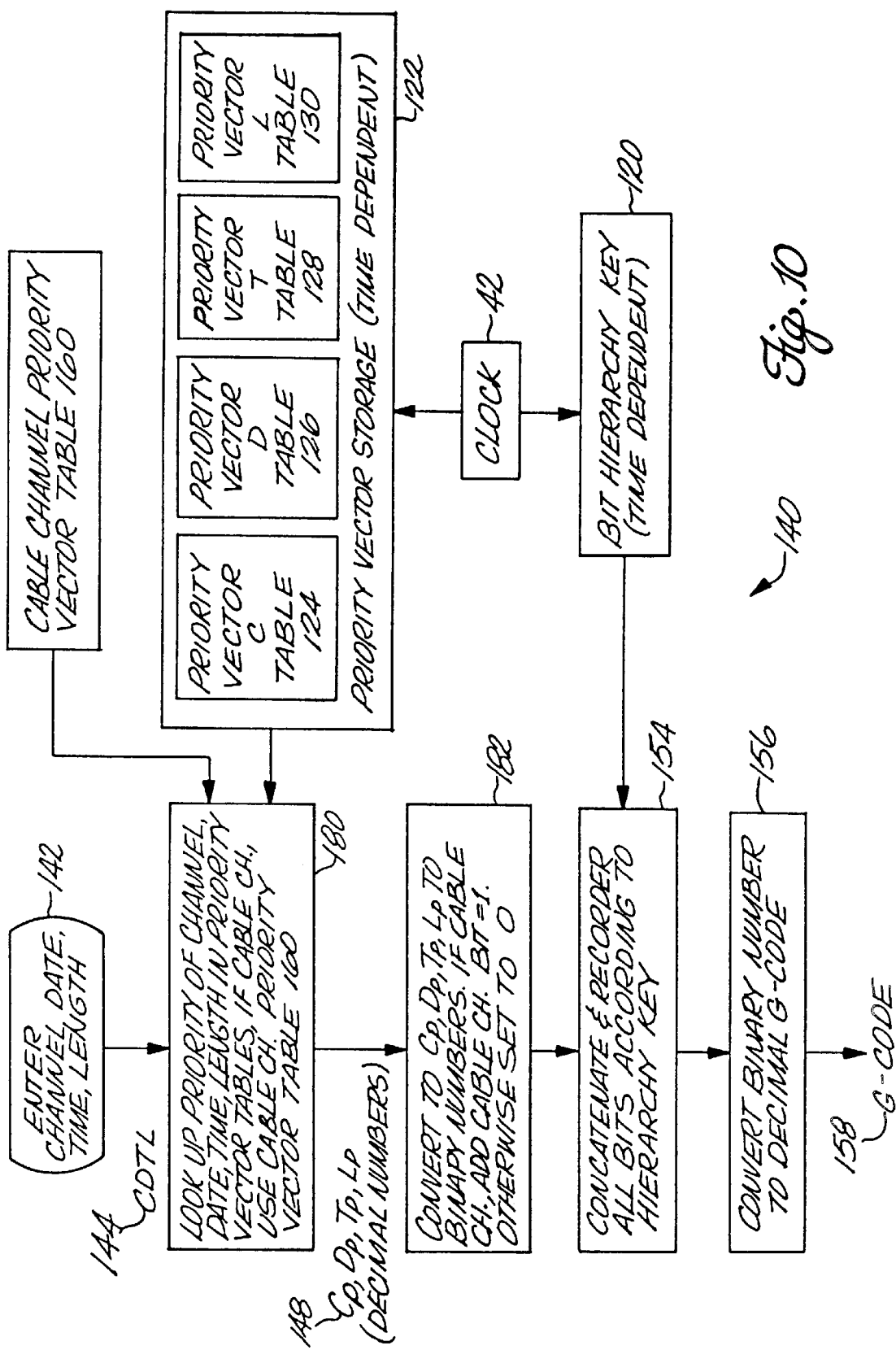
FIG. 10 is a flowchart for encoding for cable channels.

To include the cable channel compressed G-code feature, the decoding and encoding algorithms are as shown in FIGS. 9 and 10, respectively. The encoding should be explained first before the decoding. The primary change in FIG. 10 from FIG. 7 is that a cable channel priority vector table 160 has been added and is used in look up priority step 180 if a cable channel is being encoded. Also if a cable channel is being encoded then the cable channel bit is added in the correct bit position in the convert $C_p D_p T_p L_p$ to binary numbers step 182. This could be bit $C_3$, as discussed before. The bit hierarchy key could be determined as before to compress the number of bits in the most popular programs; however, it needs to be 23 bits long to accommodate the cable channel bit. The maximum compressed G-code length could still be 7 digits, because $2^{23}$=8,388,608.

The decoding is shown in FIG. 9 and is just the reverse of the encoding process. After step 108, test cable channel bit 174 is added and effectively tests the cable channel bit to determine if it is a "1". If so then the command controller 36 is signaled via cable channel signal 164 of FIGS. 1 and 2 that the CDTL 118 that will be sent to it from G-code decoder 38 is for a cable channel. Then the command controller knows to look up the local cable carrier channel number based on the assigned cable channel number. In step 176 of FIG. 9, the priority vector tables including the cable channel priority vector table 160 are used to look up the CDTL 118 information.

Figure 11:
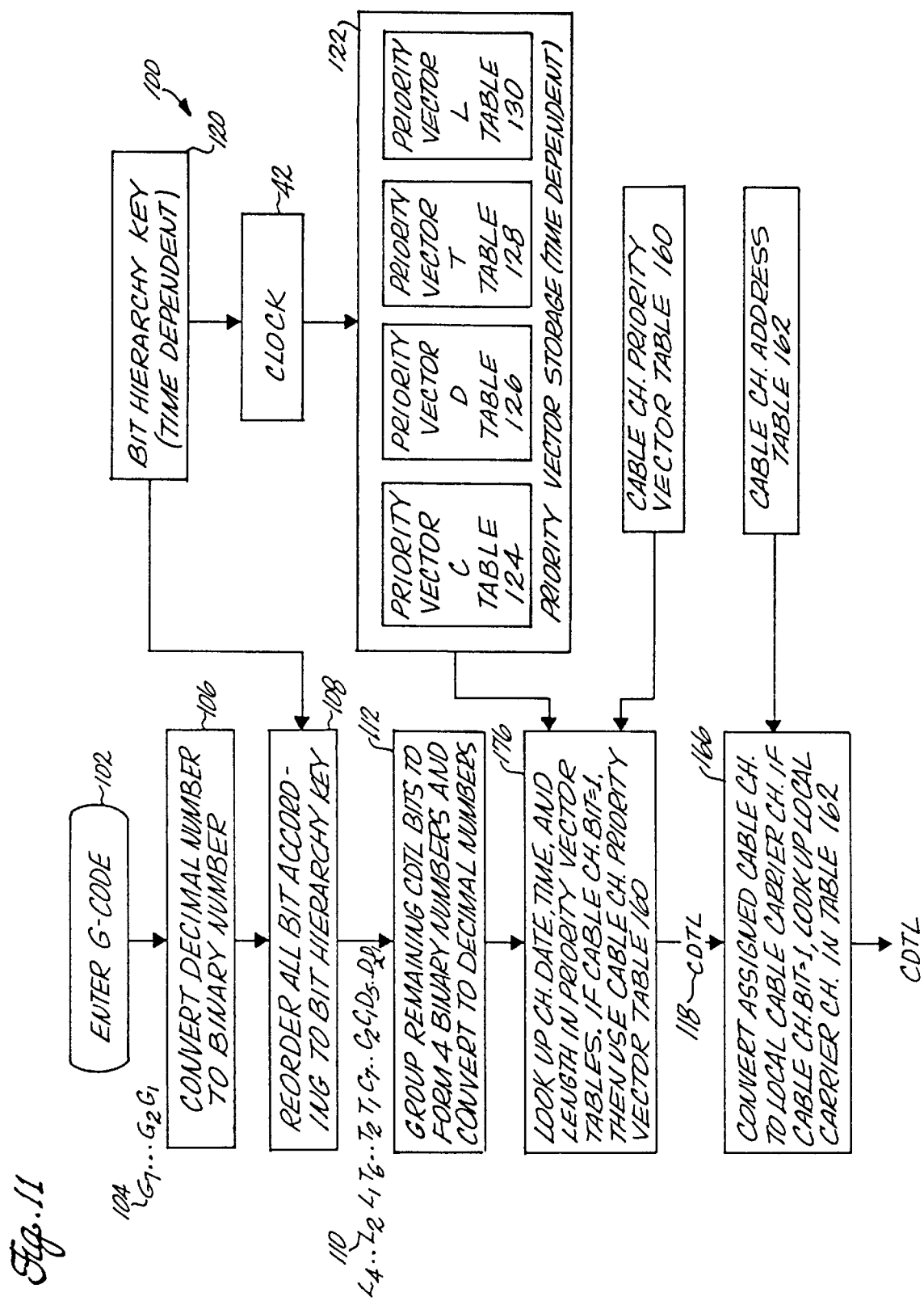
FIG. 11. is a flow graph of the G-code decoding for cable channels including conversion from assigned cable channel number to local cable carrier channel number.

An alternate to having the command controller receive a cable channel signal 164 is for the G-code decoder to perform all of the decoding including the conversion from assigned cable channel number to local cable carrier number. This would be the case for the remote controller implementation of FIG. 3. FIG. 11 shows the implementation of the entire decode algorithm if this step is included. All that needs to be added is convert assigned channel to local cable carrier channel step 166, which performs a lookup in cable channel address table 162, if the cable channel bit indicates that a cable channel is involved. Step 166 effectively replaces step 174 in FIG. 9.

Another issue that needs addressing is the number of programs that can be preprogrammed. Since the G-code greatly simplifies the process of entering programs, it is likely that the user will quickly learn and want to enter a large number of programs; however, some existing VCRs can only store up to four (4) programs, while some can store as many as eight. Thus, the user may get easily frustrated by the programming limitations of the VCR.

Figure 12:
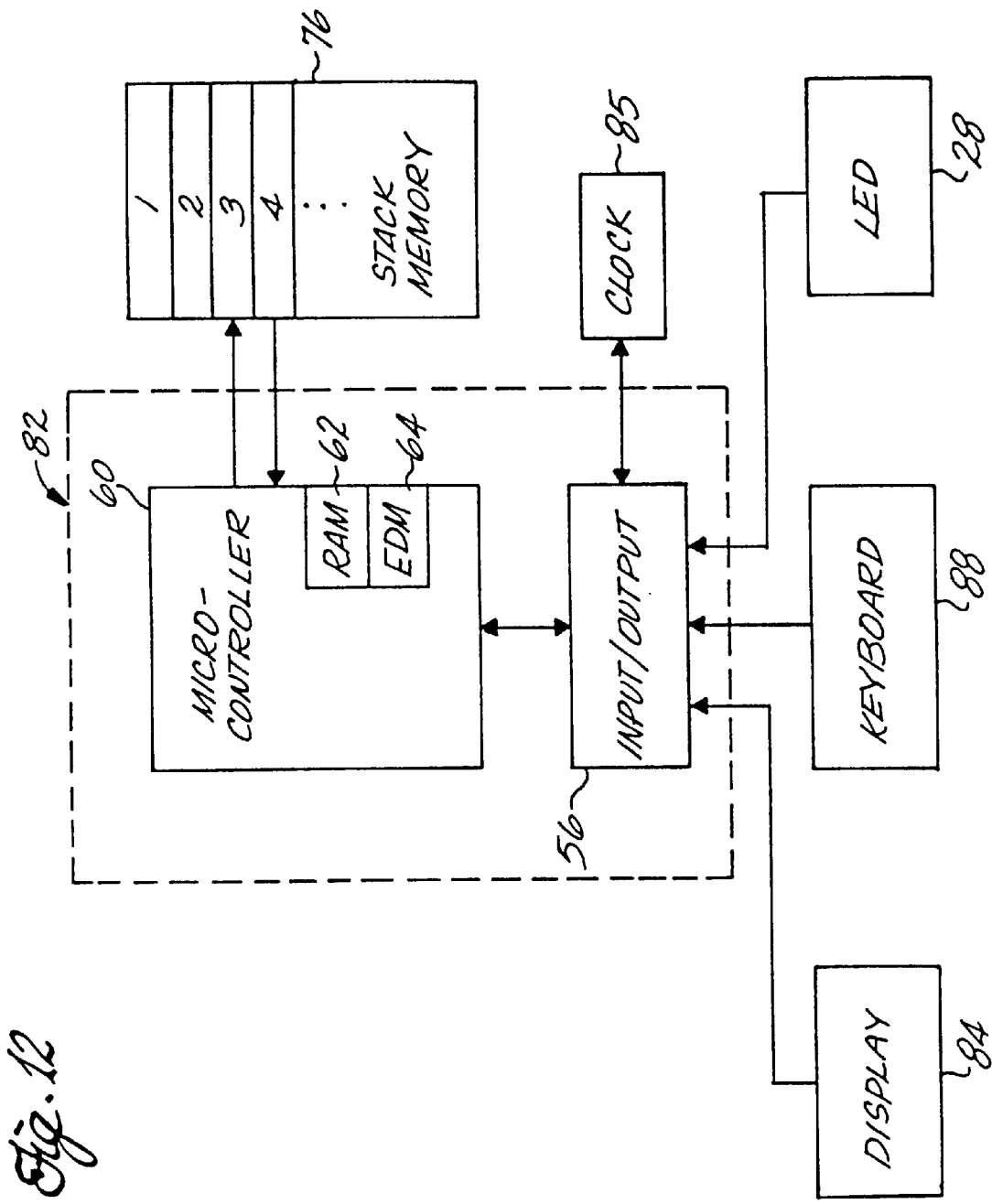
FIG. 12 is a means for decoding including a stack memory.

One approach to this problem, is to perform the compressed G-code decoding in the remote controller and provide enough memory there to store a large number of programs, eg. 20 or 40. The remote controller would have the capability of transferring periodically several of these stored programs at a time to the VCR main unit. To provide this capability, extra memory called stack memory 76 is required inside the remote unit, as shown in FIG. 12, which other than that is identical to FIG. 4. Stack memory 76 can be implemented with a random access memory, which may in fact reside in the microcontroller itself, such as RAM 62.

The stack memory 76 is where new entry, insertion & deletion of timer preprogramming information is carried out. It is also where editing takes place. The top memory locations of the stack, for example the first 4 locations, correspond exactly to the available timer preprogramming memory in the VCR main unit. Whenever the top of the stack memory is changed, the new information will be sent over to the VCR main unit to update it.

Figure 13:
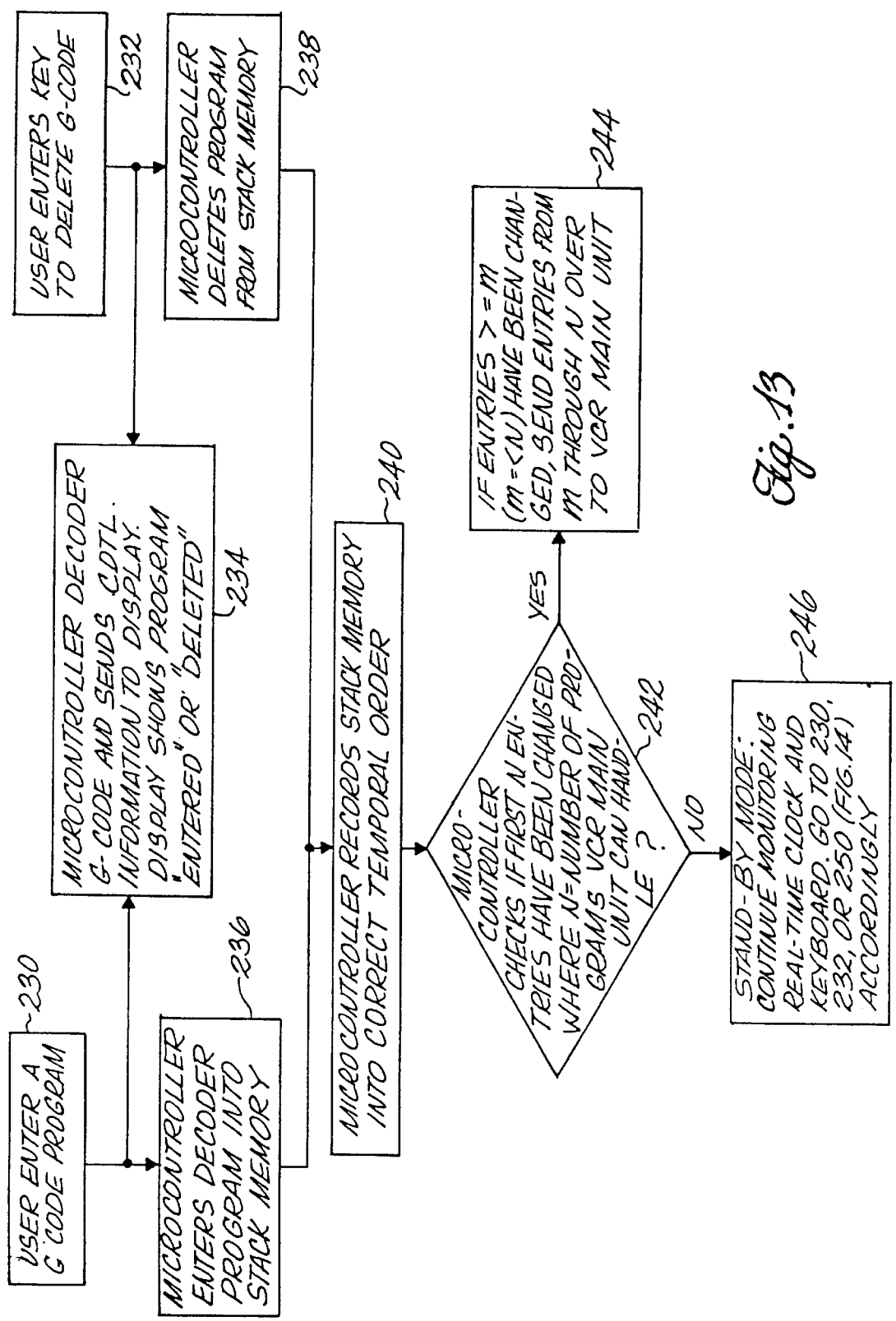
FIG. 13 is a flowchart for program entry into stack memory.

FIG. 13 shows the sequence of events when the user enters a G-code program on the keypad of the remote controller. For illustration purposes, suppose the VCR main unit can only handle four (4) programs. Suppose also that the stack memory capacity is 20 timer preprograms. Referring to the flow chart in FIG. 13, when the user enters a G-code in step 230, the microcontroller 60 first decodes it into the CDTL information in step 234 and displays it on the display unit with the additional word "entered" also displayed. The microcontroller then enters the decoded program into the stack memory in step 236.

If this is the first program entered, it is placed at the top location of the stack memory. If there are already programs in the stack memory, the newly entered program will first be provisionally placed at the bottom of the stack memory. The stack memory will then be sorted into the correct temporal order in step 240, so that the earliest program in time will appear in the top location and the last program in time will be at the bottom. Notice that the nature of the temporally sorted stack memory is such that if stack memory location n is altered, then all the locations below it will be altered.

For example, suppose the stack memory has six (6) entries already temporally ordered, and a new entry is entered whose temporal ordering places it in location 3 (1 being the top location). If this entry is placed into location 3, information which was in location 3, 4, 5, 6 will be shifted to locations 4, 5, 6, and 7. Locations 1 and 2 will remain unchanged.

The microcontroller 60, after doing the temporal ordering, checks in step 242 whether the first n entries have changed from before, where for the current example n equals 4. In this case, since a new program has been entered into location 3, what used to be in location 3 now moves to location 4. Since the VCR's main unit program menu of 4 entries should correspond exactly to location 1 through 4 of the stack memory, entries 3 and 4 on the VCR main unit must now be revised. The microcontroller therefore sends out the new entries 3 & 4 to the main unit, in step 244 of FIG. 13. If the newly entered program, after temporal ordering, gets entered into location 5, then entries 1 through 4 have not changed from before and the microcontroller will not send any message to the VCR main unit and the microcontroller will just resume monitoring the clock 85 and the keyboard 88 as per step 246. It is assumed that when the user enters the G-code in step 230, the remote controller is pointed at the VCR main unit. The other steps of FIG. 13 happen so fast that the changes are sent in step 244 while the remote controller is still being pointed at the VCR main unit.

If the user decides to delete a program in step 232, the deletion is first carried out in the stack memory. If the first 4 entries are affected, the microcontroller will send the revised information over to the VCR main unit. If the first 4 entries are not affected, then again the remote controller unit will not send anything. The deletion will only change the lower part of the stack (lower meaning location 5 to 20). This new information will be sent over to the VCR main unit at the appropriate time.

In the meantime, the VCR main unit will be carrying out its timer programming function, completing its timing preprogramming entries one by one. By the time all 4 recording entries have been completed, the stack in the remote must send some new entries over to "replenish" the VCR main unit (if the stack has more than 4 entries).

Figure 14:
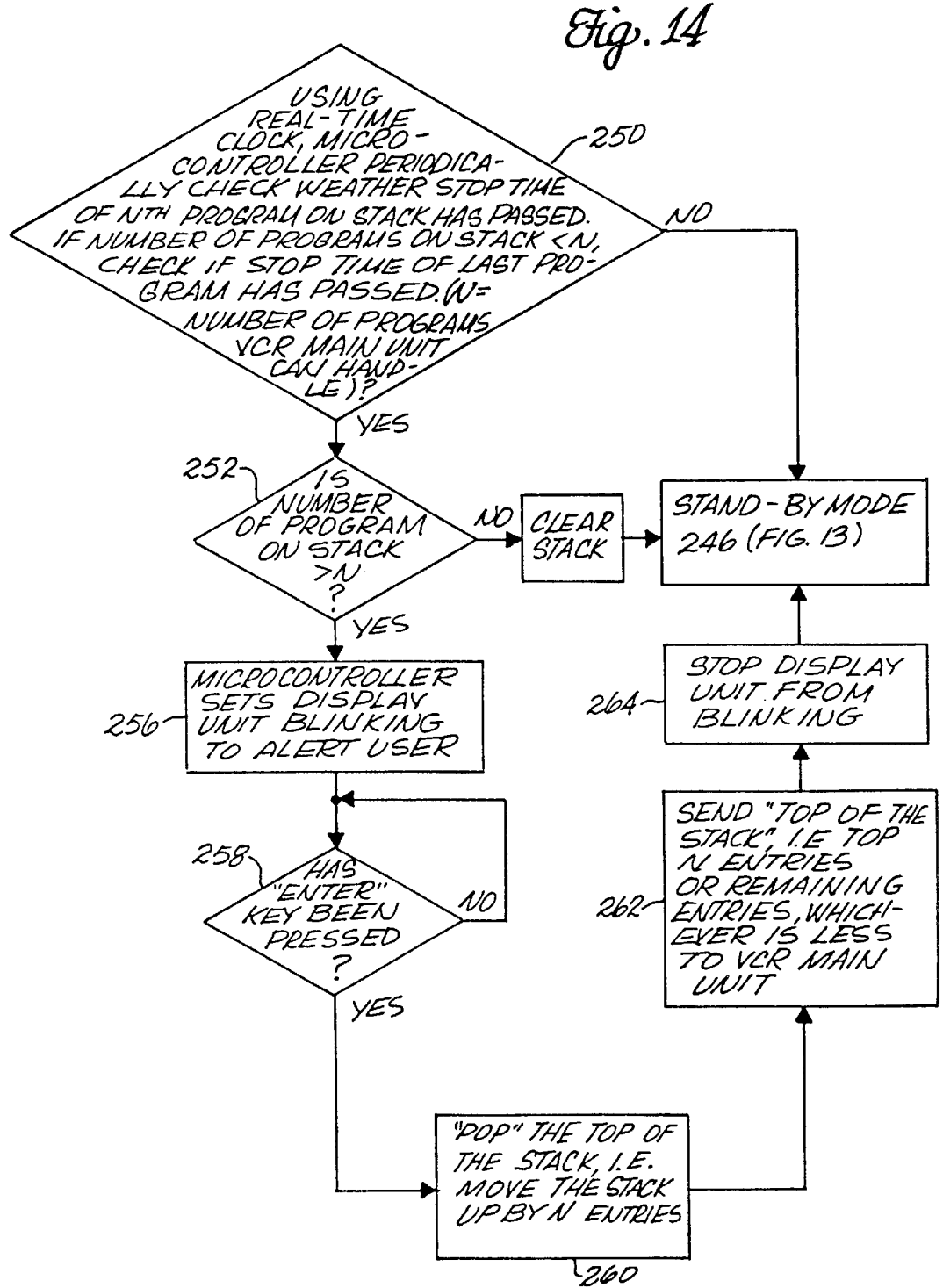
FIG. 14 is an operation flowchart for sending programs from remote control to main unit VCR.

The real time clock 85 in the remote controller unit is monitored by the microcontroller to determine when the programs in the main unit have been used up. Referring to the flow chart in FIG. 14, the microcontroller periodically checks the clock and the times for the programs at the top of the stack in step 250 (say the first 4 entries), which are identical to the VCR's main unit's menu. If on one of the periodic checks, it is determined that the recording of the main unit's menu is complete, then if there are more entries in the stack, which is tested in step 252, the display unit will be set to a blinking mode or display a blinking message in step 258 to alert the user to send more programs. Next time the user picks up the remote unit, the blinking will remind him that the VCR main unit's program menu has been completed and it is time to replenish the VCR main unit with program entries stored in the remote. The user simply picks up the remote and points it towards the VCR main unit and presses "ENTER". This will "pop" the top of the stack memory in step 260, ie. pop all the entries in the stack up by four locations. The microcontroller will then send the new "top of the stack" (ie. top 4 entries) over to the VCR main unit in step 262. This process will repeat until the whole stack has been emptied.

Figure 15:
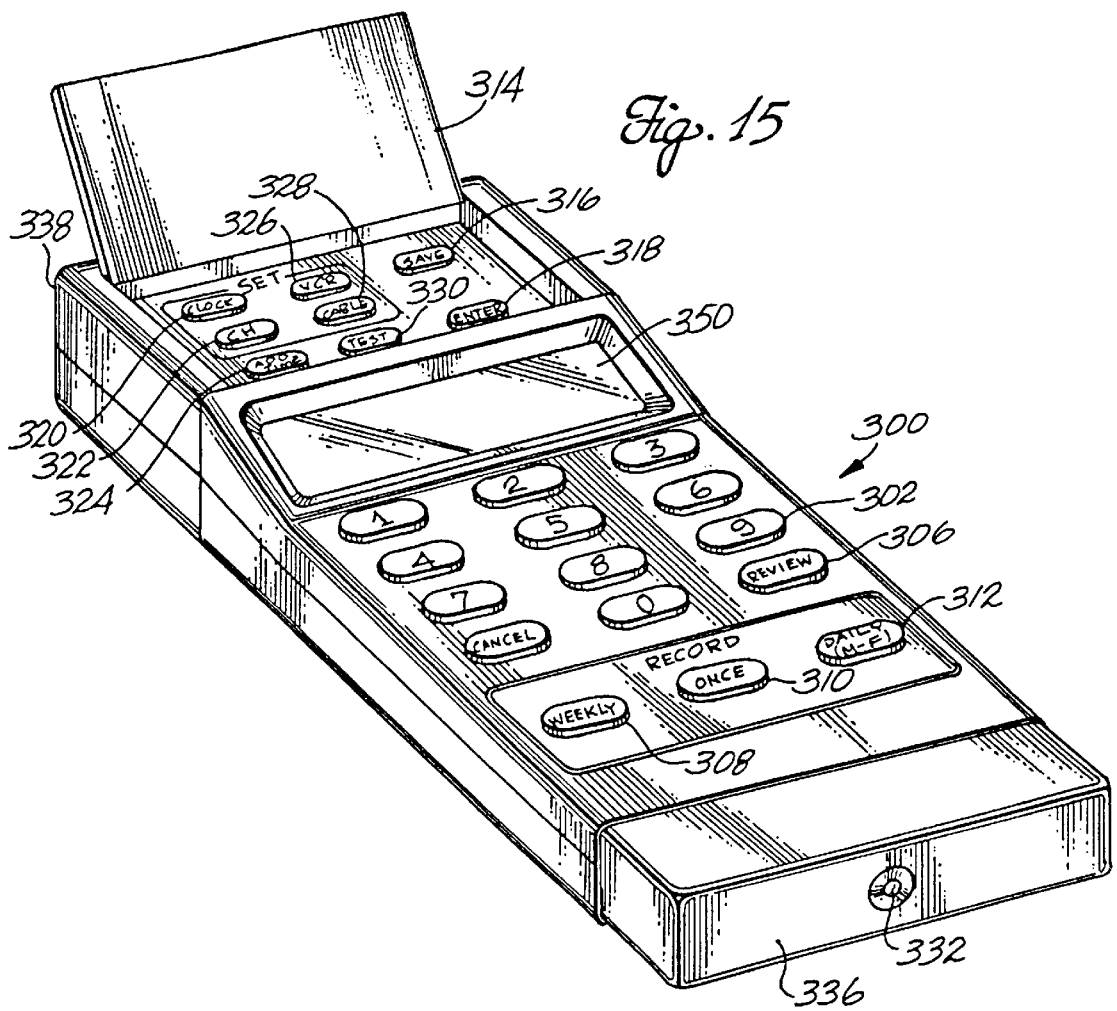
FIG. 15 is a perspective view of an apparatus for using compressed codes for recorder prepregramming according to a preferred embodiment of the invention.
Figure 16:
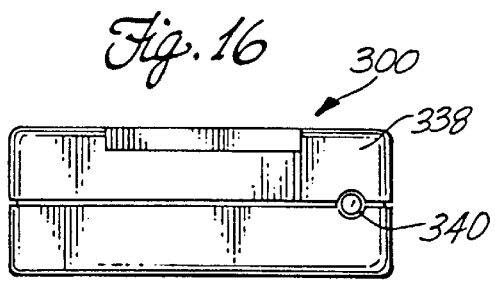
FIG. 16 is a front view of the apparatus of FIG. 15 showing a forward facing light emitting diode.
Figure 19:
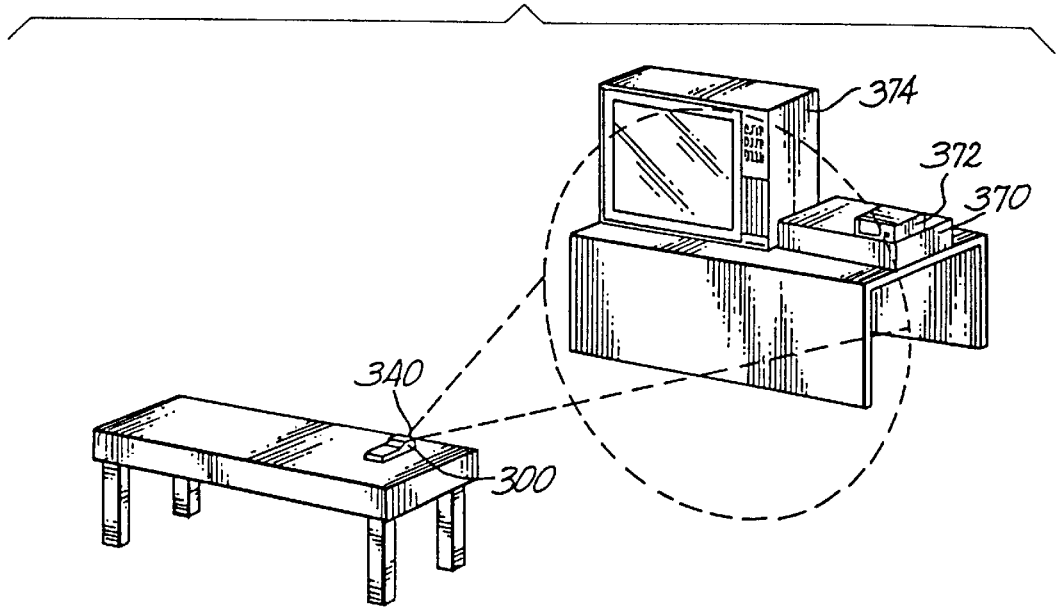
FIG. 19 is a perspective view showing a manner of placing the apparatus of FIG. 15 relative to a cable box and a VCR.

Another preferred embodiment of an apparatus for using compressed codes for recorder preprogramming is the instant programmer 300 of FIG. 15. The instant programmer 300 has number keys 302, which are numbered 0 through 9, a CANCEL key 304, a REVIEW key 306, a WEEKLY key 308, a ONCE key 310 and a DAILY (M–F) key 312, which are used to program the instant programmer 300. A lid normally covers other keys, which are used to setup the instant programmer 300. When lid 314 is lifted, the following keys are revealed: SAVE key 316, ENTER key 318, CLOCK key 320, CH key 322, ADD TIME key 324, VCR key 326, CABLE key 328, and TEST key 330. Other features of instant programmer 300 shown on FIG. 15 are: liquid crystal display 350 and red warning light emitting diode 332. The front elevation view FIG. 16 of instant programmer 300 shows front infrared (IR) diode 340 mounted on the front side 338. By placing instant programmer 300 in front of the equipment to be programmed such as video cassette recorder 370, cable box 372, and television 374, as shown in FIG. 19, the front infrared (IR) diode 340 can transmit signals to control program recording. An IR transparent cover 336 covers additional IR transmission diodes, which are explained below.

Figure 18:
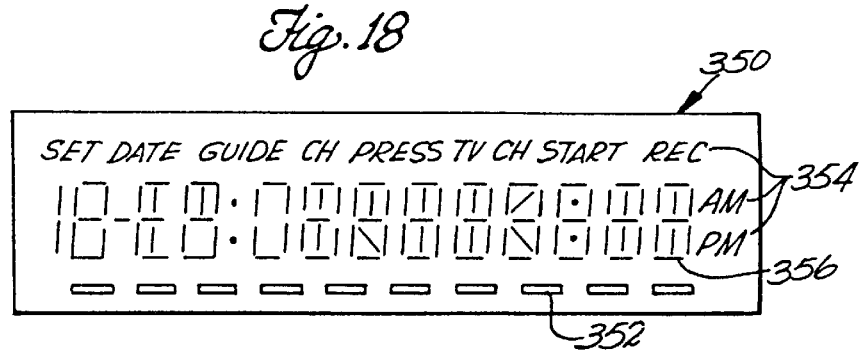
FIG. 18 is a detail of the LCD display of the apparatus of FIG. 15.

FIG. 18 shows a detail of the liquid crystal display 350. Certain text 354 is at various times visible on the display and there is an entry area 356. Time bars 352 are displayed at the bottom of the display and their function is described below.

Figure 17:
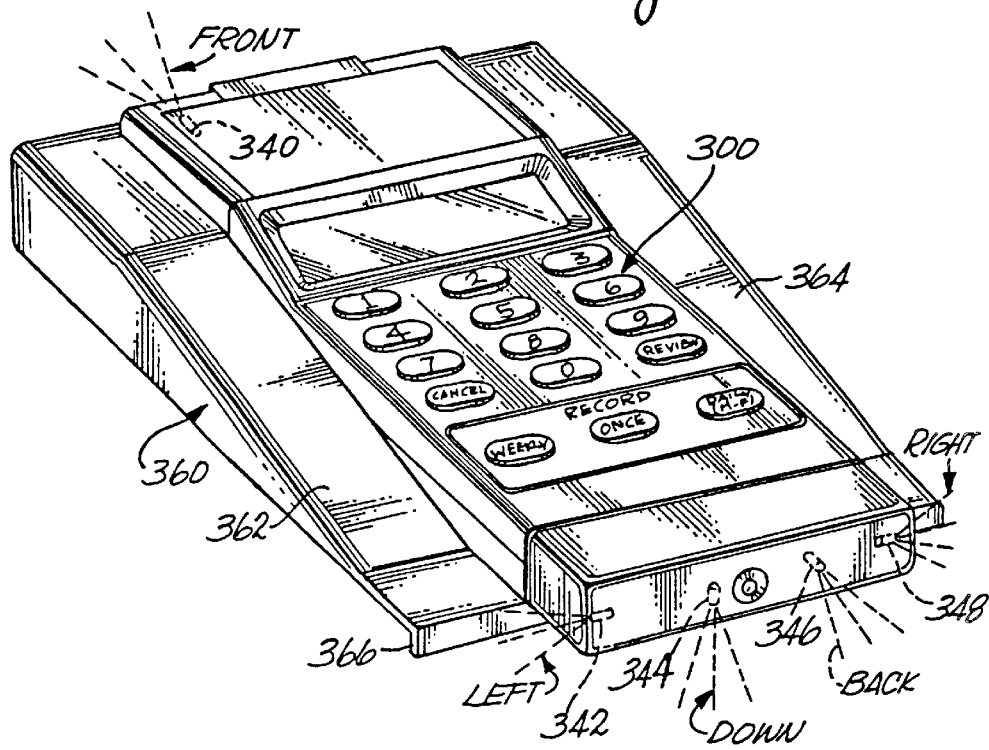
FIG. 17 is a perspective view of the apparatus of FIG. 15 placed in a mounting stand.
Figure 20:
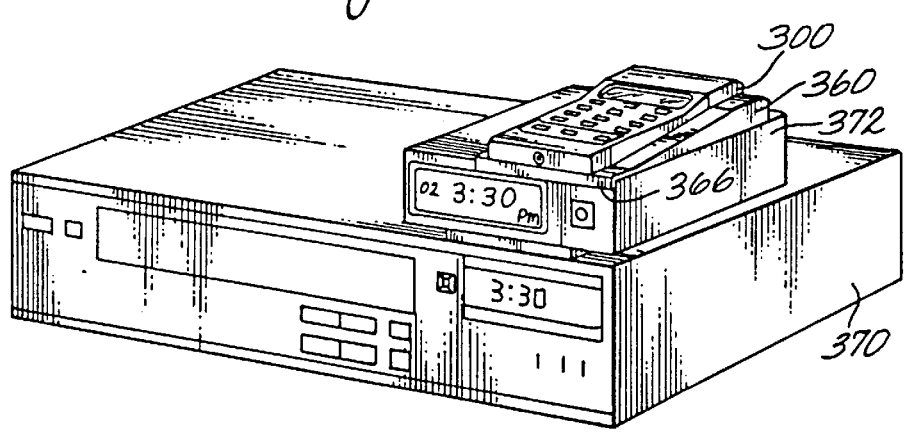
FIG. 20 is a perspective view showing a manner of placing the mounting stand with the apparatus of FIG. 15 mounted thereon near a cable box and VCR.

A companion element to the instant programmer 300 is the mounting stand 360, shown in FIG. 17, which is designed to hold instant programmer 300 between left raised side 362 and right raised side 364. The instant programmer 300 is slid between left raised side 362 and right raised side 364 until coming to a stop at a front alignment flange, which is at the front of mounting stand 360 and connected across left raised side 362 and right raised side 364. Together elements 362, 364 and the front alignment flange provide alignment for instant programmer 300 so that IR transparent cover 336 and the IR diodes 342, 344, 346 and 348, shown in FIG. 17 are properly aligned for transmission, when the instant programmer is used as shown in FIG. 20. The mounting stand 360 has an alignment flange 366, which has the purpose of aligning the back edge of mounting stand 360, which is defined as the edge along which alignment flange 366 is located, along the front side of a cable box or VCR, or similar unit as shown in FIG. 20. When aligned as shown in FIG. 20, the mounting stand 360 aligns the instant programmer 300 so that the left IR diode 342, down IR diode 344, two back IR diodes 346 and right IR diode 348, as shown in FIG. 17, are in position to transmit signals to video cassette recorder 370 and cable box 372, as necessary. If the VCR and/or cable box functions are located within the television 374 itself, then the instant programmer 300 could be positioned to transmit to the television 374, either in the manner of FIG. 19 or by placing the mounting stand on top of the television in the manner of FIG. 20.

By using mounting stand 360, the user only need to align the mounting stand 360, and the instant programmer 300 once with the equipment to be programmed rather than having the user remember to keep the instant programmer 300 in the correct location to transmit via front infrared (IR) diode 340, as shown in FIG. 19. Current experience with various remote controllers shows that it is difficult at best to keep a remote controller in a fixed location, for example, on a coffee table. The mounting stand 360 solves this problem by locating the instant programmer 300 with the equipment to be controlled. The left IR diode 342, down IR diode 344, two back IR diodes 346 and right IR diode 348 are positioned to transmit to the left, downward, backward, and to the right. The downward transmitter assumes that mounting stand 360 will be placed on top of the unit to be programmed. The left and right transmission allows units to the left or right to be programmed. The backward transmission back IR diodes 346 are provided so that signals can bounce off walls and other objects in the room. The front IR diode 340, the left IR diode 342, the right IR diode 348 and the down IR diode 344 are implemented with 25 degree emitting angle diodes. Two back IR diodes are provided for greater energy in that direction and are implemented with 5 degree emitting angle diodes, which focus the energy and provide for greater reflection of the IR energy off of walls or objects in the room.

Most VCR's and cable boxes can be controlled by an infrared remote controller; however, different VCR's and cable boxes. have different IR codes. Although there are literally hundreds of different models of VCR's and cable boxes, there are fortunately only tens of sets of IR codes. Each set may have a few tens of "words" that represent the different keys required, e.g. "power", "record", "channel up", "channel down", "stop", "0", "1", "2" etc. For the purpose of controlling the VCR and cable box to do recording, only the following "words" are required: "0", "1", "2", "3", "4", "5", "6", "7", "8", "9", "power", "record", "stop". The IR codes for these words for all the sets are stored in the memory of the instant programmer 300, which is located in microcomputer 380 of FIGS. 21 and 22. During setup of the instant programmer 300, the user interactively inputs to the instant programmer 300 the type and model of his VCR and cable box. The correct set of IR codes will be recalled from memory during the actual control process. In the case where the user only has a VCR, the infrared (IR) codes for that particular VCR will be recalled to control the VCR. In the case where the user has a VCR and a cable box, the IR codes "power", "record", "stop" will be recalled from the set that corresponds to the VCR whereas the IR codes for "0" through "9" will be recalled from the set that corresponds to the cable box. The reason is that in this case, the cable box controls the channel switching. Hence the channel switching signals "0" through "9" must be sent to the cable box instead of the VCR.

Initially, the user performs a setup sequence. First, the user looks up the number corresponding to the model/brand of VCR to be programmed in a table, which lists the VCR brand name and a two digit code. Then with the VCR tuned to Channel 3 or Channel 4, whichever is normally used, the user turns the VCR "OFF". Then the user presses the VCR key 326. When the display shows VCR, the user presses the two-digit code looked up in the VCR model/brand table (for example 01 for RCA). The user points the instant programmer 300 at the VCR and then presses ENTER key 318. The red warning light emitting diode 332 will flash while it is sending a test signal to the VCR. If the VCR turned "ON" and changed to Channel 09, the user presses the SAVE key 316 and proceeds to the set clock step. If the VCR did not turn "ON" or turned "ON" but did not change to Channel 09 the user presses ENTER key 318 again and waits until red warning light emitting diode 332 stops flashing. The instant programmer 300 sends the next possible VCR code, while the red warning light emitting diode 332 is flashing. If the VCR turns "ON" and changed to Channel 09 the user presses SAVE key 316, otherwise the user presses ENTER key 318 again until the VCR code is found that works for the VCR. The display shows "END" if all possible VCR codes for that brand are tried. If so, the user presses VCR key 326 code 00 and then ENTER key 318 to try all possible codes, for all brands, one at a time.

Once the proper VCR code has been found and saved, the next setup step is to set the clock on instant programmer 300. First, the user presses the CLOCK key 320. When the display shows: "YR: ", the user presses the year (for example 90), then presses ENTER key 318. Then the display shows "MO: ", and the user presses the month (for example 07 is July), and then presses ENTER key 318. This is repeated for "DA: " date (for example 01 for the 1st), "Hr: " hour (for example 02 for 2 o'clock), "Mn: " minute (for example 05 for 5 minutes), and "AM/PM: " 1 for AM or 2 for PM. After this sequence, the display will show "SAVE" for a few seconds and then the display will show the current time and date that have been entered. It is no longer necessary for the user to set the clock on his/her VCR.

Next, if the instant programmer 300 is also to be used as a cable box controller, then the setup steps are as follows. First, the number corresponding to the model/brand of cable box (converter) to be controlled is looked up in a cable box model brand table, that lists cable box brands and corresponding two digit codes. The VCR is tuned to Channel 03 or 04 and turned "OFF". Then the cable box is tuned to Channel 02 or 03, whichever is normal, and left "ON". Then the CABLE key 328 is pressed. When the display shows: "CAB-:" the user enters the two digit code looked up in cable box model brand table, points the instant programmer 300 at the cable box (converter) and presses ENTER key 318. The red warning light emitting diode 332 will flash while it is sending a test signal to the cable box. If the cable box changed to Channel 09: then the user presses SAVE key 316; however, if the cable box did not change to Channel 09 the user presses ENTER key 318 again and waits until red warning light emitting diode 332 stops flashing, while the next possible code is sent. This is repeated until the cable box changes to Channel 09 and when it does the user presses SAVE key 316. If the display shows "END" then the user has tried all possible cable box codes for that brand. If so, the user presses cable code 00 and then ENTER key 318 to try all possible brand's codes, one at a time.

For some people (probably because they have cable or satellite), the channels listed in their television guide or calendar are different from the channels on their television or cable. If they are different, the user proceeds as follows. First, the user presses the CH key 322. The display will look like this: "Guide CH TV CH". Then the user presses the channel printed in the television guide or calendar (for example, press 02 for channel 2), and then the user presses the channel number that the printed channel is received on through his/her local cable company. Then the user presses ENTER key 318. This is repeated for each channel listing that is on a different channel than the printed channel. When this procedure is finished the user presses SAVE key 316.

Typically the television guide or calendar in the area will have a chart indicating the channel number that has been assigned to each Cable and broadcast channel, for example: HBO, CNN, ABC, CBS, NBC, etc. This chart would correspond, for example, to the left two columns of FIG. 28. For example, suppose the television guide or calendar has assigned channel 14 to HBO but the user's cable company delivers HBO on channel 18. Since the channel numbers are different, the user needs to use the CH key 322. The user will press the CH button (the two blank spaces under the display "Guide CH" will flash). The user then presses 14. (now the two blank spaces under the display "TV CH" will flash). The user then presses 18 and then ENTER key 318. This is repeated for each channel that is different. When finished, the user presses SAVE key 316.

After the channel settings have been saved, the user may review the settings by pressing CH key 322 and then REVIEW key 306. By repeated pressing of the REVIEW key 306 each of the set channels will scroll onto the display, one at a time.

Then the user can test to make sure that the location of the instant programmer 300 is a good one. First, the user makes sure that the VCR is turned "OFF" but plugged in and makes sure that the cable box (if there is one) is left "ON". Then the user can press the TEST key 330. If there is only a VCR, then if the VCR turned "ON", changed to channel 09 and started recording, and then turned "OFF", then the VCR controller is located in a good place.

If there is also a cable box, then if the VCR turned "ON", the cable box turned to channel 09 and the VCR started recording, and then the VCR stopped and turned "OFF", then the instant programmer 300 is located in a good place.

To operate the instant programmer 300, the VCR should be left OFF and the cable box ON. The user looks up in the television guide the compressed code for the program, which he/she wishes to record. The compressed code 212 is listed in the television guide, as shown in FIG. 8. The television guide/calendar that would be used with this embodiment would have the same elements as shown on FIG. 8 except that element 188 of FIG. 8 is not required. The compressed code 212 for the program selected by the user is entered into the instant programmer 300 by using the number keys 302 and then the user selects how often to record the program. The user presses the ONCE key 310 to record the program once at the scheduled time, or the user presses the WEEKLY key 308 to record the program every week at the same scheduled time until cancelled or the user presses the DAILY (M–F) key 312 to record the program each day Monday through Friday at the same scheduled time until cancelled. This is most useful for programs such as soapbox operas that air daily, but not on the weekend. To confirm the entry, the instant programmer 300 will immediately decode the compressed code and display the date, channel and start time of the program entered by the user. The length of the entered program is also displayed by time bars 352 that run across the bottom of the display. Each bar represents one hour (or less) of program.

Then the user just needs to leave the instant programmer 300 near the VCR and cable box so that commands can be transmitted, and at the right time, the instant programmer 300 will turn "ON" the VCR, change to the correct channel and record the program and then turn the VCR "OFF". The user must just make sure to insert a blank tape.

The REVIEW key 306 allows the user to step through the entered programs. These are displayed in chronological order, by date and time. Each time the REVIEW key 306 is pressed, the next program is displayed, until "END" is displayed, when all the entered programs have been displayed. If the REVIEW key 306 is pressed again the display will return to the current date and time.

If the user wishes to cancel a program, then the user presses REVIEW key 306 until the program to cancel is displayed, then the user presses CANCEL key 304. The display will say "CANCELLED". Also, any time the user presses a wrong number, pressing the CANCEL key 304 will allow the user to start over.

Certain television programs, such as live sports, may run over the scheduled time slot. To ensure that the entire program is recorded, the user may press the ADD TIME key 324 to increase the recording length, even while the program is being recorded. The user presses the REVIEW key 306 to display the program, then presses ADD TIME key 324. Each time ADD TIME key 324 is pressed; 15 minutes is added to the recording length.

When the current time and date is displayed, the amount of blank tape needed for the next 24 hours is also displayed by the time bars 352 that run across the bottom of the display. Each bar represents one hour (or less) of tape. The user should check this before leaving the VCR unattended to ensure that there is enough blank tape.

Each time a program code is entered, the instant programmer 300 automatically checks through all the entries to ensure that there is no overlap in time between the program entries. If the user attempts to enter a program that overlaps in time with a program previously entered, then the message "CLASH" appears. Then, as summarized by step 432 of FIG. 23, the user has the following options: 1) if the user wishes to leave the program previously entered and forget about the new one, the user does nothing and after a short time delay, the display will return to show the current time and date; 2) if the user wishes the program which starts first to be recorded to its end, and then to record the remainder of the second program, then the user presses ONCE key 310, DAILY (M–F) key 312, or WEEKLY key 308 again (whichever one the user pushed to enter the code). If the programs have the same starting time, then the program most recently entered will be recorded first. If on being notified of the "CLASH", the user decides the new program is more important than the previously entered program, then the user can cancel the previously entered program and then re-enter the new one.

In some locations, such as in some parts of Colorado, the cable system airs some channels three (3) hours later/earlier than the times listed in the local television guide. This is due to time differences depending on whether the channel is received on a east or west satellite feed. For the user to record the program 3 hours later than the time listed in the television guide the procedure is as follows. First the user enters the code for the program and then presses SAVE key 316 (for +) and then presses ONCE key 310, DAILY (M–F) key 312, or WEEKLY key 308, as desired. For the user to record the program 3 hours earlier than the time listed in the television guide the procedure is as follows. First the user enters the code for the program and then presses ENTER key 318 (for −) and then presses ONCE key 310, DAILY (M–F) key 312, or WEEKLY key 308, as desired. The instant programmer 300 will display the time that the program will be recorded, not the time shown in the television guide.

There are certain display messages to make the instant programmer 300 more user friendly. The display "LO BATT" indicates that the batteries need replacement. "Err: ENTRY" indicates an invalid entry during set up. "Err: CODE" indicates that the program code number entered is not a valid number. If this is displayed the user should check the television guide and reenter the number. "Err: DATE" indicates the user may have: tried to select a daily recording (Monday to Friday) for a Saturday or Sunday program; tried to select weekly or daily recording for a show more than 7 days ahead, because the instant programmer 300 only allows the weekly or daily recording option to be used for the current weeks' programs (±7 days); or tried to enter a program that has already ended. "FULL" indicates that the stack storage of the programs to be recorded, which is implemented in random access memory (RAM) inside the instant programmer 300 has been filled. The user could then cancel one or more programs before entering new programs. "EMPTY" indicates there are no programs entered to be recorded. The number of programs to be recorded that can be stored in the instant programmer 300 varies depending on the density of RAM available and can vary from 10 to more.

Figure 21:
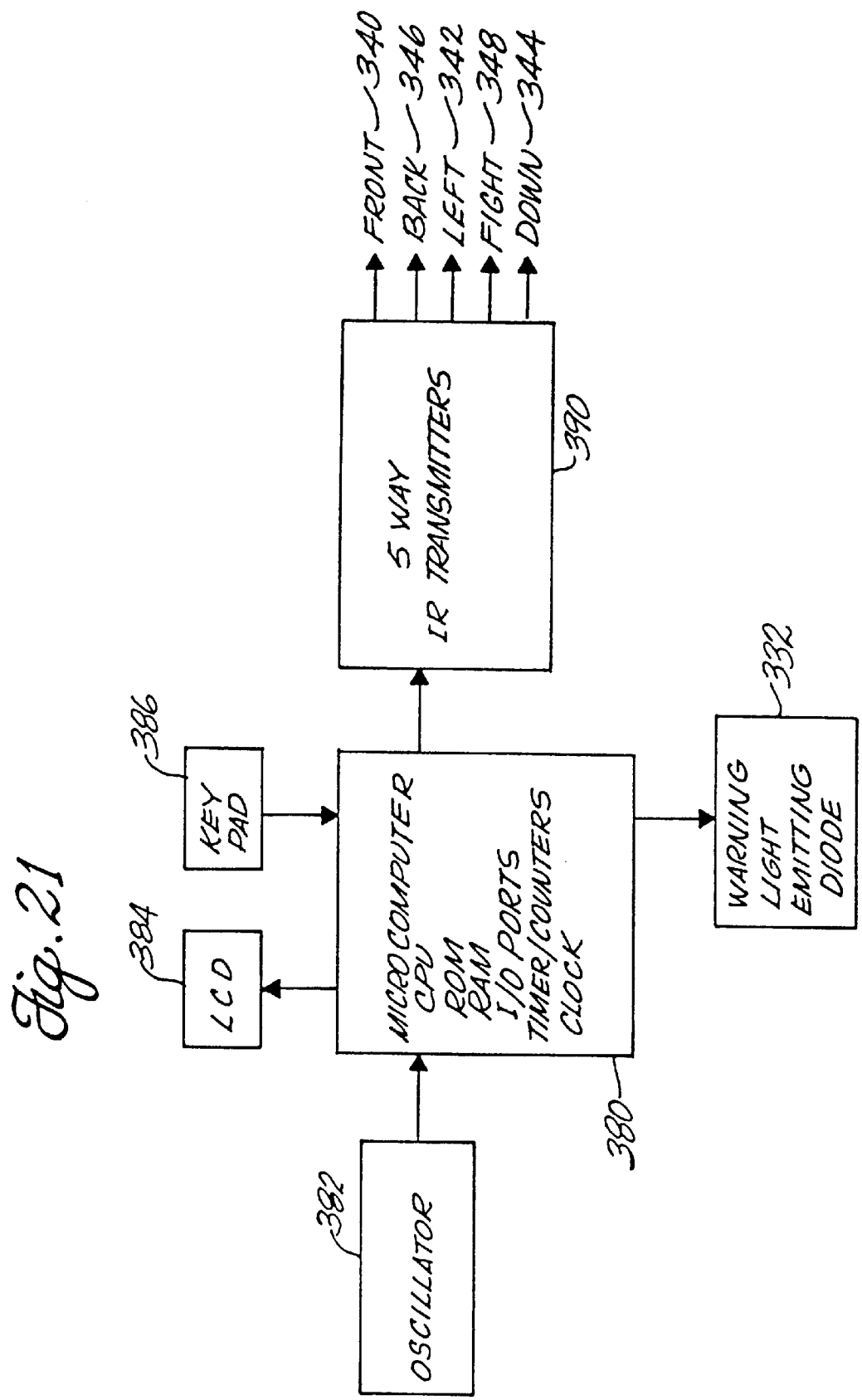
FIG. 21 is a schematic showing apparatus for using compressed codes for recorder prepregramming according to a preferred embodiment of the invention.
Figure 22:
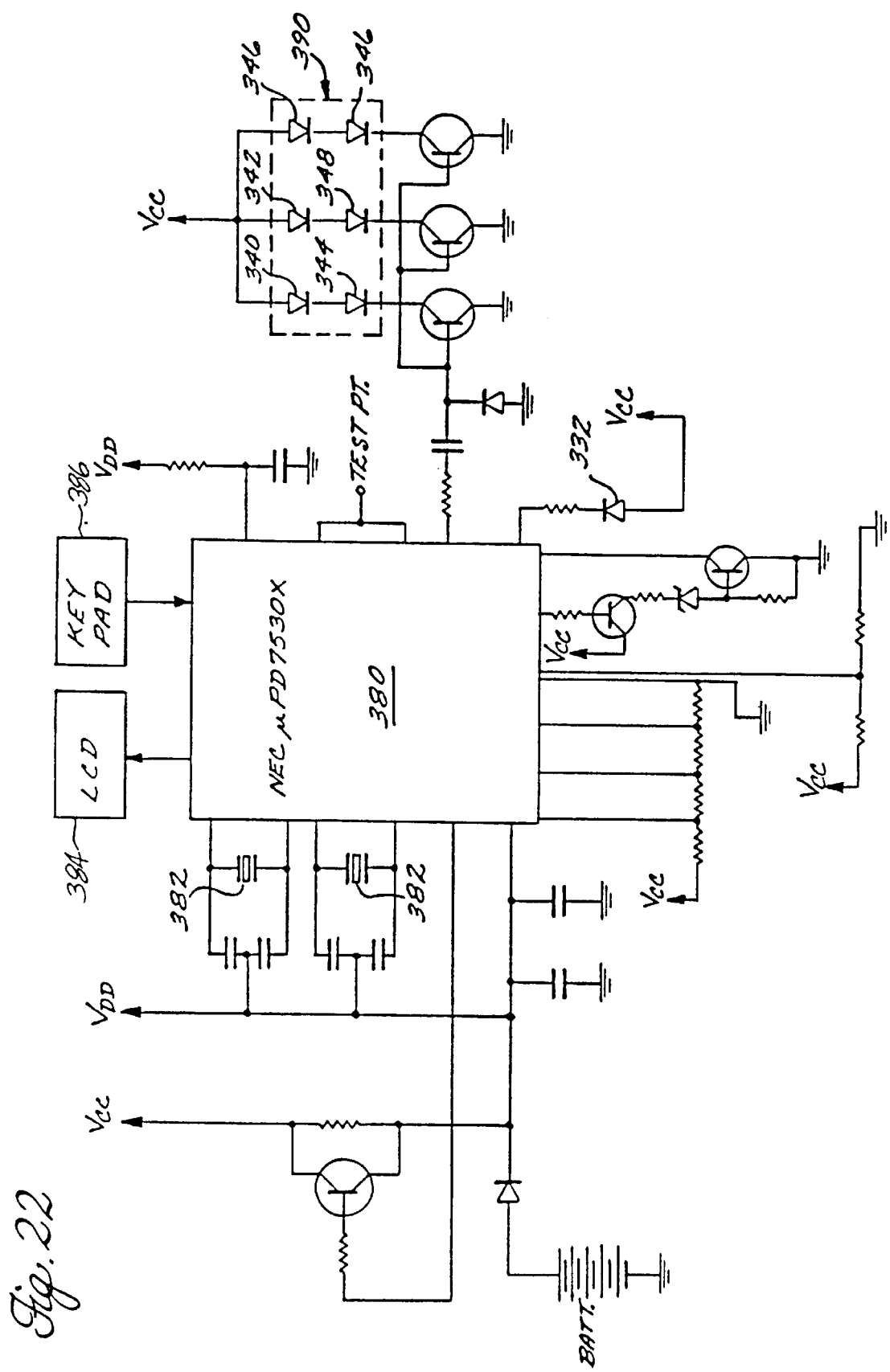
FIG. 22 is a detailed schematic showing a preferred embodiment of apparatus implementing the schematic of FIG. 21.

FIG. 21 is a schematic of the circuitry needed to implement the instant programmer 300. The circuitry consists of microcomputer 380, oscillator 382, liquid crystal display 384, key pad 386, five way IR transmitters 390 and red warning light emitting diode 332. The microcomputer 380 consists of a CPU, ROM, RAM, I/O ports, timers, counters and clock. The ROM is used for program storage and the RAM is used among other purposes for stack storage of the programs to be recorded. The liquid crystal display 384 is display 350 of FIGS. 15 and 18. The key pad 386 implements all the previously discussed keys. The five way IR transmitters 390 consists of front infrared (IR) diode 340, left IR diode 342, down IR diode 344, two back IR diodes 346 and right IR diode 348. FIG. 22 shows the detailed schematic of the instant programmer 300 circuitry and previously identified elements are identified by the same numbers. The microcomputer can be implemented with a NEC uPD7530x part, which can interface directly with the display, the keypad, the light emitting diodes and the oscillator. The 25 degree IR diodes can be implemented with NEC 313AC parts and the 5 degree IR diodes can be implement with Liton 2871C IR diodes.

Figure 23:
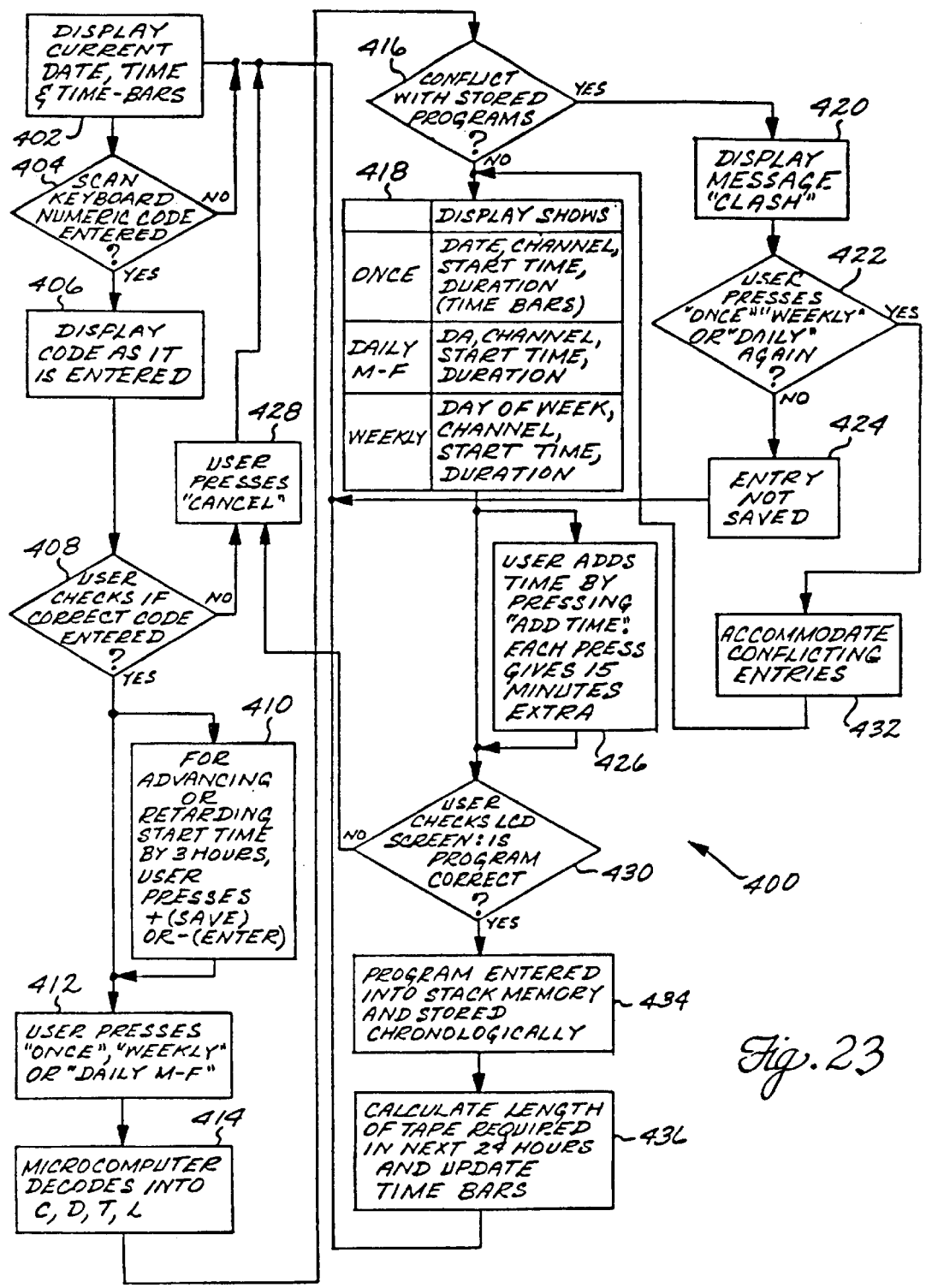
FIG. 23 is a flow graph for program entry into the apparatus of FIG. 15.
Figure 24:
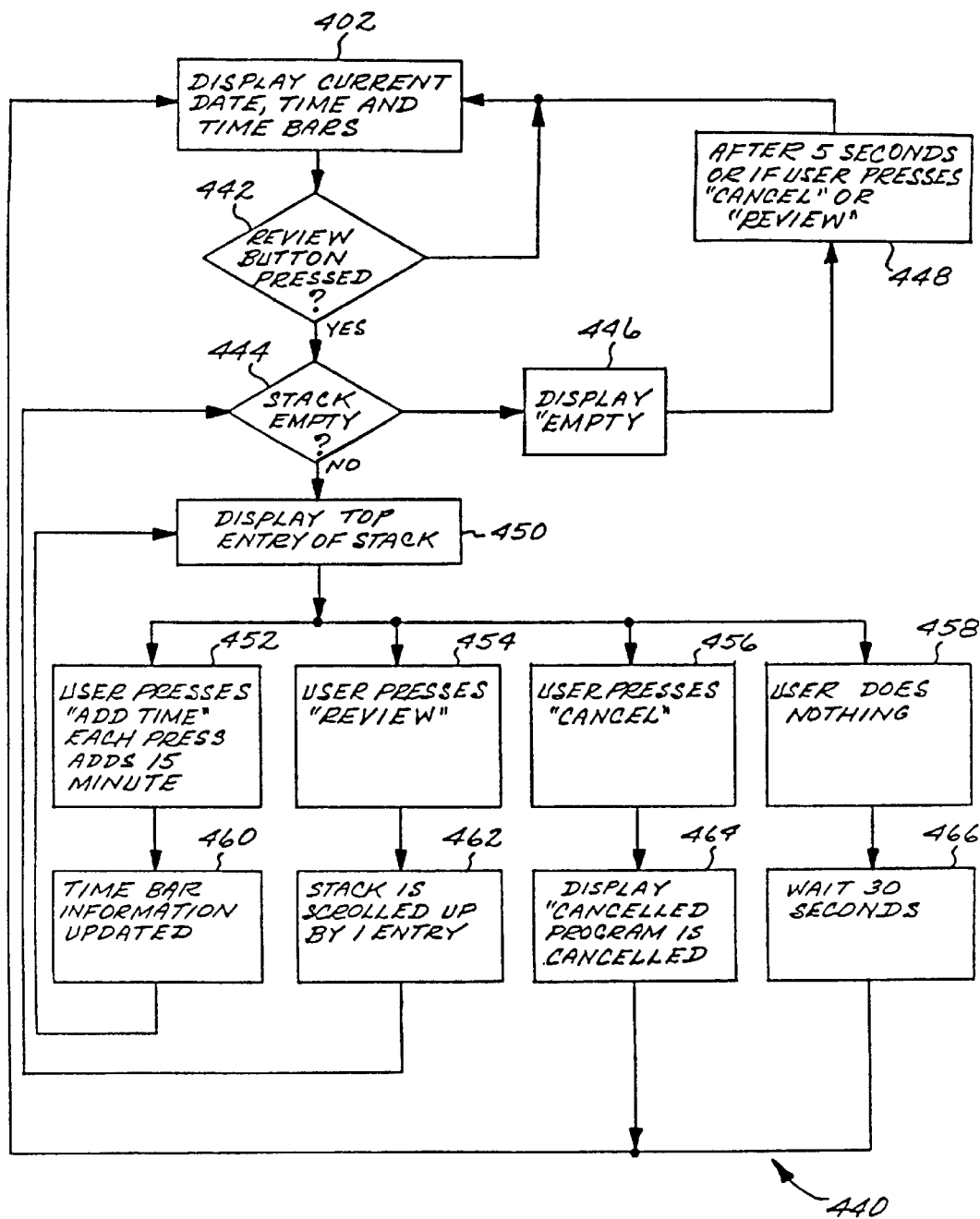
FIG. 24 is a flow graph for review and program cancellation of programs entered into the apparatus of FIG. 15.
Figure 25:
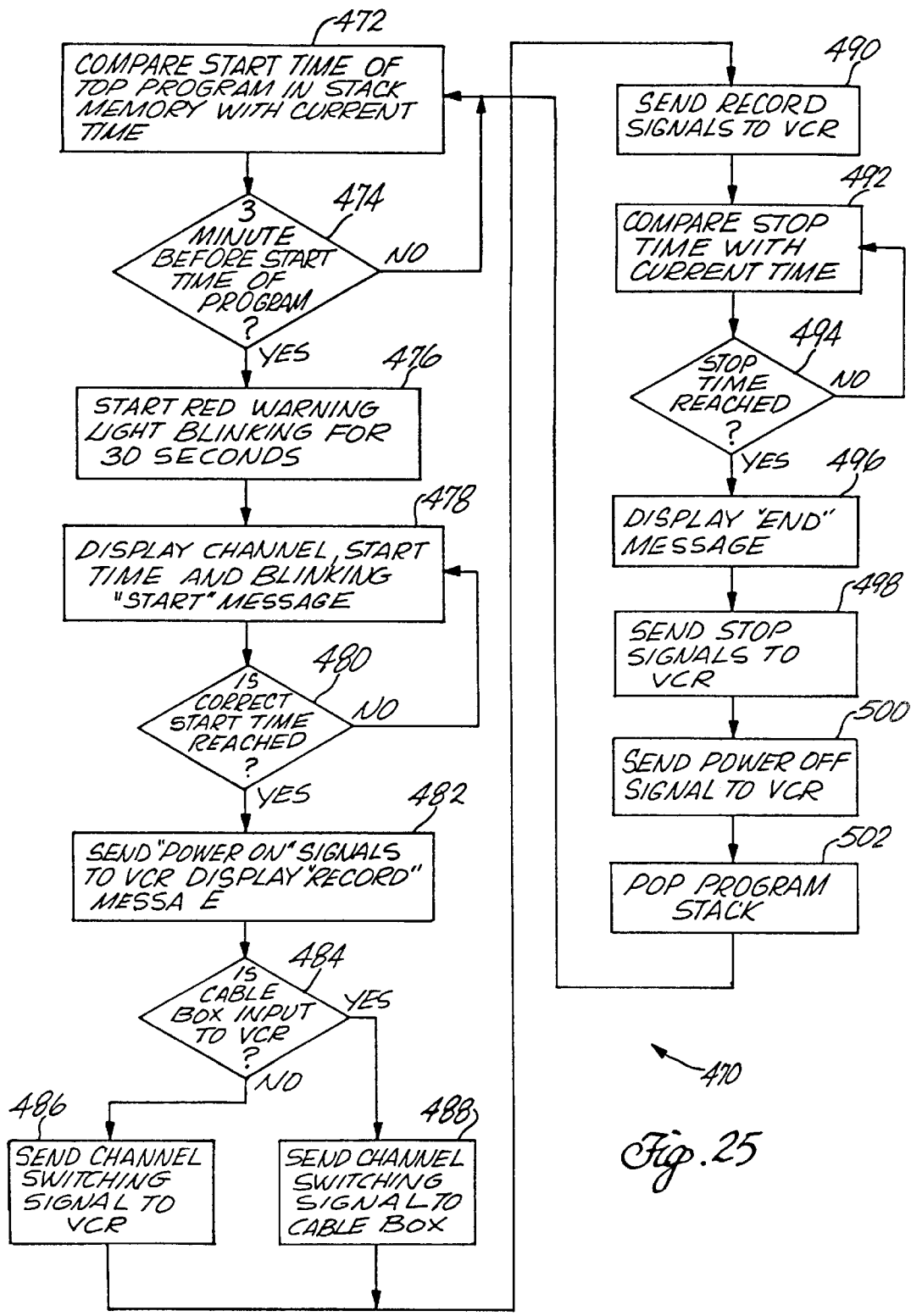
FIG. 25 is a flow graph for executing recorder prepregramming using compressed codes according to a preferred embodiment of the invention.

The flowcharts for the program that is stored in the read only memory (ROM) of the microcomputer 380 that executes program entry, review and program cancellation, and record execution are illustrated in FIGS. 23, 24, and 25, respectively. The FIG. 23 for program entry, which process was described above, consists of the following steps: display current date, time and time bars step 402, which is the quiescent state of instant programmer 300; scan keyboard to determine if numeric decimal compressed code entered step 404; display code as it is entered step 406; user checks if correct code entered step 408 and user presses CANCEL key 304 step 428; user advances or retards start time by three hours by pressing SAVE key 316 or ENTER key 318 step 410; user presses ONCE key 310, WEEKLY key 308 or DAILY key 312 key step 412; microcomputer decodes compressed code into CDTL step 414; test if conflict with stored programs step 416, if so, display "CLASH" message step 420, user presses ONCE key 310, WEEKLY key 308 or DAILY key 312 step 422, then accommodate conflicting entries step 432, as described above in the discussion of the "CLASH" options, and entry not saved step 424; set display as date, channel, start time and duration (time bars) for ONCE, or DA, channel, start time and duration for DAILY, or day of week, channel, start time and duration for WEEKLY step 418; user presses ADD TIME key 324, which adds 15 minutes to record time step 426; user checks display step 430; enter program on stack in chronological order step 434 wherein the stack is a portion of the RAM of microcontroller 380; and calculate length of tape required and update time bars step 436.

The FIG. 24 flowchart for review and cancellation, which process was described above, consists of the following steps: display current date, time and time bars step 402; REVIEW key 306 pressed step 442; test if stack empty step 444, display "EMPTY" step 446, and return to current date and time display step 448; display top stack entry step 450; user presses ADD TIME key 324 step 452 and update time bars step 460; user presses REVIEW key 306 step 454 and scroll stack up one entry step 462; user presses CANCEL key 304 step 456 and display "CANCELLED" and cancel program step 464; and user does nothing step 458 and wait 30 seconds step 466, wherein the 30 second timeout can be implemented in the timers of microcomputer 380.

The FIG. 25 flowchart for record execution, which is the process of automatically recording a program and which was described above, consists of the following steps: compare start time of top program in stack memory with current time step 472; test if three minutes before start time of program step 474; start red warning LED 332 blinking for 30 seconds step 476; display channel, start time and blinking "START" message step 478, is correct start time reached step 480 and send power ON signal to VCR and display "REC" message step 482; test if a cable box is input to VCR step 484, send channel switching signals to VCR step 486 and send channel switching signals to cable box step 488; send record signals to VCR step 490; compare stop time with current time step 492, test if stop time reached step 494 and display "END" message step 496; send stop signals to VCR step 498; send power OFF signal to VCR step 500; and pop program stack step 502.

Figure 26:
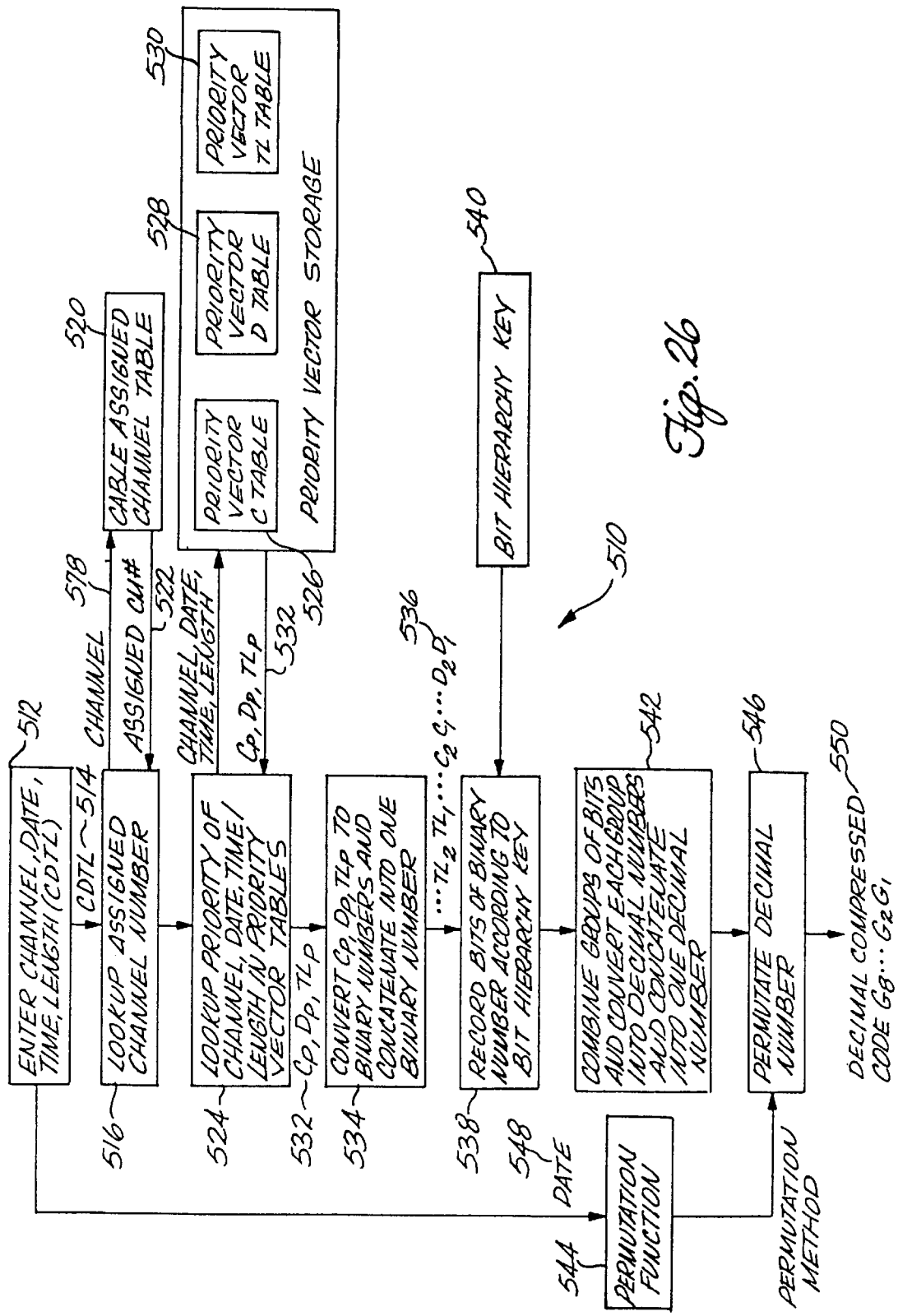
FIG. 26 is a flow graph for encoding program channel, date, time and length information into decimal compressed codes.

FIG. 26 is a flowchart of the method for encoding channel, date, time and length (CDTL) into decimal compressed code 510. This process is done "offline" and can be implemented on a general purpose computer and is done to obtain the compressed codes 212 that are included in the program guide or calendar of FIG. 8. The first step in the encoding method is the enter channel, date, time and length (CDTL) step 512 wherein for a particular program the channel, date, start time and length CDTL 514 of the program are entered. The next step is the lookup assigned channel number step 516, which substitutes an assigned channel number 522 for each channel 518. Often, for example for network broadcast channels, such as channel 2, the assigned channel number is the same; however, for a cable channel such as HBO a channel number is assigned and is looked up in a cable assigned channel table 520, which would essentially be the same as the first two columns of the table of FIG. 28. Next, the lookup priority of channel, date and time/length in priority vector tables step 524 performs a lookup in priority vector channel (C) table 526, priority vector date (D) table 528 and priority vector time/length (TL) table 530 using the indices of channel, date and time/length, respectively, to produce the vector $C_p$, $D_p$, $TL_p$ 532. The use of a combined time/length (TL) table to set priorities recognizes that there is a direct relationship between these combinations and the popularity of a program. For example, at 6:30 PM, a short program is more likely to be popular than a 2 hour program, because it may be the dinner hour.

The channel priority table is ordered so that the most frequently used channels have a low priority number. An example of the data that is in the priority vector C table 526 follows.

| channel  | 4 | 7 | 2 | 3 | 5 | 6 | 11 | 13 | ... |
|----------|---|---|---|---|---|---|----|----|-----|
| priority | 0 | 1 | 2 | 3 | 4 | 5 | 6  | 7  | ... |

Generally the dates of a month all have an equal priority or equal usage, so the low number days in a month and the low number priorities would correspond in the priority vector D table 528 as in the following example.

| date     | 1 | 2 | 3 | 4 | 5 | 6 | 7 | 8 | 9 | 10 | ... |
|----------|---|---|---|---|---|---|---|---|---|----|-----|
| priority | 0 | 1 | 2 | 3 | 4 | 5 | 6 | 7 | 8 | 9  | ... |

The priority of the start times and length of the programs could be arranged in a matrix that would assign a priority to each combination of start times and program lengths so that more popular combinations of start time and length would have a low priority number and less popular combinations would have a high priority number. For example, a partial priority vector T/L table 530 might appear as follows.

| TIME | Priority TL Table | | | | |
|---|---|---|---|---|---|
| Length (hrs) | 6:30 pm | 7:00 pm | 7:30 pm | 8:00 pm | ... |
| .5 | 8 | 4 | 7 | 10 | |
| 1.0 | 12 | 15 | 13 | 18 | |
| 1.5 | 20 | 19 | 17 | 30 | |

Suppose the channel, date, time and length (CDTL) 514 data is channel 5, Feb. 10, 1990, 7:00 PM and 1.5 hours in length, then the $C_p, D_p, TL_p$ data 532 for the above example would be 4 9 19. The next step is the convert $C_p$, $D_p$, $TL_p$ to binary numbers and concatenate them into one binary number step 534, resulting in the data word ... $TL_2 TL_1$ ... $C_2 C_1$ ... $D_2 D_1$ 536. For the example given above, converting the ... $TL_2 TL_1$ ... $C_2 C_1$ ... $D_2 D_1$ 536 word to binary would yield the three binary numbers: ... 0010011, ... 0100, ... 01001. The number of binary bits to use in each conversion is determined by the number of combinations involved. This could vary depending on the implementation; however one preferred embodiment would use eight bits for $C_p$, denoted as $C_8 \, C_7 \, C_6 \, C_5 \, C_4 \, C_3 \, C_2 \, C_1$, which would provide for 256 channels, five bits for $D_p$, which can be denoted as $D_5 \, D_4 \, D_3 \, D_2 \, D_1$, would provide for 31 days in a month, and fourteen bits for $TL_p$, denoted as $TL_{14} \ldots TL_3 \, TL_2 \, TL_1$, which would provide for start times spaced every 5 minutes over 24 hours and program lengths in increments of 5 minute lengths for programs up to 3 hours in length and program length in increments of 15 minute lengths for programs from 3 to 8 hours in length. This requires about 288*(36+20)=16,128 combinations, which are provided by the 2**14=16,384 binary combinations. Altogether there are 8+5+14=27 bits of information $TL_{14}$ ... $TL_2 TL_1 \, C_8$ ... $C_2 C_1 D_5$ ... $D_2 D_1$. For the above example padding each number with zeros and then concatenating them would yield the 27 bit binary number: 000000000100110000010001001.

The next step is to use bit hierarchy key 540, which can be stored in read only memory 64 to perform the reorder bits of binary number according to bit hierarchy key step 538. As described previously, a bit hierarchy key 540 can be any ordering of the ... $TL_2 TL_1$ ... $C_2 C_1$ ... $D_2 D_1$ 536 bits and in general will be selected so that programs most likely to be the subject of timer preprogramming would have a low value compressed code 212, which would minimize keystrokes. The ordering of the bit hierarchy key can be determined by the differential probabilities of the various bit combinations as previously discussed. The details of deriving a bit hierarchy key 540 were described relative to bit hierarchy key 120 and the same method can be used for bit hierarchy key 540. For example, the bit hierarchy key might be:

| $TL_8 \, C_3$ | ... | $TL_{10} \, C_2 \, TL_1 \, C_1 \, L_1 \, D_5 \, D_4 \, D_3 \, D_2 \, D_1$ |
|---|---|---|
| 27 26 | ... | 10   9   8   7   6   5   4   3   2   1 |

The next step is the combine groups of bits and convert each group into decimal numbers and concatenate into one decimal number step 542. For example, after reordering according to the bit hierarchy key, the code may be 000000001010010000010001001, which could be grouped as 00000000101001000,0010001001. If these groups of binary bits are converted to decimal as 328,137 and concatenated into one decimal number, then the resulting decimal number is 328137. The last encoding step is the permutate decimal number step 546, which permutes the decimal number according to permutation function 544 that is dependent on the date 548 and in particular the month and year and provides a security feature for the codes. After the permutate decimal number step 546, the decimal compressed code $G_8$ ... $G_2 G_1$ 550 may, for example, be 238731. These encoded codes are then included in a program guide or calendar as in the compressed code indication 212 of FIG. 8.

Figure 27:
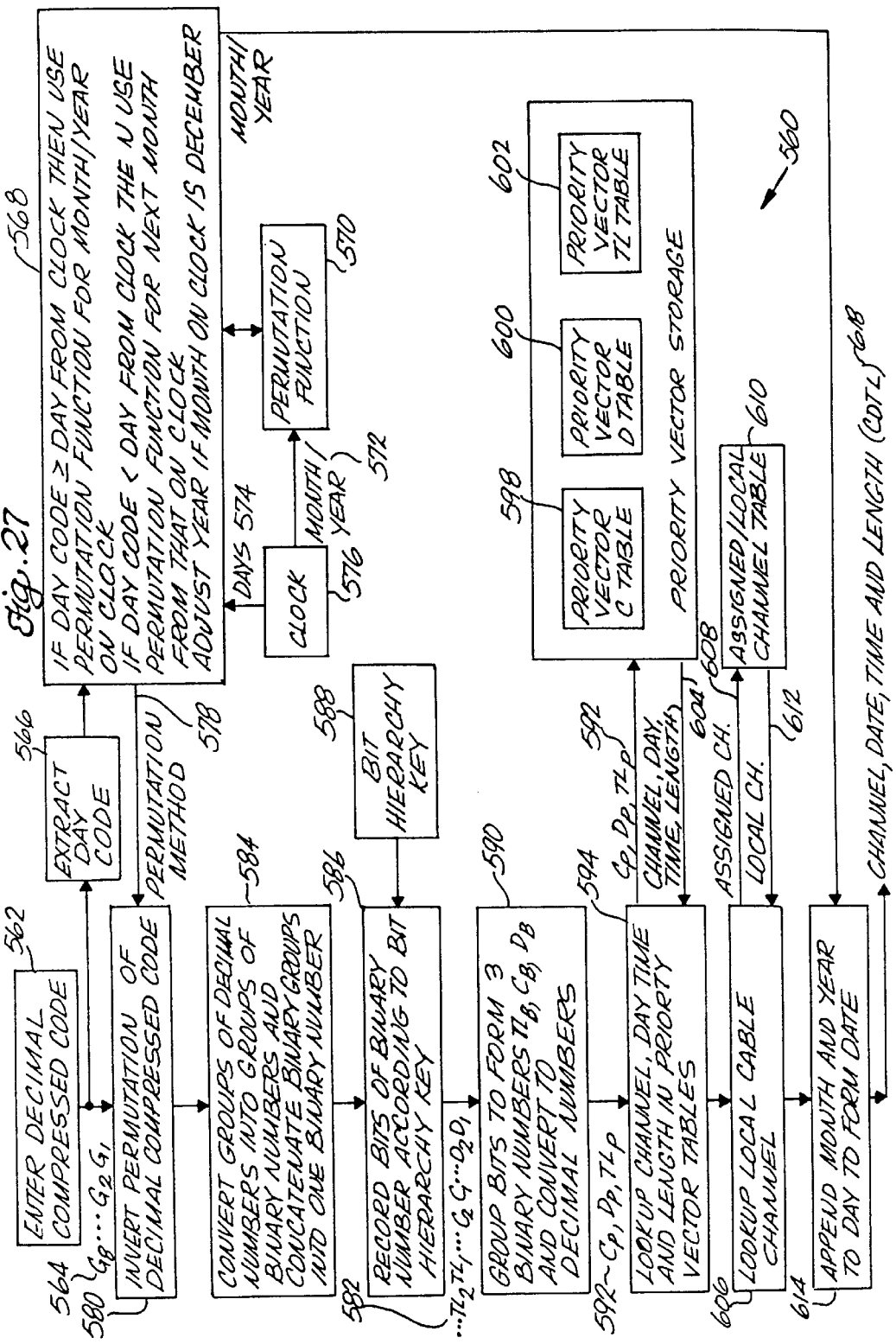
FIG. 27 is a flow graph for decoding decimal compressed codes into program channel, date, time and length information.

FIG. 27 is a flowchart of the method for decoding a decimal compressed code into channel, date, time and length 560, which is step 414 of FIG. 23. Once the decimal compressed code $G_8$ ... $G_2 G_1$ 564 is entered in step 562, it is necessary to invert the permutation function of steps 544 and 546 of FIG. 26. The first step is the extract day code step 566, which extracts the day code for the program in the decimal compressed code and passes the day code to step 568, which also receives the current day 574 from the clock 576, which is implemented by microcomputer 380 in FIGS. 21 and 22. The clock 576 also sends the current month and year to the permutation function 570, which is dependent on the month and year. Then step 568 performs the function: if day code is same or greater than current day from clock, then use permutation function for month/year on clock, otherwise use permutation function for next month after the month on the clock and use next year if the month on the clock is December. In other words, since there is provision for preprogramming recording for one month or 31 days ahead, if the day for the program is equal to or greater than the current day of the month, then it refers to a day in the present month; otherwise, if the day for the program is less than the current day of the month, it must refer to a program in the next month. The extract day code step 566, which must be performed before the invert permutation of decimal compressed code step 580, is accomplished by apriori knowledge of how the permutate decimal number step 546 of FIG. 26 is performed relative to the day code information.

The selected permutation method 578 is used in the invert permutation of decimal compressed code step 580. For the example given above, the output of step 580 would be: 328137. The next step is the convert groups of decimal numbers into groups of binary numbers and concatenate binary groups into one binary number step 584, which is the inverse of step 542 of FIG. 26 and for the above example would result in the binary code: 000000001010010000010001001. Then the bit hierarchy key 588 is used in the reorder bits of binary number according to bit hierarchy key step 586, which inverts step 538 of FIG. 26 to obtain 000000001001100000010001001 for the above example, which is ... $TL_2 TL_1$ ... $C_2 C_1$ ... $D_2 D_1$, 582 corresponding to 536 of FIG. 26. The next step is to group bits to form three binary numbers $TL_b, C_b, D_b$ and convert to decimal numbers step 590 resulting in $C_p$, $D_p$, TL 592, which for the example above would be: 4, 9, 19, and which are priority vectors for channel, day and time/length, which in turn are used to lookup channel, day, time and length 604 in priority vector channel (C) table 598, priority vector date (D) table 600, and priority vector time/length (TL) table 602, respectively.

The lookup local channel number step 606 looks up the local channel 612 given the assigned channel number 608, in the assigned/local channel table 610, which is setup by the user via the CH key 322, as explained above. An example of the assigned/local channel table 610 is the right two columns of the assigned/local channel table 620 of FIG. 28. The correspondence between the assigned channel numbers, such as 624 and 628, and the local channel numbers, such as 626 and 630 is established during setup by the user. For the example, FIG. 28 shows an exact correspondence between the assigned channel number 5 and the local channel number 5. The last step is the append month and year to day to form date step 614. The correct month and year are obtained from step 568 and are again dependent on whether the day code is equal to or greater than the day from the clock or less than the day from the clock. If the day code is equal to or greater than the day from the clock, the month and year as shown on the clock are used, otherwise the next month is used and the next year is used if the clock month is December. The result is the channel, date, time and length (CDTL) 618, which for the above example would be channel 5, Feb. 10, 1990, 7:00PM and 1.5 hours in length.

Another preferred embodiment is an apparatus and method to enable a user to selectively record information designated by a digital compressed code. Specifically this apparatus would allow a user to record for later viewing, detailed information associated with an advertisement or similar brief description of a service, product, or any information including public service information.

Figure 29A:
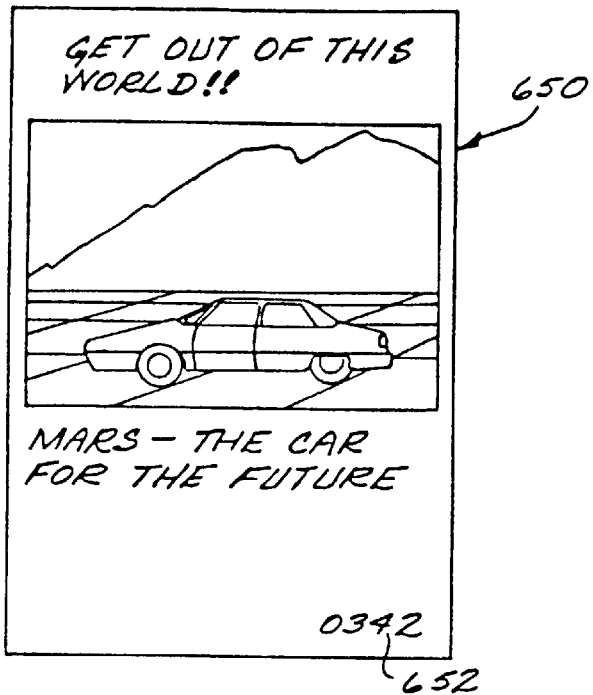
FIGS. 29a and 29b are examples of a printed advertisement and a television broadcast advertisement showing the use of a decimal code for information (I code).

The advertisement could be print advertisement or broadcast advertisement on television or any other media, such as radio, electronic networks or bulletin boards. The advertisement would have associated with it a digital code, herein referred to as an I code. In print advertisement the digital code would be printed along with the advertisement. FIG. 29*a* shows an example print advertisement 650 for an automobile and printed in the advertisement is a decimal code for information (I code) 652. This code can be identified as an I code 652, because the leading digit is a zero, as will be explained below. As shown in FIG. 29*a*, the use of I codes is very space efficient, which is very important in advertising.

Figure 29B:
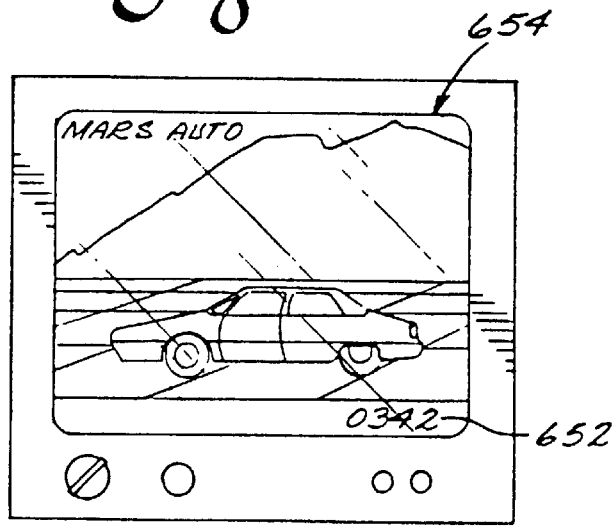

FIG. 29*b* shows an example television broadcast advertisement 654 with an I code 652. The user would identify this code as a I code 652, because the leading digit is zero. It may be very expensive to run a long advertisement during prime time when the majority of viewers are watching television; however, a short advertisement could be run during prime time with the I code and then the user could enter the I code into instant programmer 300, which would command the recording of the longer advertisement for the automobile during the nonprime time. The additional information could be broadcast early in the morning, for example, between midnite and six o'clock in the morning. At this time the broadcast rates are low and it is economical to broadcast detailed information or advertisements of many items such as automobiles and real estate. It would also be possible to transmit movie previews at that time of night.

The reader of print advertisement, the viewer of television and the consumer of any other media, such as radio, would select what additional information was of interest and enter the associated I code into instant programmer 300, which would then command the recording of the detailed information late at night.

The user could then view these at his/her leisure.

The instant programmer 300 can be used for recorder preprogramming for information using I codes; however, there are some important differences when the device is used for I codes.

A primary difference is that I codes that are entered into the instant programmer 300 are used within the next twenty four hours. The user would read, see or hear the advertisement and enter the I code associated with the advertisement into the instant programmer 300, which would then at the right time sometime in the next 24 hours, and generally in the middle of the night, record the advertisement, by tuning to the proper channel and turning recording on and off for a video cassette recorder. In normal recorder preprogramming, using G codes, the instant programmer 300 decodes the television broadcast advertisement 654 into CDTL (channel, date, time, and length). For an I code 652, the instant programmer 300 would decode the I code 652 into CTL (channel, time and length) only, because the date is known to be in the next twenty four hours. Suppose the time is now June 20th at 6 p.m. If a user enters an I code, which decodes to channel 2, start time 2:00 a.m., and length 10 minutes, then the VCR would start recording on June 21st at 2:00 a.m. for 10 minutes.

The hardware for the instant programmer 300 used with decimal codes for information (I codes) can be identical to the design illustrated in FIGS. 15, 16, 17, 17A, 18, 19, 20, 21 and 22 and described in the associated specification.

Figure 30:
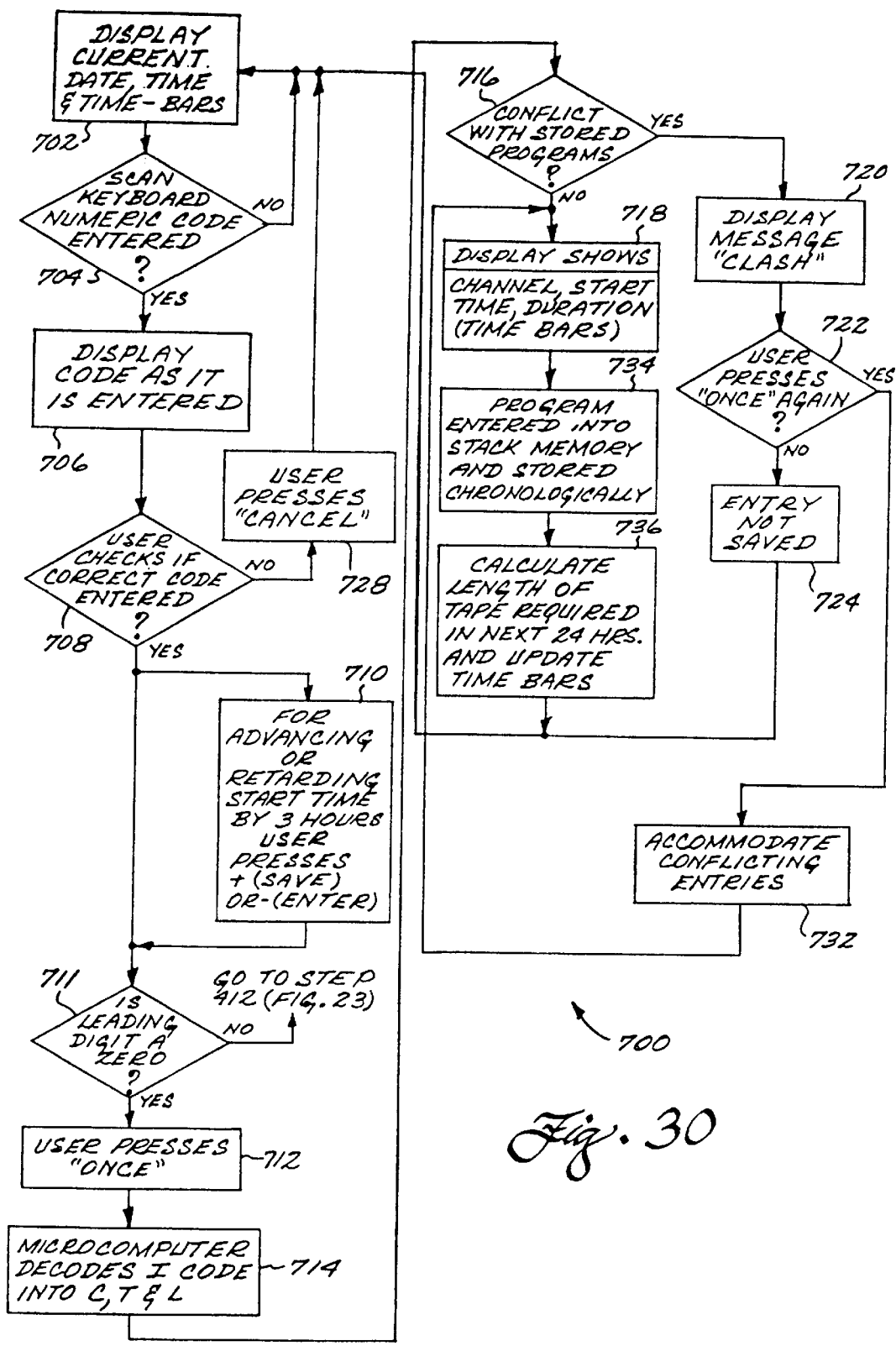
FIG. 30 is a flow graph for entry of an I code into the apparatus of FIG. 15.

The flowcharts for the programs that are stored in the read only memory (ROM) of the microcomputer 380 that execute program entry, review and program cancellation, and record execution are illustrated in FIGS. 23, 24, and 25, respectively for use of G codes for preprogramming a VCR for program recording. The programs for use of the instant programmer 300 with I codes for recording information according to this preferred embodiment are in general different; however, the program for review and program cancellation (see FIG. 24) and record execution (see FIG. 25) are the same. However, the program that is stored in the read only memory (ROM) of the microcomputer 380 that executes on entry of an I code is different and is shown in FIG. 30. The entry of an I code is determined by inspecting the leading digit of the entered code. If the leading digit is not zero then a G code has been entered, because G codes never have leading zeros, and the flowgraph of FIG. 23 will be executed. If the leading digit is a zero then an I code has been entered. Steps 702, 704, 706, 708 and 710 of FIG. 30 are identical to steps 402, 404, 406, 408 and 410 in FIG. 23. The test for a G code or an I code is done in test whether leading digit is zero step 711, which will either branch to step 412 of FIG. 23 if the entered code is a G code, or continue with the next step of FIG. 30.

The flowchart for entry of the I code in FIG. 30 consists of the following steps: display current date, time and time bars step 702, scan keyboard to determine if I code entered step 704, display I code as it is entered step 706, user checks if correct code entered step 708, user advances or retards start time by three hours by pressing SAVE key 316 or ENTER key 318 step 710, test whether leading digit is zero step 711, user presses ONCE key 310 step 712, microcomputer decodes I code into CTL step 714,. test if conflict with stored programs step 716, set display as channel, start time and duration (time bars) step 718, display "CLASH" message step 720, user presses ONCE key 310 step 722, entry not saved step 724, accommodate conflicting entries step 732, user presses CANCEL key 304 step 728, enter program on stack in chronological order step 734, and calculate length of tape required and update time bars step 736. FIG. 30 illustrates the order and relationships between the steps for I code entry. If the user presses WEEKLY key 308 or DAILY (M–F) key 312 instead of the ONCE key 310, then the instant programmer 300 will interpret these as if the ONCE key 310 had been pressed. The stack memory of the enter program on stack in chronological order step 734 allows the user to enter multiple digital codes for information, which will all be decoded and entered in order into the stack for later execution when the proper time arrives.

Figure 31:
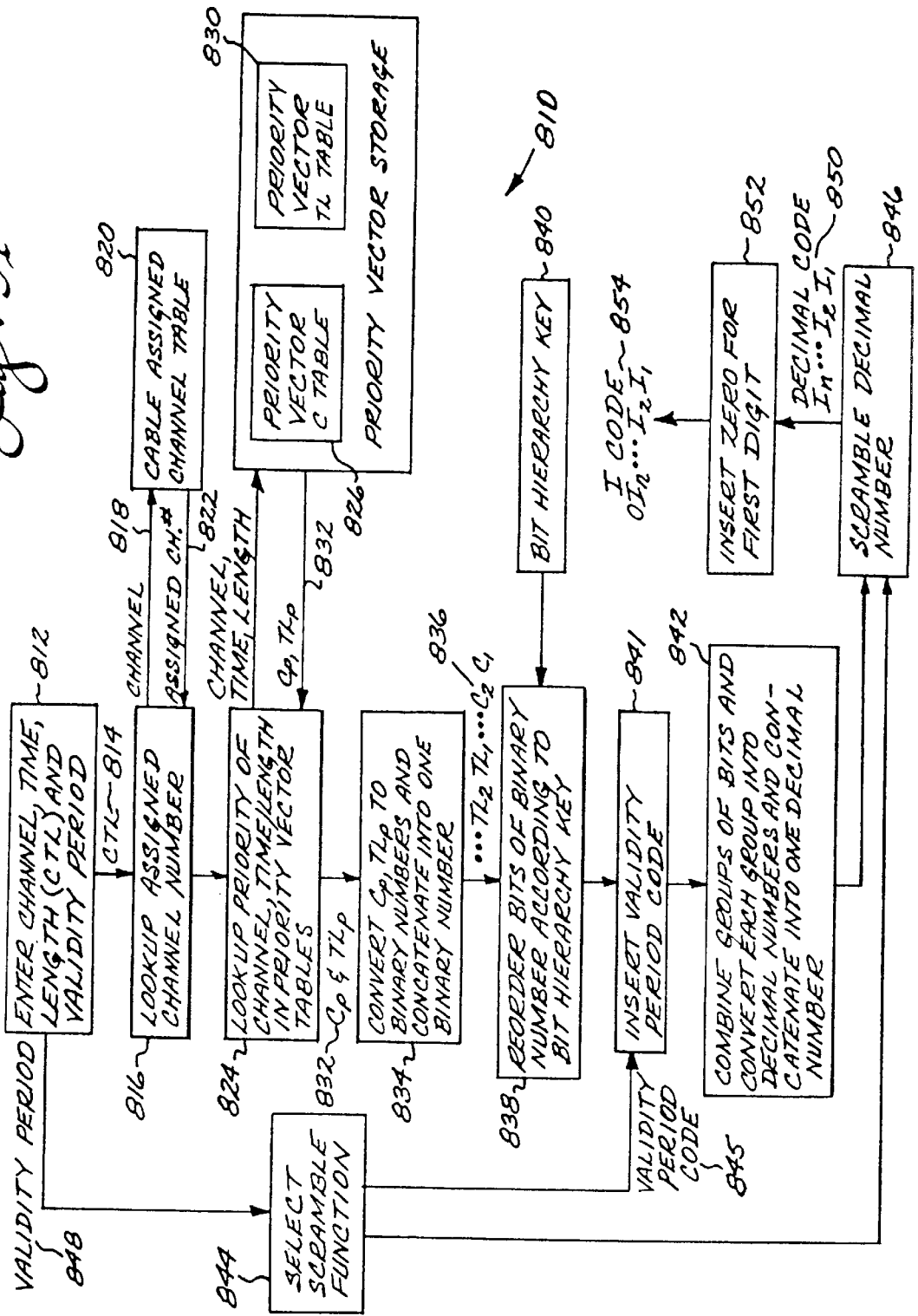
FIG. 31 is a flow graph for encoding channel, time and length (CTL) into an I code.

In order to use I codes with advertisements, the I codes have to first be encoded. FIG. 31 is a flowchart of the method for encoding channel, time and length (CTL) for an information broadcast into an I code. This process is done "offline" and can be implemented on a general purpose computer and is done to obtain a I code 854 that can be included in an advertisement, such as shown in FIGS. 29a and 29b.

In general the I codes are encoded to be compressed coded indications, each representative of, and compressed in length from, the combination of separate channel, start time and a length indications. In print advertisement and also in television broadcasts, there is simply not enough area to separately spell out the channel, start time, and length. The I codes solve this problem by encoding channel, start time and length into one compressed digital code.

The first step in one preferred encoding method is enter channel, time and length (CTL) and validity period step 812 for the supplemental information associated with an advertisement. The channel, time and length are self explanatory. The validity period is necessary, because the encoding and decoding algorithms have a step in which a scramble occurs. To guarantee that the I code associated with an advertisement will be able to be used, two overlapping scrambling time periods are used. For example suppose that a first scrambling method is constant for two months from January 1st to February 28th and then changes every succeeding two month period. An overlapping and skewed second scrambling method would be constant from February 1st to March 31st and then change every succeeding two month period. For an advertisement that would run from January 20th to February 10, the first scrambling method would be used for encoding and decoding; however, for an advertisement that would run from February 25th through March 9th, then the second scrambling method would be used. Thus, the validity period input at the beginning of the encoding process specifies which scrambling method to use.

The next step is the lookup assigned channel number step 816, which substitutes an assigned channel number 822 for each channel 818 of the input CTL 814. Often, for example for network broadcast channels, such as channel 2, the assigned channel number is the same: however, for a cable channel such as HBO a channel number is assigned and is looked up in a cable assigned channel table 820, which would essentially be the same as the first two columns of the table of FIG. 28. Next, the lookup priority of channel, time and length in priority vector tables step 824 performs a lookup in priority vector channel (C) table 826 and priority vector time/length (TL) table 830 using the indices of channel and time/length, respectively, to produce the vector $C_p$, $TL_p$ 832. The use of a combined time/length (TL) table to set priorities recognizes that there may be some relationship between these combinations for additional information. For example, at 2 AM movie previews could be broadcast and be somewhat longer than other information, but very popular. Alternately, it is possible to have separate priority tables for time and length.

The channel priority table is ordered so that in general the least frequently used channels for I codes have high priority numbers and the most frequently used channels for I codes have a low priority number, which contributes to deriving shorter I codes for the most popular supplemental information broadcasts. Note that because the information broadcasts are least expensive if done on off hours on seldom used channels, that it is likely that the channels with the lowest priority numbers for G codes may have the highest priority numbers for I codes. For example, a short G code may be for channel 2 on Monday at 8 p.m. for 1 hour during prime time, while a short I code may be for channel 17 at 4 a.m. for 5 minutes. The typical information broadcast may be only about 3 to 5 minutes compared to the typical 30 to 60 minute program. An example of the data that is in the priority vector C table 826 follows.

| channel  | 4 | 7 | 2 | 3 | 5 | 6 | 11 | 13 | ... |
|----------|---|---|---|---|---|---|----|----|-----|
| priority | 0 | 1 | 2 | 3 | 4 | 5 | 6  | 7  | ... |

The priority of the start times and length of the information broadcasts corresponding to I codes are conceivably the inverse of the priorities of the G codes, because G codes are arranged so that prime time programs will have the shortest G codes. In the case of I codes, they would be arranged to have the shortest codes when the broadcast time is least expensive, which is certainly not prime time. Thus, if the G codes are encoded for prime time, then the I codes are encoded for nonprime time or the inverse of prime time. The priority for time and length could be arranged in a matrix that would assign a priority to each combination of start times and information broadcast lengths so that more popular combinations of start time and length would have a low priority number and less popular combinations would have a high priority number, which also contributes to deriving shorter codes for the most popular supplemental information broadcasts. For example, a partial priority vector T/L table 830 might appear as follows.

| TIME | Priority TL Table | | | | |
|------|---------|---------|---------|---------|-----|
| Length (hrs) | 2:30 am | 3:00 am | 3:30 am | 4:00 am | ... |
| .1 | 8  | 4  | 7  | 10 |
| .2 | 12 | 15 | 13 | 18 |
| .3 | 20 | 19 | 17 | 30 |

Alternately as indicated before, separate priority tables could be constructed for start times and broadcast length with the lowest priority numbers given to the most likely start times for I code broadcasts and most likely broadcast lengths.

Suppose the channel, time and length (CTL) 814 data is channel 5, 3:00am and 0.3 hours in length, then the $C_p$, $TL_p$ 832 for the above example would be 4 19. The next step is the convert $C_p$, $TL_p$ to binary numbers and concatenate them into one binary number step 834, resulting in the data word . . . $TL_2 TL_1$ . . . $C_2 C_1$ 836. For the example given above, converting the . . . $TL_2 TL_1$ . . . $C_2 C_1$ 836 word to binary would yield the two binary numbers: . . . 0010011, . . . 0100. The number of binary bits to use in each conversion is determined by the number of combinations involved. This could vary depending on the implementation; however one preferred embodiment would use eight bits for $C_p$, denoted as $C_8 C_7 C_6 C_5 C_4 C_3 C_2 C_1$, which would provide for 256 channels, and fourteen bits for $TL_p$, denoted as $TL_{14}$ . . . $TL_3 TL_2 TL_1$, which would provide for start times spaced every 5 minutes over 24 hours and information broadcasts in increments of 5 minute lengths for information broadcasts up to 3 hours in length. This requires about 288*(36+20)= 16,128 combinations, which are provided by the 2**14=16, 384 binary combinations. Altogether there are 8+14=22 bits of information $TL_{14} \ldots TL_2 TL_1 C_8 \ldots C_2 C_1$. For the above example padding each number with zeros and then concatenating them would yield the 22 bit binary number: 0000000001001100000100.

The next step is to use bit hierarchy key 840, which can be stored in read only memory 64 to perform the reorder bits of binary number according to bit hierarchy key step 838. A bit hierarchy key 840 can be any ordering of the . . . $TL_2$ $TL_1 \ldots C_2 C_1$ 836 bits and in general will be selected so that information broadcasts most likely to be the subject of timer preprogramming would have a low value I code 854, which would minimize keystrokes. The ordering of the bit hierarchy key can be determined by the differential probabilities of the various bit combinations as previously discussed. The details of deriving a bit hierarchy key 840 were described relative to bit hierarchy key 120 and the same method can be used for bit hierarchy key 840. For example, the bit hierarchy key might be:

| $TL_8$ | $C_3$ | ... | $TL_{10}$ | $C_2$ | $TL_1$ | $C_1$ |
|---|---|---|---|---|---|---|
| 22 | 21 | ... | 4 | 3 | 2 | 1 |

The next step is the insert validity period code step 841. The validity period code 845 must be at least one bit, but could be more, and is set by the select scramble function step 844, which is dependent on the validity period of the information broadcast, as explained above. The select scramble function step 844 also selects an associated scramble method, which provides security for the resulting I code 854. The validity period code 845 is inserted into the I code and is used to designate the scramble method to be used during decoding.

Figure 33:
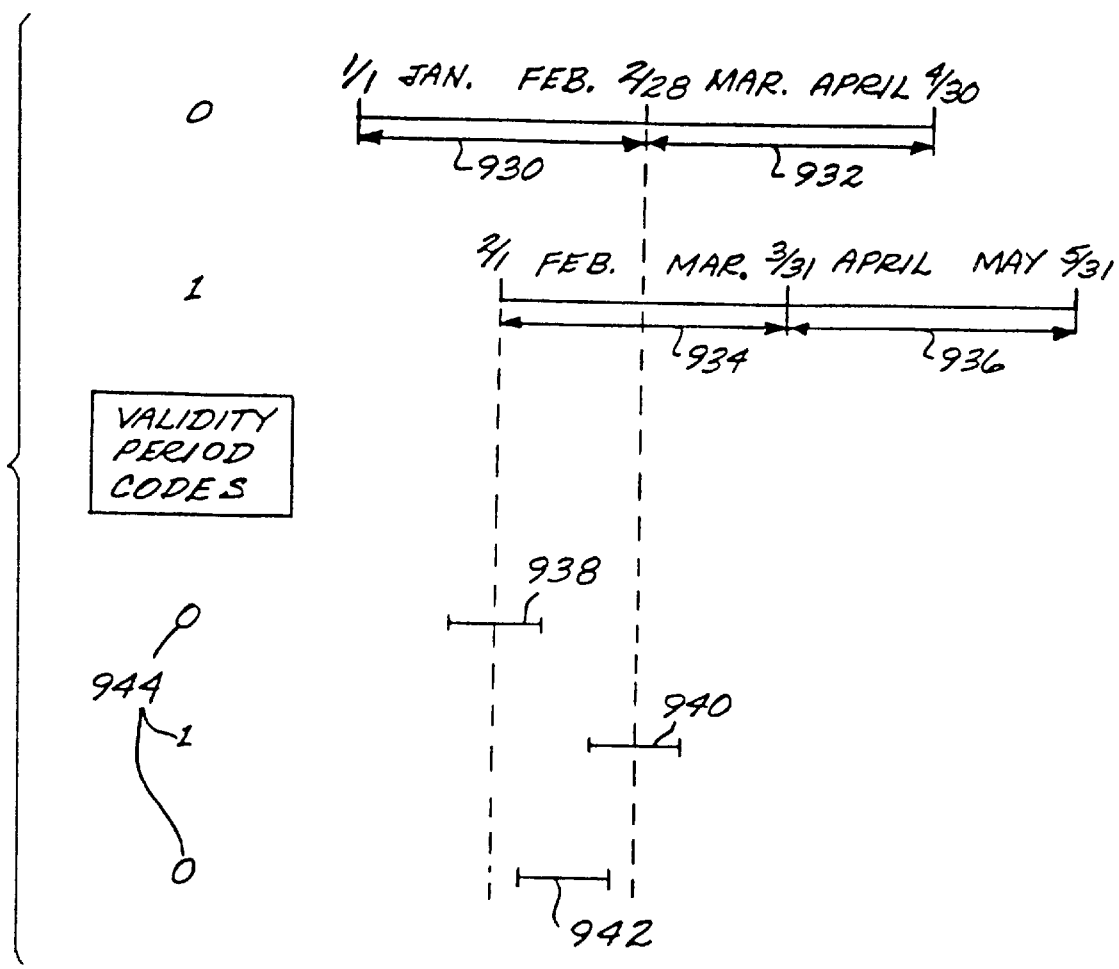
FIG. 33 illustrates the relationship of time spans and validity period codes.

FIG. 33 is an illustration of the problem addressed by the validity period code 845. Suppose a particular scramble method is constant during time span 930 and then changes at the start of time span 932, and each succeeding two month time span. For most advertisements, the I code 854 would have to be constant for a period of time, for example a week for I codes in weekly publications. If the time spans 930 and 932 are two months as shown in FIG. 33, then a one week validity period might overlap both time spans 930 and 932, which would mean that the scramble method would change during the validity period. To compensate for this, a skewed and overlapping set of time spans for a second scramble method is provided. For example, time span 934 and time span 936, which are skewed from time span 930 and time span 932 by one month. The scramble time spans 930, 932 and so on, can be designated by a validity period code "0". The offset scramble time spans 934, 936 and so on can be designated by a "1". Suppose there is a validity period 938 for one week for a I code 854, then the scramble method selected would be those valid during time span 930, time span 932 and so on and the validity period code for that validity period would be set to "O", as shown by validity period codes 944. The validity period code would also be "0" for the validity period 942. However, for validity period 940, the validity period code would be set to "1"., because that corresponds to the scramble method that is constant during time span 934.

Note that if only two skewed time spans are used and the validity period code is placed in the least significant bit of the binary word in step 841, and the least significant digit is not scrambled in step 846, then once the I code is derived it is possible when decoding the I code to determine the validity period code merely by inspecting whether the I code is even or odd.

The next step is the combine groups of bits and convert each group into decimal numbers and concatenate into one decimal number step 842. For example, after reordering according to the bit hierarchy key and insertion of the validity period code (suppose its "1" in this example, because the validity period is February 25th to March 9th, for which a validity period code of 1 would be used as shown in FIG. 33), the code may be 00000000110000000010011, which could be grouped as 00000011,0000000010011. If these groups of binary bits are converted to decimal as 3,19 and concatenated into one decimal number, then the resulting decimal number is 319. The next encoding step is the scramble decimal number step 846, which scrambles the decimal number according to scramble function 844 that is dependent on the validity period 848, such as February 25th through March 9th, for the information broadcast and provides a security feature for the codes. After the scramble decimal number step 846, the decimal code $I_n \ldots I_2 I_1$ 850 may, for example, be 139. The last step is to insert a zero (0) for the first digit step 852, so that the code is distinguishable to the instant programmer 300 as a I code 854. The result for the example would be 0139. These encoded codes are then included in an advertisement, for example as in the I code 652 of FIGS. 29a and 29b.

Figure 32:
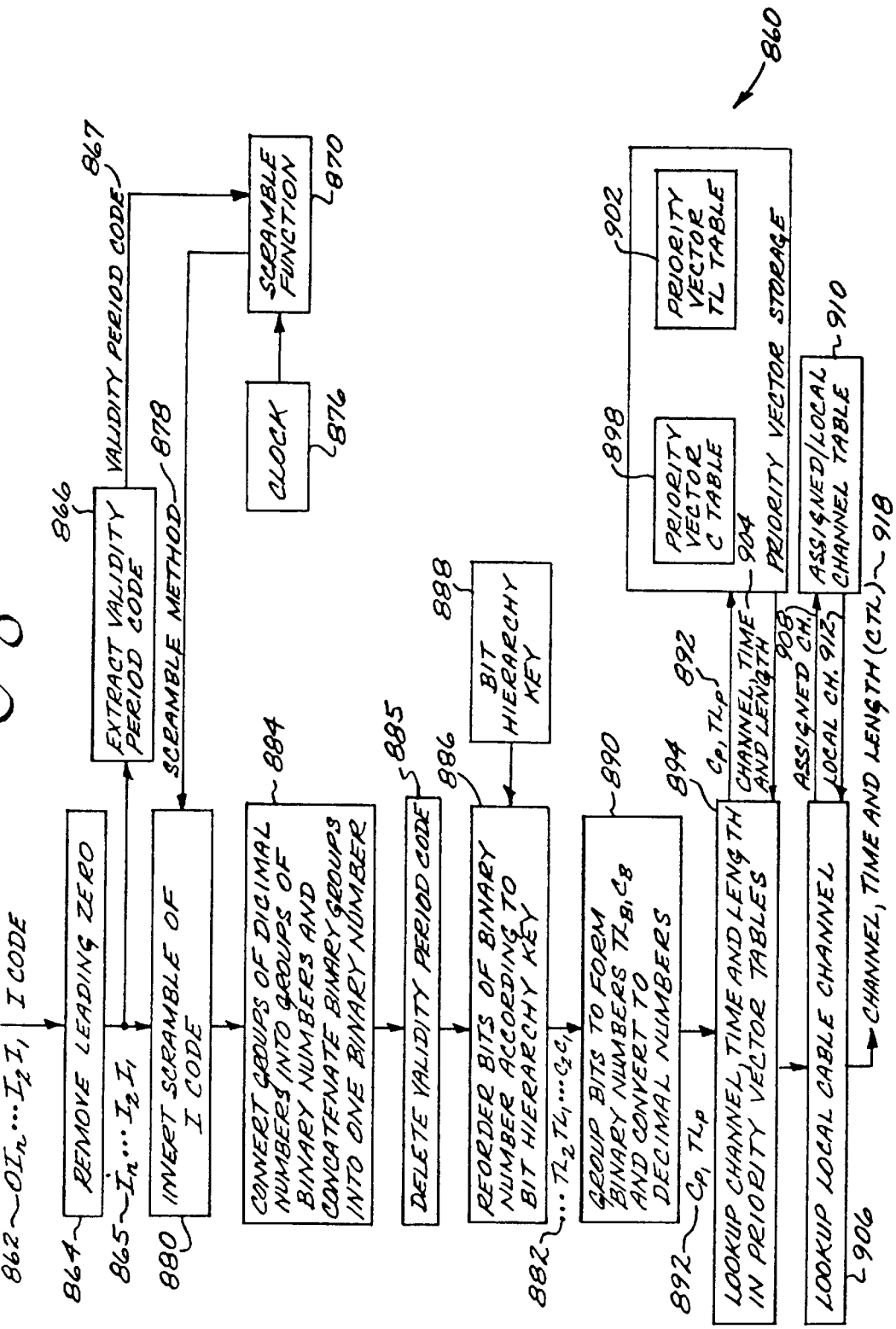
FIG. 32 is a flow graph for decoding an I code channel, time and length (CTL).

FIG. 32 is a flowchart 860 of the method for decoding an I code into channel, time and length, which is step 714 of FIG. 30. Note that step 711 of FIG. 30 has already determined that the entered code is an I code versus a G code, because the first digit is a zero. First, the I code $0 I_n \ldots I_2 I_1$ 862 is entered. Then the zero is deleted in the remove leading zero step 864 to obtain $I_n \ldots I_2 I_1$ 865.

Next, it is necessary to invert the scramble method of steps 844 and 846 of FIG. 31. The first step is the extract validity period code step 866. The validity period code 867 indicates, which of two skewed in time scrambling methods to use. The scramble method 878 selected by scramble function 870 also depends on clock 876, which is implemented by microcomputer 380 in FIGS. 21 and 22. The clock 876 has the current time, day, month and year. The selected scramble method 878 is used in the invert scramble of I code step 880. For the example given above, the output of step 880 would be: 319. The next step is the convert groups of decimal numbers into groups of binary numbers and concatenate binary groups into one binary number step 884, which is the inverse of step 842 of FIG. 31 and for the above example would result in the binary code: 00000000110000000010011. Then the validity period code would be deleted in step 885, which inverts step 841 of FIG. 31, the result being: 00000000110000000001001. Then the bit hierarchy key 888 is used in the reorder bits of binary number according to bit hierarchy key step 886, which inverts step 838 of FIG. 31 to obtain 0000000001001100000100 for the above example, which is . . . $TL_2TL_1 \ldots C_2C_1 \ldots D_2D_1$ 882 corresponding to 836 of FIG. 31. The next step is to group bits to form two binary numbers $TL_b$, $C_b$ and convert to decimal numbers step 890 resulting in $C_p$, $TL_p$ 892, which for the example above would be: 4, 19, and which are priority vectors for channel and time/length, which in turn are used to lookup channel, time and length 904 in priority vector channel (C) table 898 and priority vector time/length (TL) table 902, respectively. For the above example, this would result in looking up channel 5 and time/length of 3 a.m./.3 hours.

The lookup local channel number step 906 looks up the local channel 912 given the assigned channel number 908, in the assigned/local channel table 910, which is setup by the user via the CH key 322, as explained above.

Another preferred method of encoding and decoding the I codes is the following, which is similar to the foregoing except where noted. Channel, time and length priority tables would be used to encode and decode the I codes, as described before. The key difference is that the bit hierarchy is no longer defined in base 2 arithmetic. Rather it is defined in a generalized base arithmetic as shown in the following table:

| No. of Digits | Ch | Time | Len | Validity Per. Code Bits | # Combinations | Order |
|---|---|---|---|---|---|---|
| 1 | 1 | 3 | 2 | 0* | 6 | TTL |
| 2 | 16 | 3 | 2 | 0* | 96 | CCCC |
| 3 | 16 | 30 | 2 | 0* | 960 | TTTT |
| 4 | 32 | 75 | 4 | 0* | 9600 | TCTL |
| 5 | 64 | 90 | 8 | 1 | 92160 | TLCS |
| 6 | 64 | 360 | 20 | 1 | 921600 | LLTT |
| 7 | 128 | 720 | 50 | 1 | 9216000 | LLTC |
| 8 | 128 | 1440 | 250 | 1 | 92160000 | LLLT |

*validity period code bit assumed to be equal to zero.
C = channel bit
T = start time bit
L = length bit
S = validity period code bit For example, if only one digit is used, there are one channel (1C), three start times (3T's) and two length (2 L's), i.e. 6 combinations. It is assumed that the I code before appending the leading zero has only one digit and that in this case both the encoding and decoding methods understand that the validity period code is "0". With two digits, there are in addition 16 times more C's (i.e. 16 C's), so that there are now 3×2×16=96 combinations in the first 2 digits. With three digits, there are now 10 times more T's so that there are now 3 (from digit 1)×10 (from digit 3)=30 T's. The total number of combinations equals 3×2×16×10=2×30×16=960 in the first 3 digits. With four digits, there are now 2 more time C's, 2 more times L's and 2.5 times more T's, so that the number of combinations increases by 2×2×2.5=10 times. There are now 9600 combinations in the first 4 digits. With five digits, there are 2 more times C, 1.2 more times T's, 2 more times L's and an extra bit for scrambling so that there are now 2×1.2×2×2=9.6 times more combinations=9600× 9.6=92160 combinations. One way to obtain a non-integral number of times such as 1.2 or 1.25 or 2.5 times is essentially by providing a table which defines the range of values for each number of digits that corresponds to the above table.

Thus, steps 834 and 838 in FIG. 31 would be implemented in this preferred embodiment in the manner indicated above and there are other subtle changes such as the handling of the assumed validity period code as indicated above for cases with four or fewer digits in the I code not counting the leading zero. I code decoding would be the reverse of the encoding method.

An example of the encoding to reduce the number of digits in the I code is shown below. In this example, suppose one variable is represented by the digits $DA_1, DA_2$ and ranges from 0 to 24, where $DA_1$ ranges from 0 to 2 and $DA_2$ ranges from 0 to 9 and another variable DB ranges from 0 to 3, so the total number of values being encoded is 25*4=100. It is possible to represent the first variable by two digits and the second varible by one digit; however, that is inefficient, because it would require the listing of three digits. The number of combinations of the two variables is only 25*4=100, so it is possible to represent the combination of the variables in only 2 binary coded decimals. The desire is to encode the $DA_1, DA_2$ and DB, which are 3 digits into two binary coded decimal digits $d_1$ and $d_2$, where the permissible values of $d_1$ and $d_2$ range only between 0 and 9.

This is possible as shown in the table below, where the encoding algorithm is the following:

$A3*2^1+A2*2^0=DA2$ $A1=DA_1$ unless $DB \geq 2$ & $DA_2=2$, then $A1=DA_1+5$ $B2*2^1+B1*2^0=DB$ unless $DB \geq 2$ & $DA_2=2$, then $B2*2^1+B1*2^0=DB-2$ The resulting binary coded decimals are denoted $d_2$, which equals $A3*2^3+A2*2^2+B2*2^1+B1*2^0$ and ranges from 0 to 9, and $d_1$, which ranges from 0 to 9 and equals A1.

Once encoded, the binary coded decimals $d_2$ and $d_1$ can be decoded by first representing them in binary form and then deriving DA2,DA1 and DB as follows:

$DA_2=A3*2^1+A2*2^0$ $DA_1=A1$ unless $A3=1$ and $A1 \geq 5$, then $DA1=A1-5$ $DB=B2*2^1+B1*2^0$ unless $A1 \geq 5$, then $DB=(B2+1)*2^1+B1*2^0$

| | | | | | | | Decimal Encoding | |
|---|---|---|---|---|---|---|---|---|
| $DA_1, DA_2$ | DB | A3 | A2 | B2 | B1 | A1 | $d_2$ | $d_1$ |
| 0 | 0 | 0 | 0 | 0 | 0 | 0 | 0 | 0 |
| 1 | 0 | 0 | 0 | 0 | 0 | 1 | 0 | 1 |
| 2 | 0 | 0 | 0 | 0 | 0 | 2 | 0 | 2 |
| 3 | 0 | 0 | 0 | 0 | 0 | 3 | 0 | 3 |
| 4 | 0 | 0 | 0 | 0 | 0 | 4 | 0 | 4 |
| 5 | 0 | 0 | 0 | 0 | 0 | 5 | 0 | 5 |
| 6 | 0 | 0 | 0 | 0 | 0 | 6 | 0 | 6 |
| 7 | 0 | 0 | 0 | 0 | 0 | 7 | 0 | 7 |
| 8 | 0 | 0 | 0 | 0 | 0 | 8 | 0 | 8 |
| 9 | 0 | 0 | 0 | 0 | 0 | 9 | 0 | 9 |
| 10 | 0 | 0 | 1 | 0 | 0 | 0 | 4 | 0 |
| 11 | 0 | 0 | 1 | 0 | 0 | 1 | 4 | 1 |
| 12 | 0 | 0 | 1 | 0 | 0 | 2 | 4 | 2 |
| 13 | 0 | 0 | 1 | 0 | 0 | 3 | 4 | 3 |
| 14 | 0 | 0 | 1 | 0 | 0 | 4 | 4 | 4 |
| 15 | 0 | 0 | 1 | 0 | 0 | 5 | 4 | 5 |
| 16 | 0 | 0 | 1 | 0 | 0 | 6 | 4 | 6 |
| 17 | 0 | 0 | 1 | 0 | 0 | 7 | 4 | 7 |
| 18 | 0 | 0 | 1 | 0 | 0 | 8 | 4 | 8 |
| 19 | 0 | 0 | 1 | 0 | 0 | 9 | 4 | 9 |
| 20 | 0 | 1 | 0 | 0 | 0 | 0 | 8 | 0 |
| 21 | 0 | 1 | 0 | 0 | 0 | 1 | 8 | 1 |
| 22 | 0 | 1 | 0 | 0 | 0 | 2 | 8 | 2 |
| 23 | 0 | 1 | 0 | 0 | 0 | 3 | 8 | 3 |
| 24 | 0 | 1 | 0 | 0 | 0 | 4 | 8 | 4 |
| 0 | 1 | 0 | 0 | 0 | 1 | 0 | 1 | 0 |
| 1 | 1 | 0 | 0 | 0 | 1 | 1 | 1 | 1 |
| 2 | 1 | 0 | 0 | 0 | 1 | 2 | 1 | 2 |
| 3 | 1 | 0 | 0 | 0 | 1 | 3 | 1 | 3 |
| 4 | 1 | 0 | 0 | 0 | 1 | 4 | 1 | 4 |
| 5 | 1 | 0 | 0 | 0 | 1 | 5 | 1 | 5 |
| 6 | 1 | 0 | 0 | 0 | 1 | 6 | 1 | 6 |
| 7 | 1 | 0 | 0 | 0 | 1 | 7 | 1 | 7 |
| 8 | 1 | 0 | 0 | 0 | 1 | 8 | 1 | 8 |
| 9 | 1 | 0 | 0 | 0 | 1 | 9 | 1 | 9 |
| 10 | 1 | 0 | 1 | 0 | 1 | 0 | 5 | 0 |
| 11 | 1 | 0 | 1 | 0 | 1 | 1 | 5 | 1 |
| 12 | 1 | 0 | 1 | 0 | 1 | 2 | 5 | 2 |
| 13 | 1 | 0 | 1 | 0 | 1 | 3 | 5 | 3 |
| 14 | 1 | 0 | 1 | 0 | 1 | 4 | 5 | 4 |
| 15 | 1 | 0 | 1 | 0 | 1 | 5 | 5 | 5 |
| 16 | 1 | 0 | 1 | 0 | 1 | 6 | 5 | 6 |
| 17 | 1 | 0 | 1 | 0 | 1 | 7 | 5 | 7 |
| 18 | 1 | 0 | 1 | 0 | 1 | 8 | 5 | 8 |
| 19 | 1 | 0 | 1 | 0 | 1 | 9 | 5 | 9 |
| 20 | 1 | 1 | 0 | 0 | 1 | 0 | 9 | 0 |

-continued

| DA$_1$, DA$_2$ | DB | A3 | A2 | B2 | B1 | A1 | Decimal Encoding d$_2$ | d$_1$ |
|---|---|---|---|---|---|---|---|---|
| 21 | 1 | 1 | 0 | 0 | 1 | 1 | 9 | 1 |
| 22 | 1 | 1 | 0 | 0 | 1 | 2 | 9 | 2 |
| 23 | 1 | 1 | 0 | 0 | 1 | 3 | 9 | 3 |
| 24 | 1 | 1 | 0 | 0 | 1 | 4 | 9 | 4 |
| 0 | 2 | 0 | 0 | 1 | 0 | 0 | 2 | 0 |
| 1 | 2 | 0 | 0 | 1 | 0 | 1 | 2 | 1 |
| 2 | 2 | 0 | 0 | 1 | 0 | 2 | 2 | 2 |
| 3 | 2 | 0 | 0 | 1 | 0 | 3 | 2 | 3 |
| 4 | 2 | 0 | 0 | 1 | 0 | 4 | 2 | 4 |
| 5 | 2 | 0 | 0 | 1 | 0 | 5 | 2 | 5 |
| 6 | 2 | 0 | 0 | 1 | 0 | 6 | 2 | 6 |
| 7 | 2 | 0 | 0 | 1 | 0 | 7 | 2 | 7 |
| 8 | 2 | 0 | 0 | 1 | 0 | 8 | 2 | 8 |
| 9 | 2 | 0 | 0 | 1 | 0 | 9 | 2 | 9 |
| 10 | 2 | 0 | 1 | 1 | 0 | 0 | 6 | 0 |
| 11 | 2 | 0 | 1 | 1 | 0 | 1 | 6 | 1 |
| 12 | 2 | 0 | 1 | 1 | 0 | 2 | 6 | 2 |
| 13 | 2 | 0 | 1 | 1 | 0 | 3 | 6 | 3 |
| 14 | 2 | 0 | 1 | 1 | 0 | 4 | 6 | 4 |
| 15 | 2 | 0 | 1 | 1 | 0 | 5 | 6 | 5 |
| 16 | 2 | 0 | 1 | 1 | 0 | 6 | 6 | 6 |
| 17 | 2 | 0 | 1 | 1 | 0 | 7 | 6 | 7 |
| 18 | 2 | 0 | 1 | 1 | 0 | 8 | 6 | 8 |
| 19 | 2 | 0 | 1 | 1 | 0 | 9 | 6 | 9 |
| 20 | 2 | 1 | 0 | 0 | 0 | 5 | 8 | 5 |
| 21 | 2 | 1 | 0 | 0 | 0 | 6 | 8 | 6 |
| 22 | 2 | 1 | 0 | 0 | 0 | 7 | 8 | 7 |
| 23 | 2 | 1 | 0 | 0 | 0 | 8 | 8 | 8 |
| 24 | 2 | 1 | 0 | 0 | 0 | 9 | 8 | 9 |
| 0 | 3 | 0 | 0 | 1 | 1 | 0 | 3 | 0 |
| 1 | 3 | 0 | 0 | 1 | 1 | 1 | 3 | 1 |
| 2 | 3 | 0 | 0 | 1 | 1 | 2 | 3 | 2 |
| 3 | 3 | 0 | 0 | 1 | 1 | 3 | 3 | 3 |
| 4 | 3 | 0 | 0 | 1 | 1 | 4 | 3 | 4 |
| 5 | 3 | 0 | 0 | 1 | 1 | 5 | 3 | 5 |
| 6 | 3 | 0 | 0 | 1 | 1 | 6 | 3 | 6 |
| 7 | 3 | 0 | 0 | 1 | 1 | 7 | 3 | 7 |
| 8 | 3 | 0 | 0 | 1 | 1 | 8 | 3 | 8 |
| 9 | 3 | 0 | 0 | 1 | 1 | 9 | 3 | 9 |
| 10 | 3 | 0 | 1 | 1 | 1 | 0 | 7 | 0 |
| 11 | 3 | 0 | 1 | 1 | 1 | 1 | 7 | 1 |
| 12 | 3 | 0 | 1 | 1 | 1 | 2 | 7 | 2 |
| 13 | 3 | 0 | 1 | 1 | 1 | 3 | 7 | 3 |
| 14 | 3 | 0 | 1 | 1 | 1 | 4 | 7 | 4 |
| 15 | 3 | 0 | 1 | 1 | 1 | 5 | 7 | 5 |
| 16 | 3 | 0 | 1 | 1 | 1 | 6 | 7 | 6 |
| 17 | 3 | 0 | 1 | 1 | 1 | 7 | 7 | 7 |
| 18 | 3 | 0 | 1 | 1 | 1 | 8 | 7 | 8 |
| 19 | 3 | 0 | 1 | 1 | 1 | 9 | 7 | 9 |
| 20 | 3 | 1 | 0 | 0 | 1 | 5 | 9 | 5 |
| 21 | 3 | 1 | 0 | 0 | 1 | 6 | 9 | 6 |
| 22 | 3 | 1 | 0 | 0 | 1 | 7 | 9 | 7 |
| 23 | 3 | 1 | 0 | 0 | 1 | 8 | 9 | 8 |
| 24 | 3 | 1 | 0 | 0 | 1 | 9 | 9 | 9 |

Note if the weights of the A3, A2, B2 and B1 bits are 20, 10, 50, and 25, that the weighted sum of the bits plus the A1 digit sequence properly from 0 through 99, for the example table above, except for what should be the weighted sums 70 through 74 and 95 through 99 combinations, which have instead a weighted sum of 25 through 29 and 50 through 54, respectively. This results in the logic above that recognizes that DA$_1$ never exceeds the value 4. This is used to advantage to keep d$_2$ within a binary coded decimal value of 0 to 9 by replacing what should be a 1 in B2 with a zero and adding 5 to A1, thereby resulting in the difference of 5–50=–45 between the expected 70 and resulting 25 and the expected 95 and resulting 50, for example. As shown in the logic above, simple tests determine the proper encoding and decoding.

In summary the apparatus and methods described enable a user to selectively record additional information associated with a printed or broadcast advertisement, which would be broadcast on a television channel at a later time. The user enters the digital code (I code) associated with an advertisement into a unit with a decoding means which automatically converts the I code into CTL (channel, time and length). The unit within a twenty four hour period activates a VCR to record information on the television channel at the right start time for the proper length of time. The additional information could be broadcast on a television channel early in the morning, for example, between midnite and six o'clock in the morning, when the cost of broadcast time is low and it is economical to broadcast detailed information or advertisements of many items, such as automobiles, real estate and movie previews. The user can then view this information at his/her leisure. This invention will allow the user an unprecedented capability to control access to desired information without having to be continually glued to the television. It will also provide a new and cost effective means for advertisers to explain their goods and services.

It is thought that the apparatus and method for using compressed codes for scheduling broadcast information recording of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. An apparatus for using compressed codes for information broadcast recording that comprises:
    means for entering compressed codes each having at least one digit and each representative of, and compressed in length from, the combination of a proper subset of the set of channel, time-of-day and length commands for an information broadcast;
    means for decoding a compressed code having at least one digit into channel, time-of-day and length commands;
    means for recording coupled to said means for decoding;
    a clock for providing an output as a function of time coupled to said means for decoding;
    means for selecting a channel to record in response to said decoded channel commands;
    means for turning said means for recording on in response to comparison of said decoded time-of-day commands with said clock output; and
    means for turning said means for recording off in response to comparison of the record on time with said decoded length commands.

2. The apparatus for using compressed codes of claim 1 wherein:
    said means for decoding a compressed code into channel, time-of-day and length commands performs the decoding as a function of said-clock output.

3. The apparatus for using compressed codes of claim 1 wherein said means for entering a compressed code comprises:
    means for remote control having a signal transmit means for communicating said compressed code to said means for decoding.

4. The apparatus for using compressed codes of claim 1 wherein said means for entering a compressed code comprises a keyboard.

5. An apparatus for using compressed codes for information broadcast recording that comprises:

means for remote control;

means for entering compressed codes each having at least one digit and each representative of, and compressed in length from, the combination of a proper subset of the set of channel, time-of-day and length commands for an information broadcast coupled to said means for remote control;

means for decoding a compressed code having at least one digit into channel, time-of-day and length commands coupled to said remote control;

means for recording;

means for transmitting channel, time-of-day and length commands from said means for remote control to said means for recording;

a clock for providing an output as a function of time coupled to said means for recording;

means for selecting a channel to record in response to said decoded channel commands;

means for turning said means for recording on in response to comparison of said decoded time-of-day commands with said clock output; and means for turning said means for recording off in response to comparison of the record on time with said decoded length commands.

6. An apparatus for using compressed codes for information broadcast recording that comprises:

means for universal remote control capable of learning protocols of a different remote controller with which said means for universal remote control interfaces;

means for entering compressed codes each having at least one digit and each representative of, and compressed in length from, the combination of a proper subset of the set of channel, time-of-day and length commands for an information broadcast coupled to said means for universal remote control;

means for decoding a compressed code having at least one digit into channel, time-of-day and length commands coupled to said universal remote control;

means for recording;

means for transmitting channel, time-of-day and length commands from said means for universal remote control to said means for recording;

a clock having an output as a function of time coupled to said means for recording;

means for selecting a channel to record in response to said decoded channel commands;

means for turning said means for recording on in response to comparison of said decoded time-of-day commands with said clock output; and means for turning said means for recording off in response to comparison of the record on time with said decoded length commands.

* * * * *